(12) United States Patent
Noonan et al.

(10) Patent No.: US 9,975,037 B2
(45) Date of Patent: May 22, 2018

(54) SUDOKU ARRAYS

(75) Inventors: Joseph Noonan, Gloucester, MA (US);
Sos Agaian, San Antonio, TX (US);
Yue Wu, Medford, MA (US)

(73) Assignee: TUFTS UNIVERSITY, Medford, MA (US)

( * ) Notice: Subject to any disclaimer, the term of this patent is extended or adjusted under 35 U.S.C. 154(b) by 629 days.

(21) Appl. No.: 14/110,091

(22) PCT Filed: Apr. 6, 2012

(86) PCT No.: PCT/US2012/032480
§ 371 (c)(1),
(2), (4) Date: May 19, 2014

(87) PCT Pub. No.: WO2012/138969
PCT Pub. Date: Oct. 11, 2012

(65) Prior Publication Data
US 2014/0248929 A1  Sep. 4, 2014

Related U.S. Application Data

(60) Provisional application No. 61/472,426, filed on Apr. 6, 2011.

(51) Int. Cl.
*A63F 9/24* (2006.01)
*A63F 3/04* (2006.01)
*H04L 9/00* (2006.01)
*H04L 9/06* (2006.01)

(52) U.S. Cl.
CPC .......... *A63F 3/0415* (2013.01); *H04L 9/001* (2013.01); *H04L 9/0662* (2013.01); *A63F 2003/0418* (2013.01)

(58) Field of Classification Search
CPC .............. A63F 2003/0418; A63F 3/0415
See application file for complete search history.

(56) References Cited

U.S. PATENT DOCUMENTS

| | | | |
|---|---|---|---|
| 2007/0173314 A1* | 7/2007 | Chen | A63F 3/00643 463/18 |
| 2008/0084025 A1* | 4/2008 | Oliphant | A63F 3/0415 273/153 R |
| 2009/0144799 A1 | 6/2009 | Simske | |
| 2011/0031687 A1* | 2/2011 | Steinhoff | A63F 3/00214 273/153 R |

OTHER PUBLICATIONS

University of Washington Dept. of Mathematics, Sudoku: Bagging a Difficulty Metric, Feb. 2008.*
Peter J. Cameron, Sudoku—an Alternative History, Feb. 2007.*
Roshan Shetty, Steganography using Sudoku Puzzle, Jul. 2009.*
Kelsey et al., "The Twofish Encryption Algorithm: A 128-Bit Block Cipher" J Wiley 1999. TOC Only, 7 pages, Applicants will provide specific passages upon Examiner request.
Advanced Encryption Standard (AES), Federal Information Processing Standards Publication 197, 2001, 51 pages.
(Continued)

*Primary Examiner* — Steve Rowland
(74) *Attorney, Agent, or Firm* — Casimir Jones, S.C.

(57) ABSTRACT

Provided herein is technology relating to generating a Sudoku array and particularly, but not exclusively, to methods and systems for generating a Sudoku array for a puzzle or for encrypting data.

17 Claims, 41 Drawing Sheets

(56) References Cited

OTHER PUBLICATIONS

Data Encryption Standard (DES), Federal Information Processing Standards Publication 46, 1977, 27 pages.
Awad, "A new chaos-based cryptosystem for secure transmitted images" "Computers, IEEE Transactions on 2011, PP(99): 1".
Chang et al., "An Information Hiding Scheme Using Sudoku/" Proceedings of the 3rd Internationial Conference on Innovative Computing Informaion and Control 2008, 17.
Chen, "A symmetric image encryption scheme based on 3D chaotic cat maps" Chaos, Solitons & Fractals Jul. 2004, 21(3):749-761.
Dang "Image encryption for secure Internet multimedia applications." Consumer Electronics, IEEE Transactions on Aug. 2000, 46(3): 395-403.
Dawson et al., "An expanded set of s-box design criteria based on information theory and its relation to differential-like attacks" Advances in Cryptology—Eurocrypt 91, 1991, LNCS 547, 352-367.
Fridrich et al., "Image encryption based on chaotic maps" Computational Cybernetics and Simulation., 1997 IEEE International Conference on Systems, Man, and Cybernetics, 1997. 2: 1105-1110.
Gentle, Random Number Generation and Monte Carlo Methods, Springer 2003, TOC Only, 13 pages, Applicants will provide specific passages upon Examiner request.
Gonzales & Woods, Digital Image Processing, 2008, Pearson/Prentice Hall, TOC Only, 11 pages, Applicant will provide specific passages upon Examiner request.
Hong et al., "A Minimal Euclidean Distance Searching Technique for Sudoku Steganography" Information Science and Engineering, 2008. ISISE '08. International Symposium on Dec. 2008, 1:515-518.
Hong et al., "Steganography Using Sudoku Revisited" Intelligent Information Technology Application, 2008. IITA '08. Second International Symposium on, 2:935-939.
Medhi, Stochastic Processes, 3rd edition, 1994, New Age Science Limited, TOC Only, 5 pages, Applicants will provide specific passages upon Examiner request.
International Search Report and Written Opinion for PCT/US2012/032480, dated Dec. 20, 2012, 15 pages.
Kumar, "Extendedsubstitution-diffusion based image cipher using chaotic standard map" Communications in Nonlinear Science and Numerical Simulation Jan. 2011, 16(1): 372-382.
Li et al., "A general quantitative cryptanalysis of permutation-only multimedia ciphers against plaintext attacks" Signal Processing: Image Communication Mar. 2008, 23(3): 212-223.
Liao et al., "A novel image encryption algorithm based on self-adaptive wave transmission" Signal Processing Sep. 2010, 90(9): 2714-2722.
Mantere et al., "Solving, rating and generating Sudoku puzzles with GA" Evolutionary Computation, 2007. CEC 2007. IEEE Congress on, 1382-1389.
Mao et al., "A Novel Fast Image Encryption Scheme Based on 3D Chaotic Baker Maps" International Journal of Bifurcation and Chaos, Oct. 2004, 14(10):3613-3624.
Menezes et al., "Handbook of Applied Cryptography" CRC 1997, 794 pages.
Moon et al., "Sinkhorn Solves Sudoku" IEEE Transactions on Information Theory, Apr. 2009, 55(4): 1741-1746.
Murphy & Robshaw, "Key-Dependent S-Boxes and Differential Cryptanalysis" "Designs, Codes and CryptographyDec. 2002, 27(3):229-255".
Nyberg, "perfect nonlinear s-boxes" Advances in Cryptology, Eurocrypt '91, LNCS 547, 378-386, 1991.
Reeds et al., "Polynomial codes over certain finite fields" J Society for Industrial and Applied Mathematics Jun. 1960, 8(2): 300-304.
Shannon, "Communication Theory of Secrecy Systems" Bell System Technical Journal 28(4): 656-715 (Elsevier 2010).
Shirali-Shahreza et al., "Steganography in SMS by Sudoku puzzle" AICCSA 2008. IEEE/ACS International Conference on Computer Systems and Applications, 2008. 844-847.
Stinson, Cryptography: Theory and Practice, Chapman & Hall/CRC 2006, TOC Only, 12 pages, Applicants will provide specific passages upon Examiner request.
Sun et al., "A New Algorithm for Generating Unique-Solution Sudoku" Natural Computation, 2008. ICNC '08. Fourth International Conference on, 7:215-217.
Tang, "Methods for encrypting and decrypting MPEG video data efficiently" "ProceedingMultimedia '96 Proceedings of the fourth ACM international conference on Multimedia pp. 219-229".
Wu et al., "Dynamic and implicit latin square doubly stochastic S-boxes with reversibility." "Systems, Man, and Cybernetics (SMC), 2011 IEEE International Conference on, 3358-3364".
Wu et al., "Image encryption using the Sudoku matrix" Mobile Multimedia/Image Processing, Security, and Applications 2010, 77080P (Apr. 28, 2010).
Lai & Massey, "A Proposal for a New Block Encryption Standard" Advances in Cryptology—EUROCRYPT '90 Proceedings, 1990, 389-404.
Zhang et al., "Discrete Chaotic Encryption and Decryption of Digital Images" Computer Science and Software Engineering, 2008 International Conference on, 849-852.
Zou et al., "A new digital image scrambling method based on Fibonacci numbers" Circuits and Systems 2004, 3:965-8.
Zhu et al., "A chaos-based symmetric image encryption scheme using a bit-level permutation" Information Sciences Mar. 2011, 181 (6): 1171-1186.

\* cited by examiner

| 8 | 6 | 3 | 7 | 1 | 9 | 4 | 2 | 5 |
|---|---|---|---|---|---|---|---|---|
| 9 | 4 | 7 | 5 | 6 | 2 | 1 | 3 | 8 |
| 1 | 5 | 2 | 4 | 3 | 8 | 6 | 9 | 7 |
| 5 | 2 | 4 | 6 | 9 | 7 | 8 | 1 | 3 |
| 7 | 3 | 1 | 8 | 2 | 4 | 5 | 6 | 9 |
| 6 | 9 | 8 | 1 | 5 | 3 | 7 | 4 | 2 |
| 3 | 7 | 6 | 9 | 4 | 5 | 2 | 8 | 1 |
| 4 | 8 | 9 | 2 | 7 | 1 | 3 | 5 | 6 |
| 2 | 1 | 5 | 3 | 8 | 6 | 9 | 7 | 4 |

(a) Plaintext $P$ (b) Ciphertext $C^1$ (c) Ciphertext $C^2$ (d) Ciphertext $C^3$ (a) Plaintext P (b) Sudoku size 16 x 16

(c) Sudoku size 64 x 64

(d) Sudoku size 256 x 256

SUDOKU ARRAYS

This patent application is a national phase application under 35 U.S.C. § 371 of PCT International Application No. PCT/US2012/032480, filed Nov. 10, 2011, which claims priority to U.S. Pat. Appl. Ser. No. 61/472,426, filed Apr. 6, 2011, each of which is incorporated herein by reference in its entirety for all purposes.

FIELD OF INVENTION

Provided herein is technology relating to generating a Sudoku array and particularly, but not exclusively, to methods and systems for using a Sudoku array to generate a puzzle and for encrypting data.

BACKGROUND

In the past half-century, computers and network technology have become prevalent in all aspects of our daily lives. Electronic mail (email), remote video conference, online music, online movies, and other applications are now commonplace in this digital age. Online personal albums and data storage are widely used and are easily accessed and shared across the internet. To improve the quality of service and reduce record storage costs, many medical institutions and hospitals digitize and store diagnostic images and/or the medical records of their patients. This information can be shared and transmitted over networks from the laboratories to medical centers or to a doctor's office. However, the privacy of these images and data is susceptible to unauthorized used and might be disclosed to some unauthorized individuals. While the degree of security required may vary for various applications, it is generally important for all of these examples that the substance of particular communications passes from a sender to an intended receiver without other parties being able to interpret the transferred message. In addition, there are further instances where information must be protected from snoopers who have access to the information through data processing networks. Therefore, digital images should be encrypted, e.g., for storage or for transmittal over network.

Many image scrambling and image encryption algorithms have been developed based on different principles. Generally these algorithms can be divided into two categories based on the type of encryption domain implemented in the algorithm, namely the transform domain and the spatial domain. In transform domain encryption, the image first is transformed to some frequency domain and then encryption is applied and the image is transformed back to a spatial domain image. Dang et al. proposed his approach based on the Discrete Wavelet Transform ("Image encryption for secure Internet multimedia applications," 2000, *Consumer Electronics, IEEE Transactions on*, 46(3), 395-403). Hui et al. gave an encryption algorithm with fractional discrete cosine and sine transform ("Methods for encrypting and decrypting MPEG video data efficiently", ACM (Boston, Mass., 1996)). In contrast, in spatial domain encryption, the algorithm directly modifies image pixels. Fridrich et al. employed a 2D chaotic baker map ("Image Encryption Based on Chaotic maps", 1997, *IEEE International Conference on Systems, Man, and Cybernetics*, 1105-1110). Zou et al. applied a classical Fibonacci number to scramble images in the spatial domain ("A new digital image scrambling method based on Fibonacci numbers", 2004, *Circuit and Systems* 3: 965-968). Zhang et al. used discrete Chebyshev chaotic sequences ("Discrete Chaotic Encryption and Decryption of Digital Images", 2008, *Computer Science and Software Engineering, International Conference on*, 849-852).

SUMMARY

In one aspect, the technology described herein relates to methods of generating a Sudoku matrix with optimal efficiency without random guesses. The methods comprise a parametric Sudoku generator based on expanding and shuffling a Latin square. The Sudoku arrays produced by this method find use in applications as far ranging as puzzles and toys to the robust and secure encryption of data (e.g., an image).

As it relates to encryption, the Sudoku encryption technology provided herein has some distinct properties compared with conventional block ciphers such as DES, IDEA, and AES. First, the proposed cryptosystem is suitable for large volume data encryption such as images, audio, and video, and is appropriate for many types of data and content, such as military images, identification images (e.g., a fingerprint), medical images (e.g., a MRI brain scan), and private images. Second, the output of the cryptosystem almost follows a uniform distribution. This statistical property helps to prevent attacks based on statistical analysis. Thirdly, the cryptosystem is highly sensitive to the encryption key. This implies that even a slight change in the key will lead to a great change in the ciphertext. This property makes sensitivity-based attacks ineffective. Fourth, the cryptosystem permutes the plaintext extensively and correlations between neighboring plaintext pixels are removed or minimized in the encrypted ciphertext. Finally, the encryption and decryption algorithms are easily implemented in hardware. For example, generation of a Sudoku Matrix can be done with circular registers.

Embodiments of the technology are also described that relate to toys and puzzles comprising an arbitrary number of dimensions and/or elements and that are presented in both concrete and virtual forms.

Accordingly, the technology presented herein relates, in some embodiments to a method for generating a Sudoku array, the method comprising generating a Latin square and shuffling elements of the Latin square according to a permutation sequence. In some embodiments, the shuffling comprises shuffling rows and/or columns. Furthermore, embodiments of generating a Sudoku array additionally comprise band swapping and/or stack swapping. Some embodiments provide a parametric Sudoku generator; thus, the methods described relate in some aspects to providing a parameter set as inputs for the method. The technology is not limited in the generation of the parameter set. For example, some embodiments comprise generating a parameter set from an encryption key and providing the parameter set as inputs for the method. Some embodiments comprise generating a parameter set from an encryption key using a pseudo-random number generator or a linear congruential generator. And, furthermore, some embodiments comprise generating a parameter set from an encryption key using a discrete logistic map. In some embodiments that comprise generating a parameter set from an encryption key, the encryption key comprises a first parameter $x_0$ in the interval [0, 1] and a second parameter r in the interval [3.6, 4] for generating a logistic chaotic sequence, wherein an element of the logistic chaotic sequence is output from a discrete logistic map; a third parameter m to define the size of the Sudoku array; and a fourth parameter t to define a number of iterations to produce an element from the discrete logistic map. The methods provided for generating a Sudoku array are not limited in the number of dimensions or elements in the array. For example, in some embodiments, the methods produce a Sudoku array that is an array comprising more than 2 dimensions.

Another aspect of the technology relates to methods for encrypting a plaintext, the methods comprising generating a Sudoku matrix and transforming the plaintext to produce a ciphertext. Sudoku matrices find use in the present technology in the implementation of cryptographic primitives. For example, in some embodiments, transforming the plaintext comprises whitening the plaintext with the Sudoku matrix; transposing the plaintext with the Sudoku matrix; and permuting the plaintext with the Sudoku matrix. The permutation primitives are embodied in different forms; for example, in some embodiments permuting comprises generating a unitary permutation matrix from the Sudoku matrix and shuffling the plaintext according to the unitary permutation matrix; in some embodiments permuting comprises shuffling a row, a column, or a block according to the Sudoku matrix; and in some embodiments permuting comprises moving elements according to a bijective mapping defined for the Sudoku matrix. In some embodiments comprising moving elements according to a bijective mapping, the bijective mapping relates a first address comprising a coordinate pair expressed in a first notation to a second address comprising the coordinate pair expressed in a second notation. Additional embodiments of cryptographic primitives based on a Sudoku matrix include methods wherein the Sudoku matrix is a maximum distance separable matrix and wherein the transforming comprises substituting the plaintext according to the Sudoku matrix.

In some embodiments, the transformations are related to Markov chains and Monte Carlo simulations. For example, some embodiments of the technology comprise normalizing the Sudoku matrix to produce a doubly stochastic matrix and wherein the transforming comprises substituting according to the doubly stochastic matrix (e.g., as a Markov process). In some of these embodiments, the Sudoku matrix is predefined and in some embodiments the Sudoku matrix is dynamically generated.

The technology is not limited in the types of data sources (e.g., a plaintext) that are encrypted. For instance, in some embodiments the plaintext is an image (e.g., a black and white image, a grayscale image, a color image). In some embodiments, the plaintext is a red channel of an RGB image, a green channel of the RGB image, and/or a blue channel of the RGB image. In some embodiments, a key is used for encryption, for example some embodiments comprise using a 256-bit Rijndael key schedule to generate a uniformly distributed round key and/or a sub-key. Additionally, improved encryption is provided by embodiments that apply multiple rounds of encryption. In other words, the product of an encryption is encrypted again according to the technology, e.g., the ciphertext produced by one cryptographic operation is the input to a subsequent cryptographic operation. Accordingly, some embodiments relate to repeating the method to encrypt the ciphertext for a number of iterations n. For example, some embodiments provide 1, 2, 3, 4, 5, 6, 7, 8, 9, or 10 or more iterations of encryption. Some embodiments provide a robust encryption from 10 iterations of encryption.

In some embodiments, the plaintext is a video, e.g., a compressed video. In some embodiments, a video is encrypted and compressed according to the technology. In some embodiments, the compression is a discrete cosine transform-based technology. Additionally, some embodiments relate to encrypting data that is audio or a bit stream. In particular embodiments, transforming the data (e.g., encrypting the plaintext) comprises changing the data and shuffling data positions.

As discussed above, the methods of generating a Sudoku matrix find use in encrypting data. As such, the technology relates in one aspect to a method for encrypting a plaintext, the method comprising generating a Sudoku matrix according to the technology described and transforming the plaintext to produce a ciphertext.

The encryption technology finds use in providing improvements to conventional ciphers such as the AES cipher. Accordingly, provided herein is a method for encrypting a plaintext comprising whitening the plaintext using a first Sudoku matrix; substituting the plaintext using a second Sudoku matrix; permuting the plaintext by shuffling the plaintext using a third Sudoku matrix; and diffusing the plaintext using a maximum distance separable Sudoku matrix. Efficiency is increased in some embodiments wherein the first Sudoku matrix and the third Sudoku matrix are the same. In some embodiments of the improved AES cipher, an encryption key is used to generate one or more of the first Sudoku matrix, the second Sudoku matrix, the third Sudoku matrix, and/or the maximum distance separable Sudoku matrix.

The methods also contemplate producing the original plaintext message from the ciphertext encrypted according to a Sudoku matrix. Consequently, embodiments of the technology are described that comprise methods for decrypting a ciphertext, wherein the methods comprise generating a Sudoku matrix and transforming the ciphertext to produce a plaintext. In addition, data produced according to an encryption or decryption technology comprises an aspect of the technology. Thus, the technology relates to a data file (e.g., a ciphertext or a plaintext) generated by the methods provided.

The methods find use in cryptographic systems, for example, an encryption system comprising a functionality to provide a plaintext and a microprocessor configured to generate a Sodoku matrix and transform the plaintext with the Sudoku matrix to produce a ciphertext. Some embodiments of systems comprise a functionality to output the ciphertext. Moreover, the system in some embodiments comprises a microprocessor that is further configured to generate parameters for generating the Sudoku matrix and/or that is further configured to generate parameters from an encryption key for generating the Sudoku matrix. In some embodiments of encryption systems, an encryption system is implemented in hardware, e.g., in a system comprising a circular register configured to generate a Sudoku matrix and a functionality to transform a plaintext with the Sudoku matrix.

In an additional aspect of the technology relating to Sudoku matrices and arrays, herein are described embodiments of methods for generating a puzzle, wherein the methods comprise generating a Sudoku matrix according to the generation methods described and removing one or more elements from the Sudoku matrix to produce a puzzle. The puzzles are presented in various media in the following exemplary embodiments: for example, some embodiments provide presenting the puzzle on a printed medium, some embodiments comprise presenting the puzzle on a computer display, and some embodiments comprise presenting the puzzle as a three-dimensional manipulable object. Some embodiments comprise generating a Sudoku matrix comprising more than 2 dimensions and presenting the puzzle in a virtual space. Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 1 is an example of a familiar 9×9 Sudoku.

FIG. 2 is an embodiment of a two-dimensional 25×25 Sudoku.

FIG. 3 is an embodiment of a two-dimensional 36×36 Sudoku.

FIG. 5A shows an example of a familiar 9×9 Sudoku puzzle in an uncompleted state; FIG. 5B shows the solution to the Sudoku puzzle shown in FIG. 5A.

FIG. 9(a) shows the plaintext image; FIG. 9(b) shows the ciphertext that results from applying Sudoku whitening to the image of FIG. 9(a) using a 16×16 Sudoku matrix; FIG. 9(c) shows the ciphertext that results from applying Sudoku whitening to the image of FIG. 9(a) using a 64×64 Sudoku matrix; FIG. 9(d) shows the ciphertext that results from applying Sudoku whitening to the image of FIG. 9(a) using a 256×256 Sudoku matrix.

FIG. 10(a) shows the plaintext image and FIGS. 10(b) through 10(i) show the bit-plane decompositions for the $MSB_1$ through the $MSB_8$.

FIG. 11(a) shows the plaintext "Cameraman" image. FIG. 11(b) shows the histogram for the plaintext image. FIG. 11(c) shows the ciphertext from Sudoku whitening the plaintext $MSB_1$ of FIG. 10. FIG. 11(d) shows the ciphertext from Sudoku whitening the plaintext $MSB_{1-2}$ of FIG. 10. FIG. 11(e) shows the ciphertext from Sudoku whitening the plaintext $MSB_{1-3}$ of FIG. 10. FIG. 11(f) shows the ciphertext from Sudoku whitening the plaintext $MSB_{1-4}$ of FIG. 10. FIG. 11(g) shows the histogram of FIG. 11(c). FIG. 11(h) shows the histogram of FIG. 11(d). FIG. 11(i) shows the histogram of FIG. 11(e). FIG. 11(j) shows the histogram of FIG. 11(f). FIG. 11(k) shows the ciphertext from Sudoku whitening the plaintext $MSB_{1-5}$ of FIG. 10. FIG. 11(l) shows the ciphertext from Sudoku whitening the plaintext $MSB_{1-6}$ of FIG. 10. FIG. 11(m) shows the ciphertext from Sudoku whitening the plaintext $MSB_{1-7}$ of FIG. 10. FIG. 11(n) shows the ciphertext from Sudoku whitening the plaintext $MSB_{1-8}$ of FIG. 10. FIG. 11(o) shows the histogram of FIG. 11(k). FIG. 11(p) shows the histogram of FIG. 11(l). FIG. 11(q) shows the histogram of FIG. 11(m). FIG. 11(r) shows the histogram of FIG. 11(n).

FIG. 12(a) shows the plaintext image; FIG. 12(b) shows the ciphertext resulting from the Sudoku transposition of the plaintext using a 16×16 Sudoku matrix; FIG. 12(c) shows the ciphertext resulting from the Sudoku transposition of the plaintext using a 64×64 Sudoku matrix; FIG. 12(d) shows the ciphertext resulting from the Sudoku transposition of the plaintext using a 256×256 Sudoku matrix.

FIG. 13 shows unitary permutation matrices associated with a Sudoku reference matrix. FIG. 13(a) shows an exemplary reference matrix. FIG. 13(b) through FIG. 13(e) show the unitary permutation matrices for the digits 1 through 4, respectively, of the associated reference matrix of FIG. 13(a). FIG. 13(f) shows the unitary permutation matrix that is the product of the two unitary permutation matrices shown in FIGS. 13(b) and 13(c).

FIG. 14(a) shows the plaintext "Cameraman" image. FIG. 14(b) shows a reference Sudoku matrix S. FIG. 14(c) through FIG. 14(e) show the ciphertext matrix products $PU_{100}$, $U_{100}P$, and $U_{100}PU_{100}$ that result from shuffling the plaintext of FIG. 14(a) using the unitary permutation matrix associated with the digit 100 in the reference Sudoku matrix of FIG. 14(b). FIG. 14(f) through FIG. 14(h) show the ciphertext matrix products $PU_{200}$, $U_{200}P$, and $U_{200}PU_{200}$ that result from shuffling the plaintext of FIG. 14(a) using the unitary permutation matrix associated with the digit 200 in the reference Sudoku matrix of FIG. 14(b).

FIG. 15(a) shows the plaintext image. FIG. 15(a) through FIG. 15(f) show the ciphertexts that result from row shuffling; column shuffling; block shuffling; row & column shuffling; and row, column, & block shuffling.

FIG. 16 shows systems of notation for addressing elements of a 4×4 Sudoku matrix. FIG. 16(a) shows a reference Sudoku. FIG. 16(b) shows (r, c) notation; FIG. 16(c) shows (c, r) notation; FIG. 16(d) shows (r, d) notation; FIG. 16(e) shows (c, d) notation; FIG. 16(f) shows (b, d) notation; FIG. 16(g) shows (d, r) notation; FIG. 16(h) shows (d, c) notation; FIG. 16(i) shows (d, b) notation;

FIG. 17(a) shows the plaintext image; FIG. 17(b) through FIG. 17(l) show the ciphertexts that result from the mappings (b): (r, c)→(r, d); (c): (r, c)→(d, c); (d): (d, b)→(r, d); (e): (d, b)→(c, d); (f): (d, b)→(b, d); and (g): (b, d)→(d, b); and ordered combinations thereof, (h): (b) and (c); (i): (d) and (f); (j): (c) and (b); (k): (b) and (g); and (l): (c), (c), and (e).

FIG. 18 shows examples of maximum distance separable (MDS) matrices. FIG. 18(a) through FIG. 18(h) shows examples of Sudoku MDS matrices and FIG. 18(i) shows an AES-MDS matrix.

FIG. 19 shows a 4×4 Sudoku matrix and its associated Markov transition matrix. FIG. 19(a) is an example of a reference Sudoku matrix generated dynamically with an encryption key; FIG. 19(b) is the associated normalized (doubly stochastic) Sudoku matrix; FIG. 19(c) is the Markov transition matrix derived from the doubly stochastic matrix of FIG. 19(b).

FIG. 25A and FIG. 25C are two plaintext images. FIG. 25B is the ciphertext of FIG. 25A and FIG. 25D is the ciphertext of FIG. 25C.

FIG. 26(a) is a sample plaintext linear image; FIG. 26(b) is the Sudoku reference matrix; FIG. 26(c) is the ciphertext that results from applying the mapping matrix of FIG. 26(b) to the plaintext image of FIG. 26(a).

FIG. 27(a) is a plaintext image; FIG. 27(b) shows the ciphertext that results from applying a 16×16 reference Sudoku matrix to the plaintext for 1 iteration (d=0.4830); FIG. 27(c) shows the ciphertext that results from applying a 64×64 reference Sudoku matrix to the plaintext for 1 iteration (d=0.6669); FIG. 27(d) shows the ciphertext that results from applying a 256×256 reference Sudoku matrix to the plaintext for 1 iteration (d=0.8312); FIG. 27(e) shows the ciphertext that results from applying a 16×16 reference Sudoku matrix to the plaintext for 3 iterations (d=0.6167); FIG. 27(f) shows the ciphertext that results from applying a 16×16 reference Sudoku matrix to the plaintext for 10 iterations (d=0.8156). d=degree of disorder=std(original image−shuffled image)/std(original image).

FIG. 28(a) shows the plaintext FIG. 28(b) shows the image encrypted using the Sudoku methods provided herein; FIG. 28(c) shows the decrypted image.

FIG. 29(a) shows the plaintext FIG. 29(b) shows the image encrypted using the Sudoku methods provided herein; FIG. 29(c) shows the decrypted image.

FIG. 30(a) shows the plaintext FIG. 30(b) shows the image encrypted using the Sudoku methods provided herein; FIG. 30(c) shows the decrypted image.

FIG. 31(a) shows the plaintext; FIG. 31(b) shows the image encrypted using the Sudoku methods provided herein; FIG. 31(c) shows the decrypted image.

FIG. 32(a) shows the plaintext "Cameraman" image; FIG. 32(b) shows the histogram of FIG. 32(a). FIG. 32(c) shows the plaintext "Lenna" image and FIG. 32(d) shows the histogram of FIG. 32(c). FIG. 32(e) shows the ciphertext of FIG. 32(a) and FIG. 32(f) shows the histogram of the ciphertext shown in FIG. 32(e). FIG. 32(g) shows the ciphertext image of FIG. 32(c) and FIG. 32(h) shows the histogram of FIG. 32(g). FIG. 32(i) shows the plaintext "Peppers" image. FIG. 32(j), FIG. 32(k) and FIG. 32(l) show the histograms of the red, green, and blue components, respectively, from the image of FIG. 32(i); FIG. 32(m) shows the encrypted ciphertext of the image shown in FIG. 32(i); FIG. 32(n), FIG. 32(o), and FIG. 32(p) show the histograms of the red, green, and blue components, respectively, from the encrypted ciphertext of FIG. 32(m).

FIG. 34(a) shows the ciphertext encrypted with the key=[0.8239, 3.6511, 4, 12]; FIG. 34(b) shows the ciphertext decrypted with the key=[0.8239, 3.6511, 4, 12]; FIG. 34(c) through FIG. 34(f) show the ciphertext decrypted with keys that vary slightly from the keys used in FIG. 34(a) and FIG. 34(b) for encryption: [0.8240, 3.6511, 4, 12], [0.8239, 3.6512, 4, 12]; [0.8239, 3.6511, 5, 12], and [0.8239, 3.6511, 4, 13], respectively.

FIG. 37(a) shows the plaintext image and FIG. 37(b) through FIG. 37(i) show the ciphertext after 1, 2, 3, 4, 5, 6, 7, and 8 rounds (iterations) of Sudoku substitution, respectively.

FIG. 38(a) shows the plaintext. FIG. 38(b) and FIG. 38(c) show the ciphertext of FIG. 38(a) using two encryption keys $K_1$ and $K_2$. FIG. 38(d) shows the difference between the ciphertexts of FIG. 38(b) and FIG. 38(c). The histogram of each image is shown below the image.

FIG. 39 shows the results for r=10 (10 rounds or 10 iterations).

FIG. 41(a) shows the NPCR and UACI percentage scores directly and FIG. 41(b) is the logarithm version of FIG. 41(a).

DETAILED DESCRIPTION

Sudoku

The name Sudoku is the abbreviation of the Japanese phrase Sunji wa dokushin ni kagiru, which means "the digits must remain single". Conventionally, Sudoku refers to a number-based puzzle consisting of a 9×9 grid divided into nine 3×3 blocks (in some literature, this 3×3 block is referred as a box or square). The objective is to place the digits 1 through 9 into the grids, such that there is no repeated digit for each row, each column, and each block (see, e.g., FIG. 1).

Sudoku puzzles and their variants have become extremely popular in the last decade, and can now be found daily in most major U.S. newspapers. Sudoku was popularized in 1986 by the Japanese puzzle company Nikoli. The total number of different Sudoku solutions is $6.67×10^{21}$. In the past, efforts have focused on how to generate, solve, and rate the Sudoku puzzle with maximum efficiency.

In addition, the Sudoku puzzle/matrix has recently been used for image security (data hiding and encryption). For example, Shirali-Shahreze et al. applied Sudoku solutions for encrypting text messages sent by short message service (SMS) (M. H. Shirali-Shahreza and M. Shirali-Shahreza, "Steganography in SMS by Sudoku Puzzle", *Proceedings of the 6th ACS/IEEE International Conference on Computer Systems and Applications* (AICCSA 2008), 844-847). They used a 9×9 Sudoku matrix and hid data in one row or one column of the puzzle. Unless one solved the puzzle and knew the exact row number or column number, one could not retrieve the correct digit sequence. In addition, Chang et al. modified Mielikainen's Least Significant Bit (LSB) matching method (Chang et al., "An Information Hiding Scheme Using Sudoku", 2008, *Proceedings of the 3rd International Conference on Innovative Computing Information and Control,* 17) by using a selected Sudoku solution as a reference matrix for embedding secret data. Later, Hong et al ("Steganography Using Sudoku Revisited", 2008, *Intelligent Information Technology Application, Second International Symposium on,* 935-939; "A Minimal Euclidean Distance Searching Technique for Sudoku Steganography" 2008, *Information Science and Engineering, International Symposium on,* 515-518) improved Chang's approach by applying the searching idea of minimal Euclidean distance.

Figure 2:
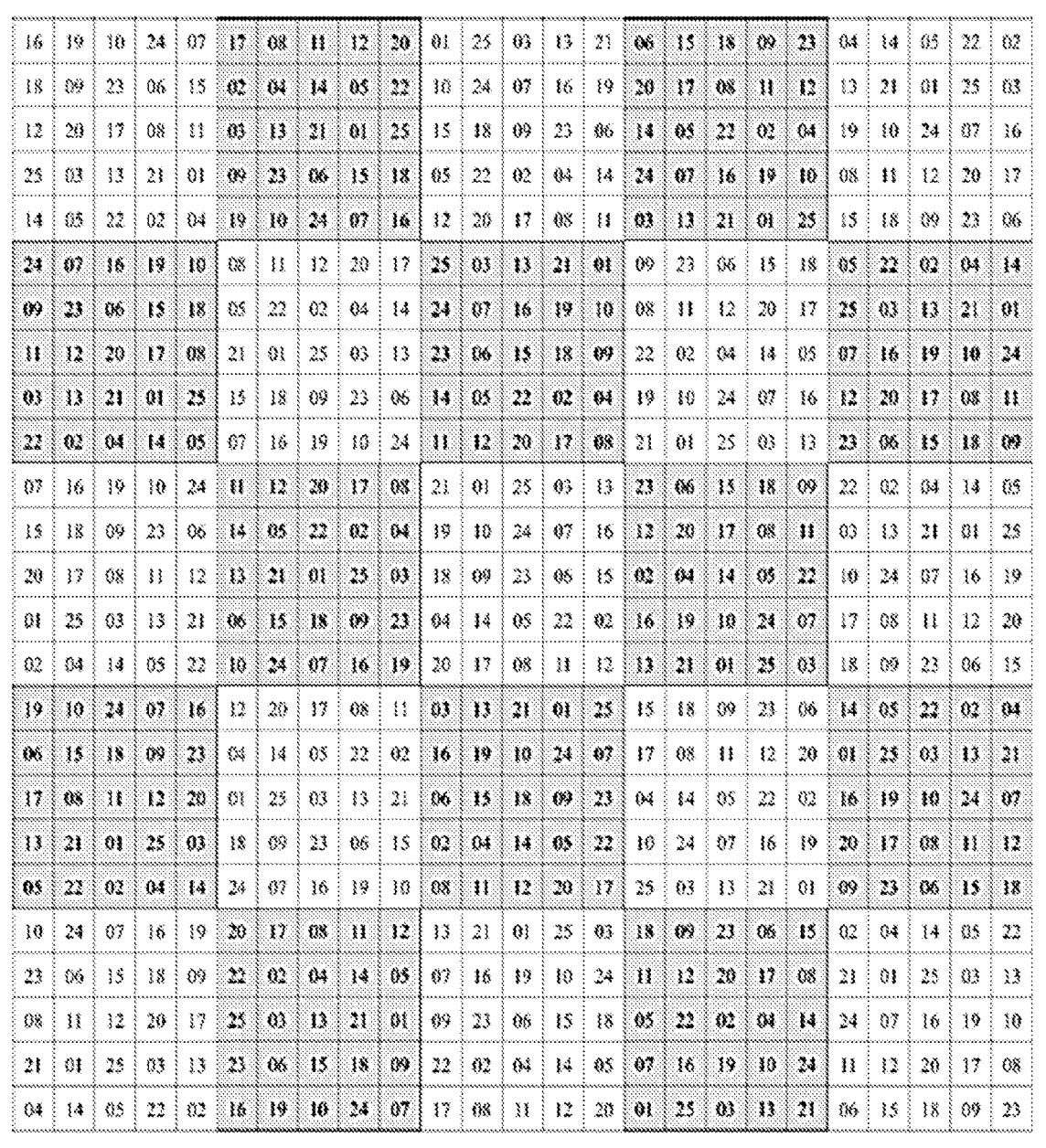
Figure 3:
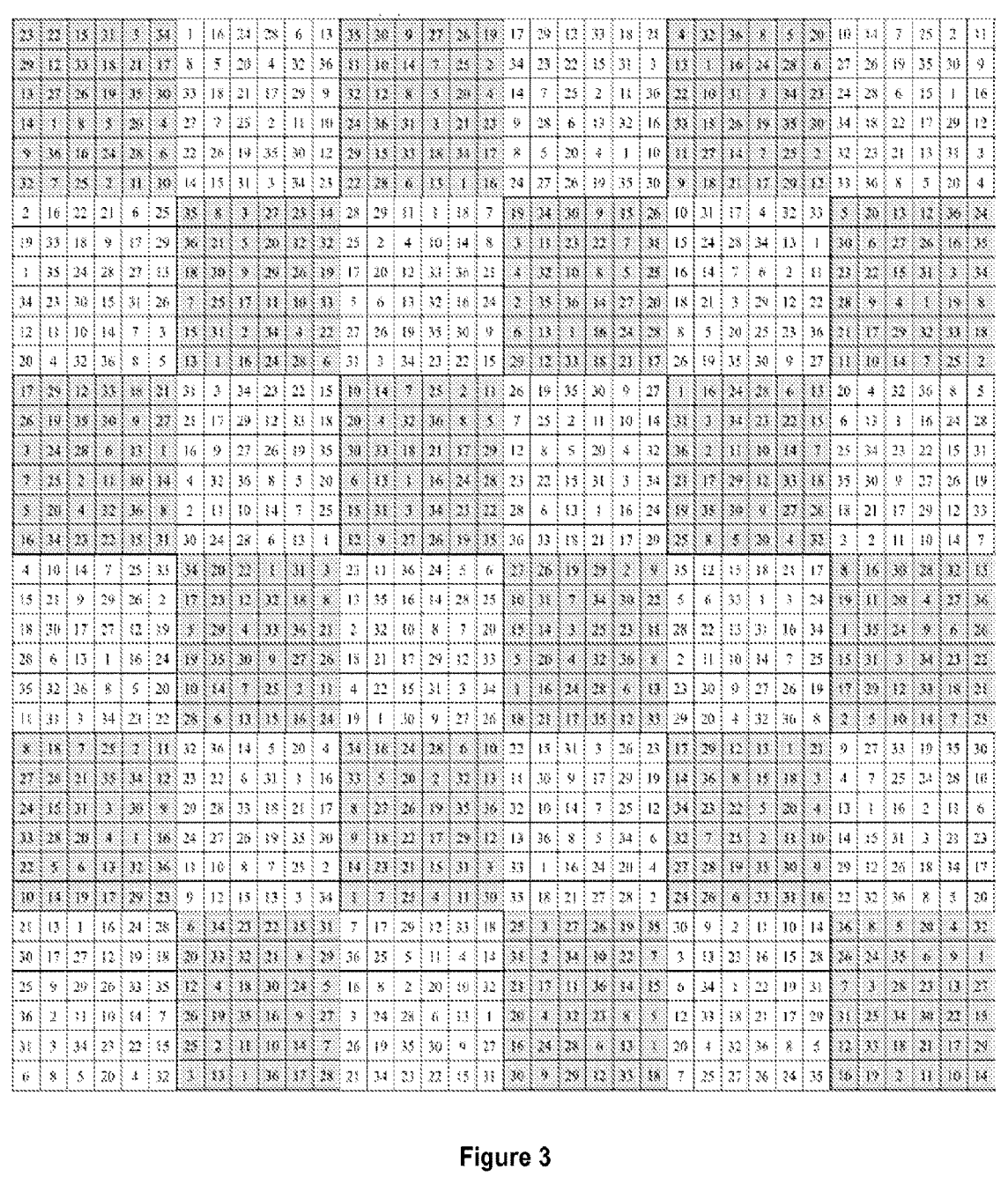
Figure 4:
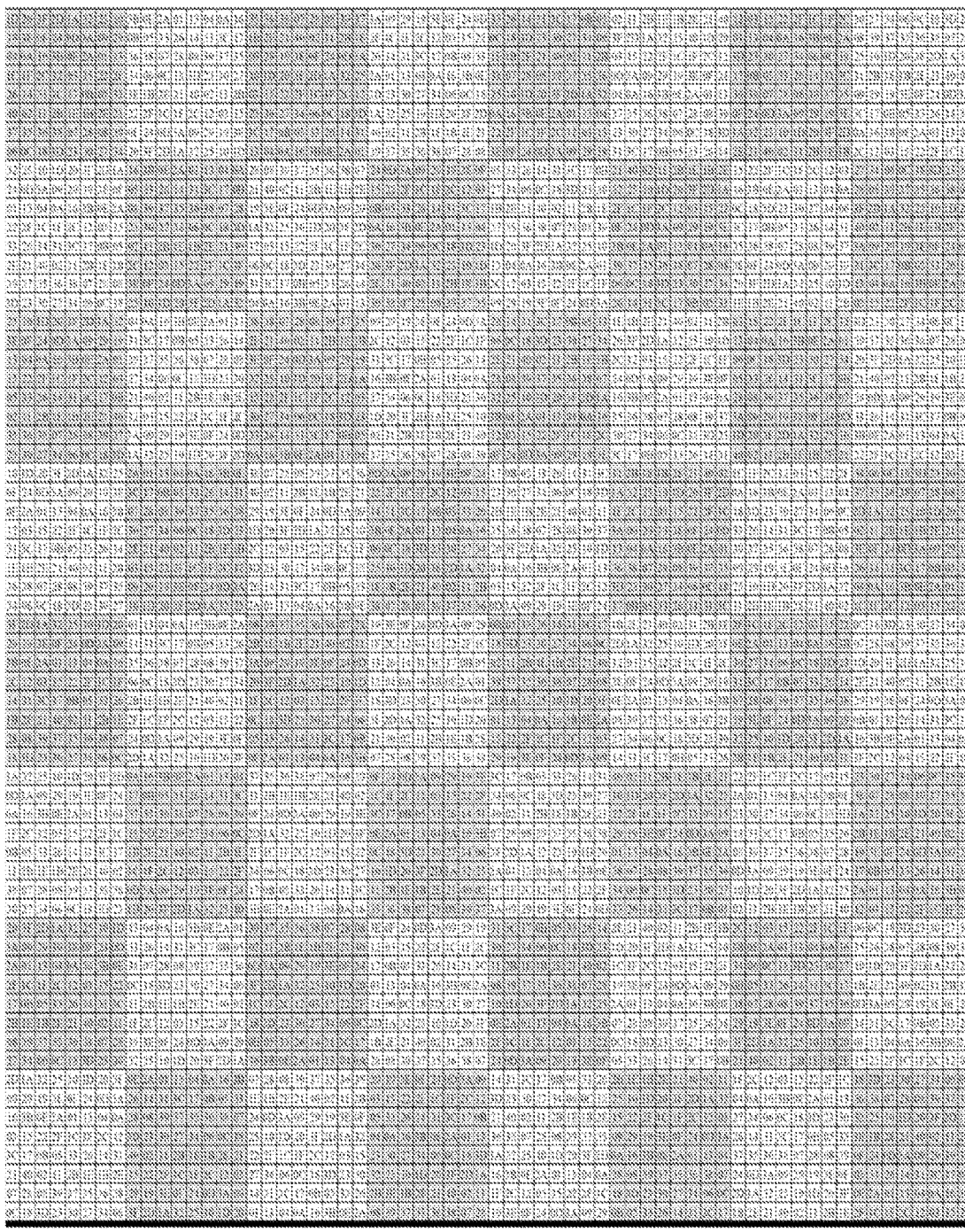
FIG. 4 is an embodiment of a two-dimensional 64×64 Sudoku.

In contrast to the conventional technologies, the technology described herein provides methods and systems for generating two- and multi-dimensional Sudoku arrays of any arbitrary size (e.g., a 4×4, a 9×9, a 25×25, a 36×36, 64×64, a $n^2×n^2$ two-dimensional Sudoku array; see, e.g., FIGS. 2-4). In some aspects, the technology comprises an image encryption scheme based on the Sudoku array. Instead of using an unfinished Sudoku puzzle, which is employed by conventional Sudoku-based encryption algorithms, a full solution to a Sudoku puzzle, e.g., a Sudoku matrix, is used to encrypt images. In addition, the concept of a Sudoku matrix is broadened from the familiar 9×9 to any N×N matrix, where N is some square number. Indeed, the concept is further broadened to any multidimensional N×N . . . ×N array or matrix in which each N×N two-dimensional slice of the multidimensional Sudoku has the required qualities of a two-dimensional Sudoku array.

Some embodiments of the technology comprise the use of an algorithm to generate a random-like Sudoku matrix for use as a reference matrix. By changing the pixel values and positions according to the Sudoku reference matrix, the histogram after encryption is dramatically changed compared to the original one. Furthermore, with the property of the Sudoku matrix that no two digits in the same block can be aligned in the same row, column, or box, the input image can be scrambled to a desired output. Therefore, no two pixels originally in the same block will be in the same row, or the same column, or the same box in the output.

Figure 5:
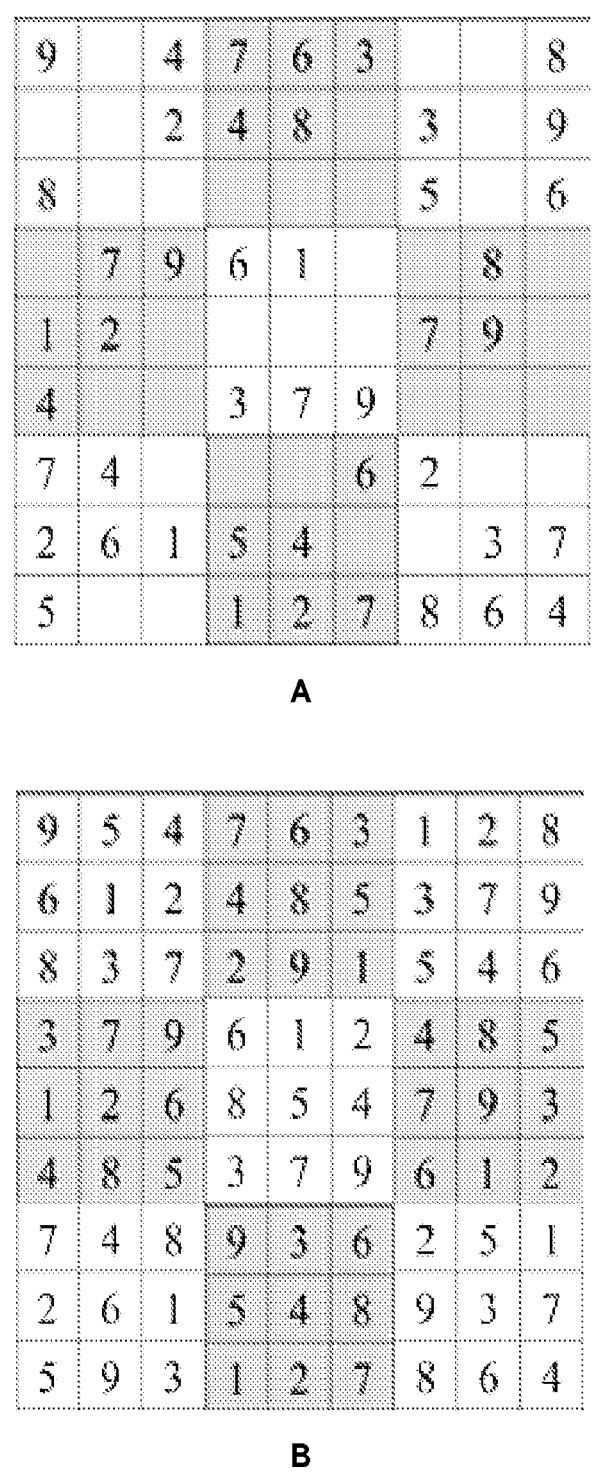

The presented processes can be used to encrypt images such as color images, grayscale images, binary images, etc., as well as grayscale and color video. The security key is selective and has a very large number space. The technology finds use in generating a Sudoku puzzle, e.g., as shown in unsolved (FIG. 5(*a*)) and solved forms (FIG. 5(*b*)). Puzzle embodiments have any arbitrary number of dimensions and each N×N slice in two dimensions has the characteristic restraints of a Sudoku array.

Definitions

To facilitate an understanding of the present technology, terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

Figure 6:
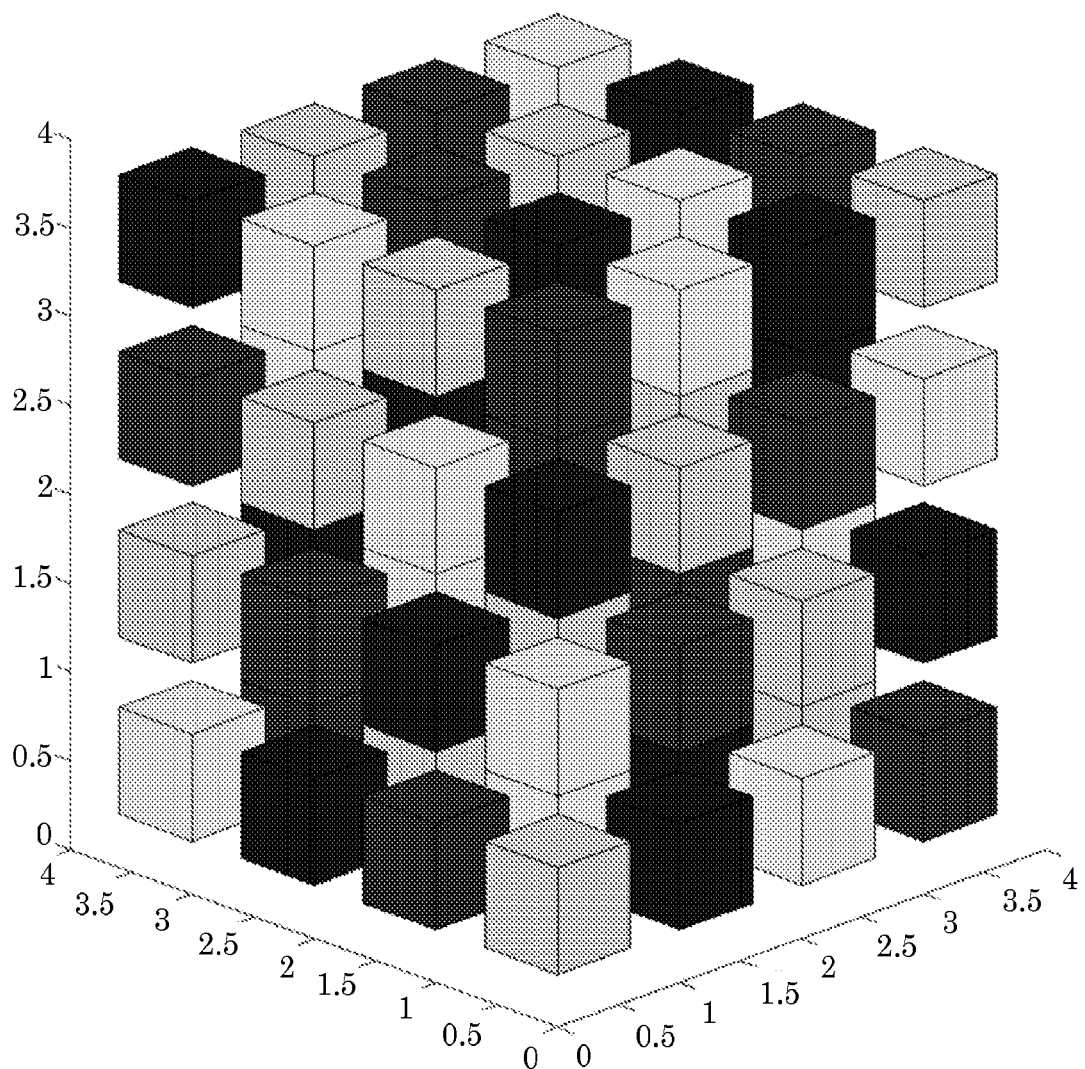
FIG. 6 is a representation of an embodiment of a 4×4×4 Sudoku
Figure 7:
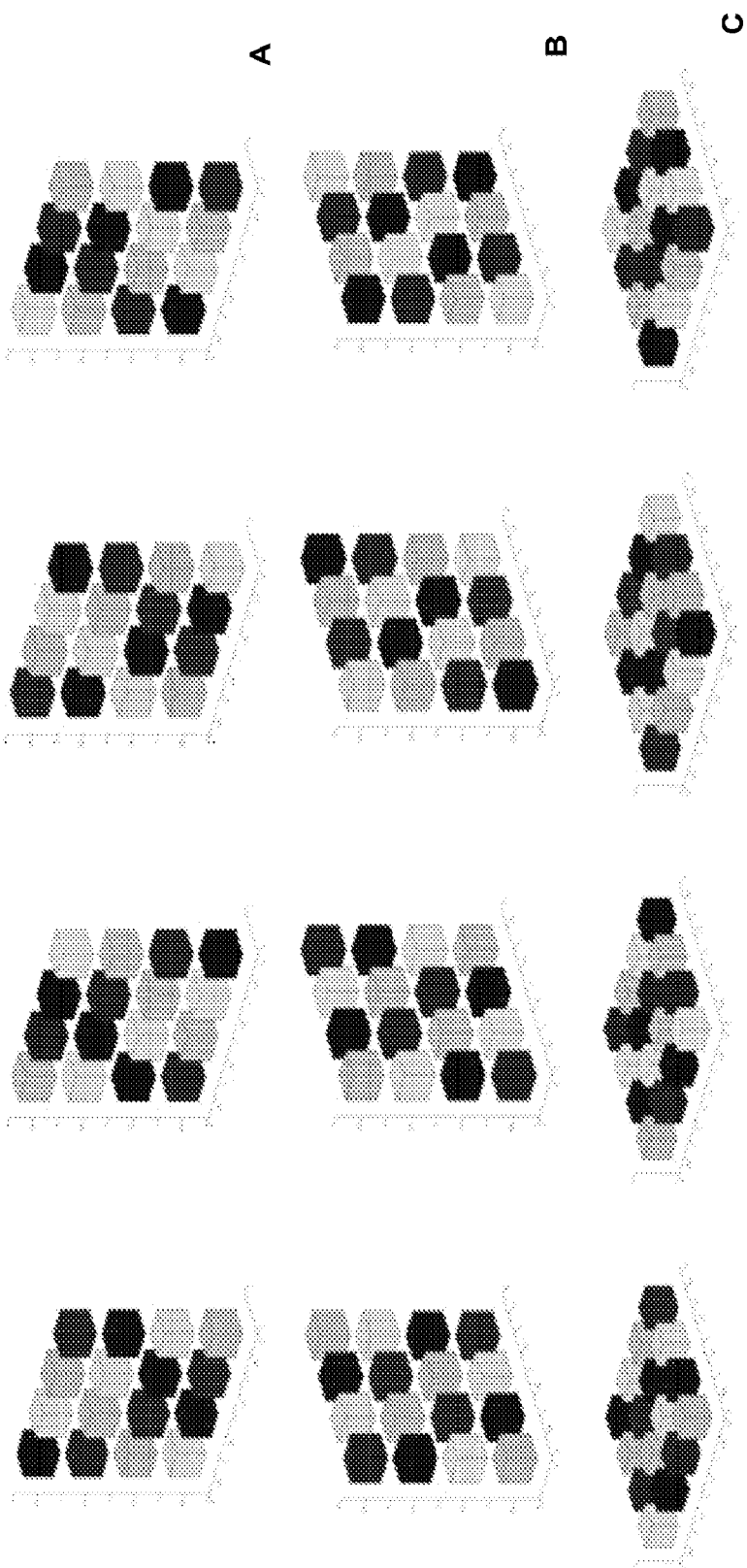
FIG. 7 shows two-dimensional 4×4 slices from the 4×4×4 Sudoku shown in FIG. 6.
Figure 8:
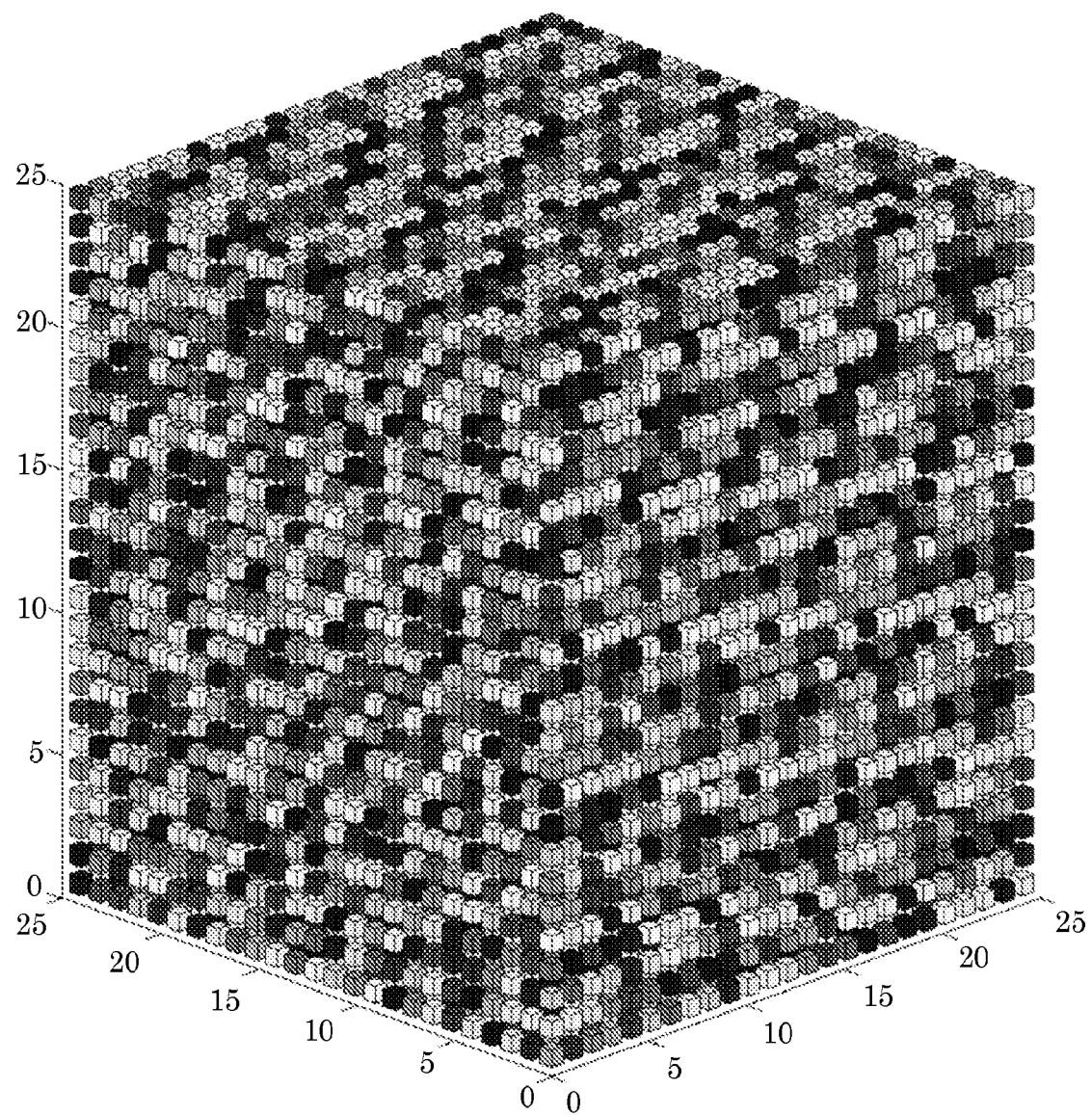
FIG. 8 is a representation of an embodiment of a 25×25× 25 Sudoku

As used herein, the term "Sudoku" refers to a N×N× . . . ×N array of only N distinctive symbols (e.g., letters, numbers, colors, shapes, etc.) where N is any integer and each row contains exactly one of each of the N distinctive symbols, each column contains exactly one of each of the N distinctive symbols, and each b×b (where $N=b^2$) block contains exactly one of each of the N distinctive symbols. The symbol S is used herein to refer to a Sudoku array. Each N×N two-dimensional slice of a N×N× . . . ×N Sudoku array S is a two-dimensional Sudoku. Embodiments of 4×4×4 and 25×25×25 Sudoku arrays are shown in FIGS. 6 and 8, respectively. FIG. 7 shows 4×4 slices from the 4×4×4 array shown in FIG. 6. In the case when the symbol set containing N distinctive symbols is the set {1, 2, 3, 4, 5, 6, 7, 8, 9}, a Sudoku array is also a "Sudoku matrix". When N=9, then the Sudoku matrix is the solution to a familiar Sudoku puzzle(s).

As used herein, the term "two-dimensional Sudoku" is a N×N array. For example, a familiar type of Sudoku puzzle is one particular instance of a two-dimensional Sudoku where N=9 and b=3, and the symbol set is the set of integers 1, 2, 3, 4, 5, 6, 7, 8, and 9 (e.g., as depicted in FIG. 1). A two-dimensional Sudoku is not limited to the familiar 9×9 type, but may be any size. For example, a 25×25 Sudoku, a 36×36 Sudoku, and a 64×64 Sudoku are shown in FIGS. 2-4.

As used herein, the term "grid" refers to a cell or square, either filled or empty, in a Sudoku puzzle or Sudoku array. There are 81 grids in the familiar 9×9 type of Sudoku.

As used herein, the term "element" is an alternative way of referring to a grid and/or the content (e.g., symbol, letter, number, color, etc.) of a grid, e.g., when a Sudoku array S is a matrix. For such a matrix, S(i; j) denotes the Sudoku element located at the intersection of the ith row and jth column in S.

As used herein, a "row" is a 1×N array of Sudoku elements in S. S(i; :) denotes the Sudoku elements of the ith row in S.

As used herein, a "column" is a N×1 array of Sudoku elements in S. S(:, j) denotes the Sudoku elements of the jth column in S.

As used herein, a "block" is a b×b square of Sudoku elements in S, where $N=b^2$. In the familiar Sudoku, a "block" refers to a 3×3 sub-array of the main puzzle in which all of the numbers must appear exactly once in a solution.

As used herein, a "band" is a b×N array of Sudoku elements in S, which covers exactly b blocks.

As used herein, a "stack" is a N×b array of Sudoku elements in S, which covers exactly b blocks.

As used herein, a "puzzle" is a partially filled in Sudoku. See, e.g., FIG. 5(a). In some contexts, the solution to a Sudoku puzzle is a Sudoku matrix. Conversely, Sudoku puzzles are normally generated from a Sudoku matrix by removing some elements but keeping some hints for unique solution.

As used herein, the term "key" refers to a piece of information that determines the functional output of a cryptographic algorithm or cipher. A key specifies the particular transformation of plaintext into ciphertext and the reverse transformation of ciphertext into plaintext during decryption.

As used herein, "diffusion" refers to the property that redundancy in the statistics of the plaintext is dissipated in the statistics of the ciphertext. Non-uniformity in the distribution of pixels in the plaintext is redistributed into non-uniformity in the distribution of much larger structures of the ciphertext, which is much harder to detect. Moreover, "diffusion" means that the output bits depend on the input bits in a very complex way. Accordingly, in a cipher with good diffusion, if one bit of the plaintext is changed, then the ciphertext should change nearly completely in an unpredictable or pseudorandom manner.

As used herein, "confusion" refers to making the relationship between the key and the ciphertext as complex and involved as possible.

As used herein, an "S-box" or "Substitution box" refers to a basic component of symmetric key algorithms to perform substitution. A conventional S-Box takes some number of input bits m and transforms them into some number of output bits n. An m×n S-Box can be implemented as a lookup table with 2m words of n bits each. Fixed tables are normally used, as in the Data Encryption Standard (DES), but in some ciphers the tables are generated dynamically from the key, e.g., in the Blowfish and the Twofish encryption algorithms.

As used herein, the term "Rijndael" refers to being associated with the AES encryption scheme.

As used herein, a "permutated sequence" is an ordered set of elements (e.g., symbols, digits, characters, letters, etc.). A "permutated sequence" may be thought of as an "ordered sequence". A "permutation" of a sequence has the same elements as the sequence in a different order.

Embodiments of the Technology

Provided herein is technology for generating a Sudoku array efficiently. In particular, aspects of the technology relate to generating a Sudoku array for constructing a Sudoku puzzle or to encrypt data, e.g., image or video data. The methods and systems provided find use in generating two-dimensional (e.g., N×N) Sudoku arrays and Sudoku arrays of more dimensions, e.g., N×N×N, N×N×N×N, . . . N×N× . . . ×N arrays (e.g., a $N(\times N)_m$ array having (m+1) dimensions). The technology relates to methods for generating a Sudoku array, which in some embodiments comprises the use of a cryptographic key. Additional embodiments relate to using the Sudoku array to construct a Sudoku puzzle (e.g., a multi-dimensional Sudoku puzzle) or to encrypt and decrypt data. Puzzle embodiments find application in computer based games such as an application on a mobile gaming device, on a personal computer, or as served to the user through a web page.

Conventional technologies have generated Sudoku arrays, matrices, and puzzles in many different ways. See, e.g., T. Mantere and J. Koljonen, "Solving, rating and generating Sudoku puzzles with GA" (2007) in *Proc. IEEE Congress on Evolutionary Computation*, 1382-1389; T. K. Moon et al. "Sinkhorn Solves Sudoku" (2009), *IEEE Transactions on Information Theory*, 55(4): 1741-1746; S. Baochen et al. "A New Algorithm for Generating Unique-Solution Sudoku," (2008) icnc 7: 215-217, Fourth International Conference on Natural Computation, herein incorporated by reference in their entireties for all purposes.

In some embodiments, the systems and methods herein employ the Latin square method to generate a Sudoku matrix, although the invention is not limited by this method. A Latin square is a Y×Y array filled with Y different symbols in such a way that each symbol occurs exactly once in each row and exactly once in each column. Since the Latin square does not have the further Sudoku-related constraint that the symbols are also not to be repeated within each block, a Latin square could be considered to be a simplified version of a Sudoku array or matrix. In other words, a completed Sudoku grid is a special type of Latin square with the additional property that there are no repeated numbers (or symbols) in any of the 9 blocks of contiguous 3×3 cells in the particular instance of the familiar 9×9 Sudoku, although the constraint applies to Sudoku matrices and arrays of any size.

In one aspect, the technology described relates to encryption using Sudoku arrays and matrices. In some embodiments described herein to illustrate particular aspects of the technology, methods and systems are described for encrypting an image or video. However, it should be understood that the invention is not limited to such examples. In some embodiments, the systems and methods encrypt an image using a three-stage process. In the first stage, a reference Sudoku matrix is generated as the foundation for the encryption and scrambling processes. The image pixel intensities are then changed by using the reference Sudoku matrix values and then the pixel positions are shuffled using the Sudoku matrix to indicate a mapping process. This method efficiently encrypts a variety of digital images, such as binary images, gray images, and RGB images without any quality loss. In some embodiments, the security keys of the processes described are combinations of the parameters in a 1-dimensional chaotic logistic map, a parameter to control the size of the Sudoku Matrix, and the number of iteration times desired for scrambling. Keys based on other random and pseudo-random algorithms are also described, e.g., a linear congruential generator. The keys are used to generate parameters for the Sudoku matrix generator. The possible security key space is extremely large. Embodiments of the technology are presented as applied to provide security for images and video. Although the disclosure herein refers to certain illustrated embodiments, it is to be understood that these embodiments are presented by way of example and not by way of limitation. For example, the technology finds use in encrypting audio, text, and other forms of data.

Soduko Generator

In one aspect, the technology relates to a fast Sudoku generator. In particular, the technology relates to methods and systems for generating Sudoku arrays efficiently. In particular, a parametric Sudoku generator is described that uses Latin square expansion and permutation. As an illustrative example provided below, the Sudoku generator is used to generate a 9×9 array from an input parameter set.

Also described is an embodiment of an encryption-dependent Sudoku generator based on a series of linear congruential generators.

Parametric Sudoku Array Generator

A discussed above, a Sudoku matrix is a special type of Latin square with extra constraints in the blocks. Therefore, it is possible to generate a Sudoku matrix from a Latin square. Algorithm 1 describes a simple Latin square generator (LSG) based on permutation sequences. Algorithm 2 describes the parametric Sudoku array generator. As used below, an index set E is called the first equivalent set for rows $R^1$ and $R^2$ of a N×N Sudoku matrix if: 1) set E contains index 1; 2) for any index i that is an element of set E, there always exists an index j that is a member of set E, such that $R^1[i]=R^2[j]$; and set E is the set satisfying the above two conditions with the least number of elements.

Algorithm 1 (Latin Square Generator)

Input
  X = a permutated sequence of digits from 1 to n
  H = a permutated sequence of digits from 1 to n
Output
  L = a Latin square with digits from 1 to n
for l = 1 to n do
  L(l, :) = ringShift(X, H(l)) {Ring Shift sequence X with H(l) units to the left}
end for Algorithm 2 (Parametric Sudoku Array Generator)

Input:
  A = a N symbol array without repetition
  F = a permutated sequence of digits from 1 to N
  D = a permutated sequence of digits from 1 to b
  $H_F$ = a b × b matrix where each column is a permutation of digits from 1 to N
  $H_D$ = a permutated sequence of digits from 1 to b
  P = a b × b matrix where each column is a permutation of digits from 1 to b
  Q = a b × b matrix where each column is a permutation of digits from 1 to b
  W = a b × b × 2 matrix containing digits from 1 to b
Output:
  S = a Sudoku array with the symbols specified in A
Step 1. Create the seed Latin square using the Latin square generator of Algorithm 1, e.g., $L_{seed}$ = LSG(D, $H_D$).
Step 2. Divide the sequence F into b pieces as $F_1, F_2, \ldots, F_b$, each with b digits. For each piece, create a Latin square $L_k$ = LSG($F_k$, $H_F$ (:, k)).
Step 3. Substitute the digit k in $L_{seed}$ with the corresponding kth Latin square $L_k$ and form the raw Sudoku R.
Step 4. Form the mapping matrix M = P + T, where T is a b × b structured $$\text{matrix of the form } T = \begin{pmatrix} 0 \cdot b & 1 \cdot b & \ldots & (b-1) \cdot b \\ \vdots & \vdots & \ddots & \vdots \\ 0 \cdot b & 1 \cdot b & \ldots & (b-1) \cdot b \end{pmatrix}. \text{ Extract elements of}$$

M along rows and form a permutation sequence U.
Step 5. Shuffle the initial raw Sudoku R along rows with respect to the permutation sequence U and form the Sudoku matrix S.
Step 6. Shuffle each b rows with respect to the indices in the columns of Q.
Step 7. Swap the first equivalent sets of b pairs $R_k^1$ and $R_k^2$ within the kth band, where the row index pair of $R_k^1$ and $R_k^2$ are determined by W(k, i, 1) and W(k, i, 2). (See details in Algorithm 3).
Step 8. Substitute the kth digit in S with the kth symbol in array A.

Algorithm 3 (Band Swapping Algorithm)

Input:
  $R_k^1$ = the 1st selected row in the kth band of a N× N Sudoku
  $R_k^2$ = the 2nd selected row in the kth band of a N× N Sudoku
Output:
  $R_k^1$ and $R_k^2$
r1 = $R_k^1$[1]; r2 = $R_k^2$[1];
E = [1];
if r1 ≠ r2 then
  while setdiff(r1, r2) ≠ 0 & setdiff(r2, r1) ≠ 0 do
    E[end+1] = find($R_k^1$ == r2[end]);
    r1[end+1] = $R_k^2$[E[end]];
    r2[end+1] = $R_k^1$[E[end]];
  end while
  Temp = $R_k^1$[E]; $R_k^1$[E] = $R_k^2$[E]; $R_k^2$[E] = Temp;
  $R_k^1$ ↔ $R_k^2$ {swap two rows}
end if The Sudoku array generator generates a Sudoku array of arbitrary (e.g., any user-defined) size with respect to the number of elements and/or dimensions. Moreover, the Sudoku arrays are random-like and are made more random-like by applying more swaps of Step 7. While generating a true random Sudoku matrix is a NP-complete problem and is time-consuming when the array is large, the Sudoku array generator provided herein according to the present technology generates large and/or multi-dimensional Sudoku arrays efficiently because it uses the structural characteristics of the Sudoku array and a limited number of swaps.

In addition, it is to be understood that any transformation or operation and/or rearrangement of a Sudoku array or matrix that applies to rows can be equivalently applied to columns, and vice-versa, by using a similar operation. For example, the Band Swapping Algorithm can be made into a Stack Swapping Algorithm by applying the algorithm's shuffling to columns and stacks rather than to rows and bands. As another example, the Ring Shift algorithm used to generate a Latin Square by shifting elements left also is found in embodiments wherein elements are shifted up, down, and/or right. In addition, one may apply any transformation or operation and/or rearrangement of a Sudoku array or matrix to a Sudoku array that has been rotated by 90° C. before applying the transformation or operation and/or rearrangement.

Sudoku-Based Cryptographic Primitives

A cryptographic primitive is a well-established, low-level cryptographic algorithm that forms a basic unit of a cryptographic scheme and/or system. Accordingly, cryptographic primitives are combined to provide the desired security for encrypted data. As described herein, the technology finds use in the development of several cryptographic primitives.

As used herein, $E_{tech}$ and $D_{tech}$ refer to the block-wise encryption and decryption operations using technique "tech", where $P_b$ and $C_b$ denote the plaintext message block and ciphertext message block, respectively, and S is the Sudoku matrix determined by the encryption K. In generic terms, the encryption and decryption processes provided herein are described and defined using the following notation:

$$E_{tech} := (P_b, S) \to C_b$$

$$D_{tech} := (C_b, S) \to P_b$$

wherein an encryption process $E_{tech}$ transforms an input plaintext $P_b$ into an output ciphertext $C_b$ using the Sudoku array S and a decryption process $D_{tech}$ transforms the ciphertext $C_b$ into the plaintext $P_b$ using the Sudoku array S.

In some embodiments, the block size adopted in encryption and decryption is the same as the size of the key-dependent Sudoku matrix S. In other words, if a plaintext message P has a size larger than S, then P is encrypted in chunks, one $P_b$ at a time and C is obtained by forming a number of $C_b$s. Encryption and decryption functions are written in terms of S rather than K for illustrating these relations in a more direct way.

Sudoku Whitening

In cryptography, key whitening is used as a technique to increase the security of a cipher. See, e.g., D. Stinson. *Cryptography: Theory and Practice.* (Chapman & Hall/CRC, 2006); A. Menezes, et al. *Handbook of Applied Cryptography* (CRC, 1997), incorporated herein by reference for all purposes. Whitening mixes a plaintext message with an encryption key for making a patterned plaintext message more random-like. In classical cryptography, the whitening technique is normally referred as the XOR (exclusive or) operation between a plaintext message and a key, and is commonly used, e.g., in DES, AES, and the Blowfish ciphers.

In the context of Sudoku, the key used for whitening, e.g., for binary data or multimedia data, is a key-dependent Sudoku matrix. This type of Sudoku matrix can be obtained via the Sudoku generator. Therefore, Sudoku whitening using XOR can be defined as $$E_{SP}: C_b = P_b \oplus (S \bmod 2)$$

$$D_{SP}: P_b = C_b \oplus (S \bmod 2)$$

where $\oplus$ denotes the XOR operation, "mod" is the modulo arithmetic operation (provides the remainder of division of one number by another), and the variables $P_b$, $C_b$, and S refer to the plaintext block, the ciphertext block, and the Sudoku matrix, respectively.

Figure 9:
FIG. 9 shows Sudoku whitening applied to a binary image.
Figure 9:
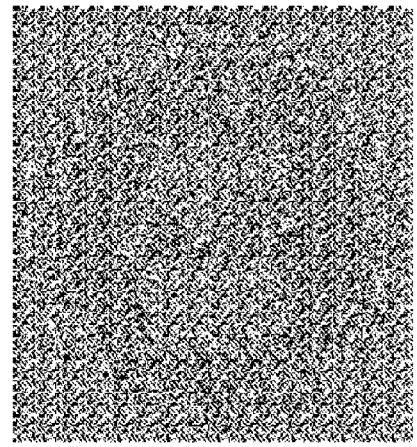
Figure 9:
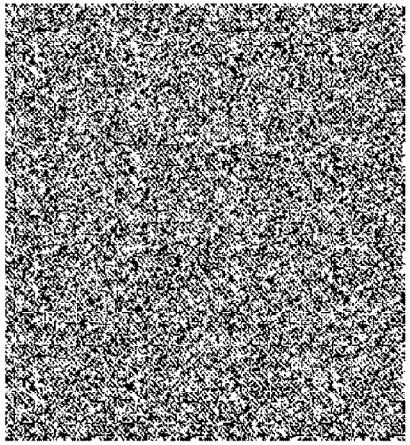
Figure 9:
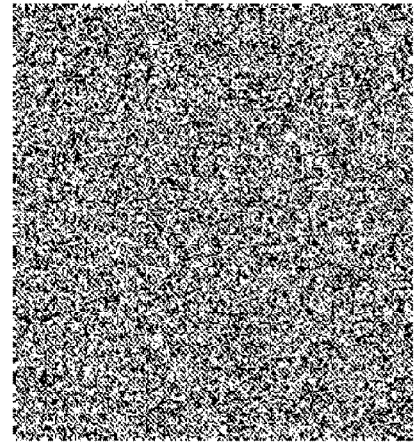

FIG. 9 shows Sudoku whitening applied to a sample binary image ("Tufts Logo") using different whitening block sizes. It is worthwhile to note that both P and C have the size of 256×256 and the Sudoku matrices chosen for whitening are of size 16×16, 64×64, and 256×256 for $C_1$, $C_2$, and $C_3$, respectively. After applying Sudoku whitening, the ciphertext message C is almost unrecognizable and very different from the plaintext message P.

Figure 10:
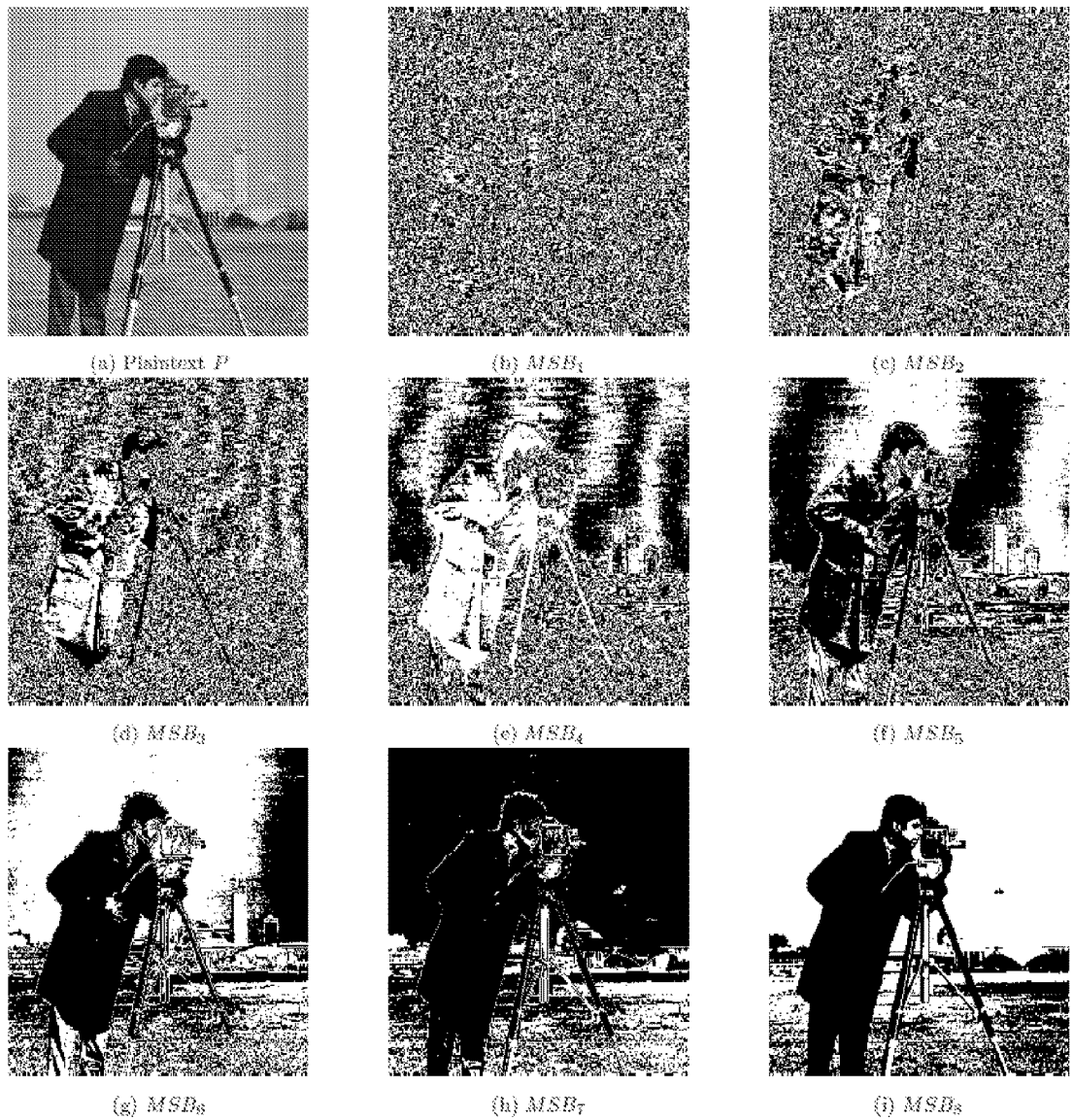
FIG. 10 shows the "Cameraman" image used to test embodiments of the technology provided herein and its bit-plane decompositions with respect to the bit order from the most significant bit (MSB) to the least significant bit.
Figure 11:
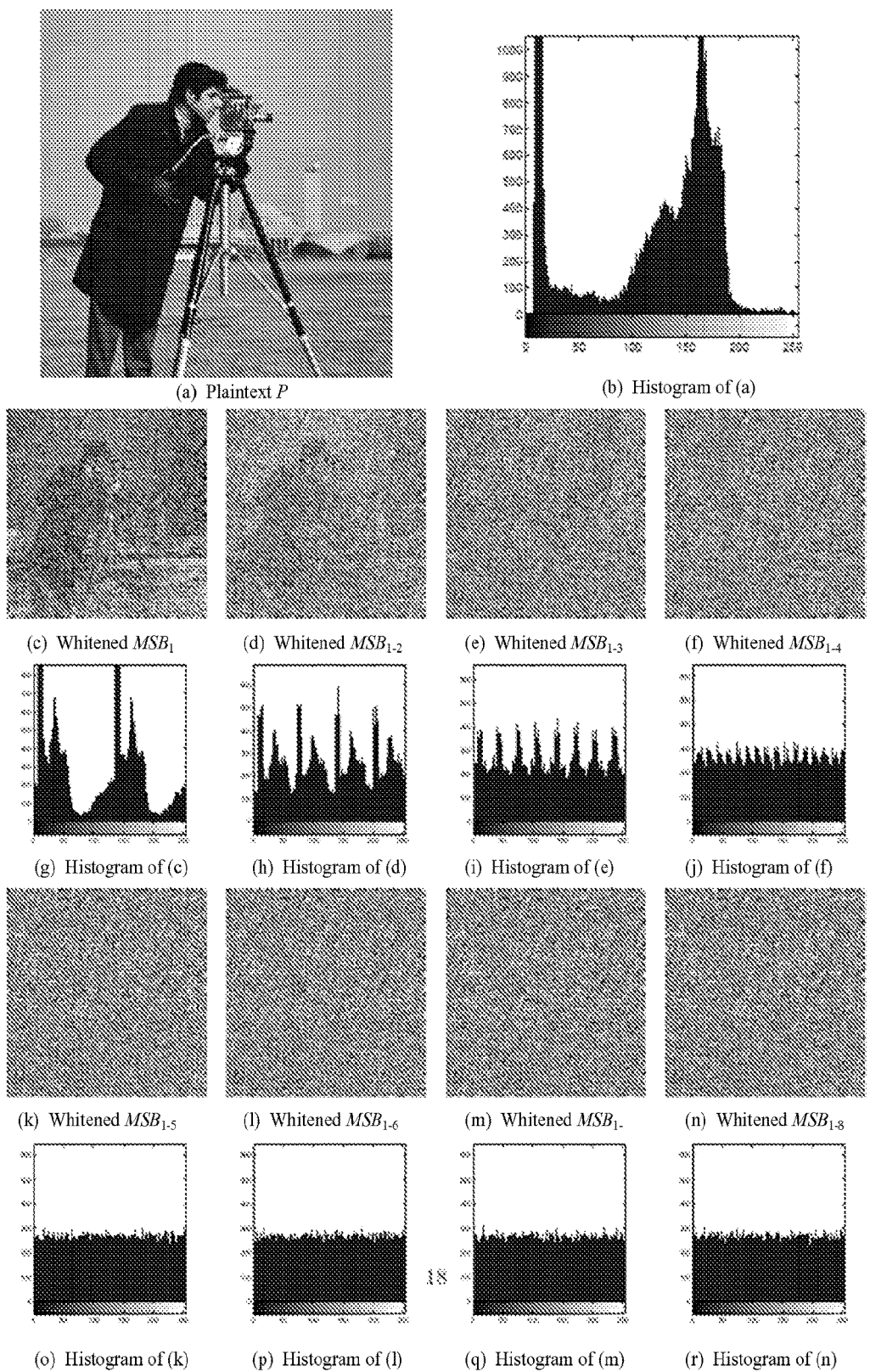
FIG. 11 shows the ciphertexts that result from Sudoku whitening the plaintext image and bit-plane decompositions of FIG. 10 using a 256×256 Sudoku matrix.

FIG. 10 shows the 8-bit grayscale 256×256 "cameraman" image and its bit-plane decompositions with respect to the bit order from the most to the least significant bit. FIG. 11 then shows the results of the Sudoku whitening technique as applied to this image by iteratively applying the whitening to each bit plane from the most significant bit (MSB) to the least significant bit (LSB), where the Sudoku matrix is of size 256×256 as well. As shown in FIG. 11, the histogram of the encrypted "cameraman" image gets increasingly flat as the whitening process applies to more bit-planes. It can also be observed that the histogram duplicates itself once for a single whitening iteration, which implies that the Sudoku whitening process randomly changes almost a half of bits in each bit-plane.

Sudoku Transposition

A transposition cipher changes one character from the plaintext to another. The Sudoku transposition can be defined as $$E_{ST}: C_b = (P_b + S) \bmod F$$

$$D_{ST}: P_b = (C_b - S) \bmod F$$

where F is a format related parameter. For example, if P is an 8-bit grayscale image, then this F can be defined as 256, which equals the number of allowed intensity scales compatible with an 8-bit grayscale image format. As a result, each pixel in plaintext P is shifted by some unit determined by the Sudoku element at the corresponding grid in the Sudoku matrix S.

This operation is very efficient for multimedia data because one distinctive characteristic of multimedia data is its high information redundancy (see, e.g., S. Li, et al. "A general quantitative cryptanalysis of permutation-only multimedia ciphers against plaintext attacks", *Signal Processing: Image Communication*, 23(3): 212-223, 2008). This implies that a digital image normally has several homogenous regions, where pixel intensities are more or less the same. In other words, knowing any pixel in a homogenous region makes it is easy to reconstruct its neighbor pixels or even a whole region. Therefore, it is desired to make a homogeneous region in P nonhomogeneous during the encryption process. In a Sudoku matrix, such a technique ensures that none of any two elements along a row, column, or block is the same, and thus the Sudoku matrix is very suitable to shift homogeneous regions in P to nonhomogeneous regions in C. As a result, the worst case of P, e.g., a blank image of all zero elements, is then whitened and becomes identical to the Sudoku matrix S, which is randomly generated with a uniformly distributed histogram.

Since the data range of a N×N Sudoku matrix is [1, N], the Sudoku with size N<F has to be increased by a factor of F/N before applying the transposition operation (e.g., $E_{ST}$). In other words, the $E_{ST}$ operation described above is more appropriately described in practice as $$E_{ST}^{scaled}: C_b = \left(P_b + \left\lceil S \cdot \frac{F}{N} \right\rceil\right) \bmod F$$

$$D_{ST}^{scaled}: P_b = \left(C_b - \left\lceil S \cdot \frac{F}{N} \right\rceil\right) \bmod F$$

where $\lceil . \rceil$ is the rounding function towards infinity.

Figure 12:
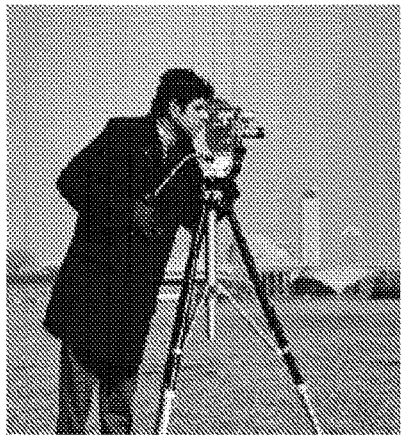
FIG. 12 shows the Sudoku transposition of the "Cameraman" image using Sudoku matrices.
Figure 12:
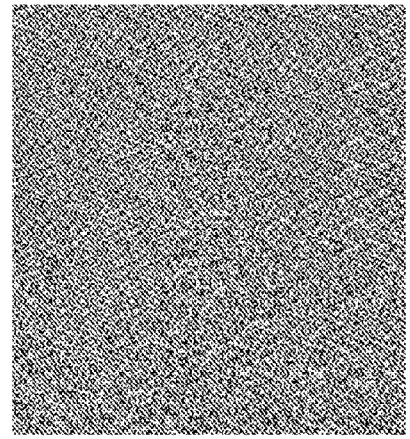
Figure 12:
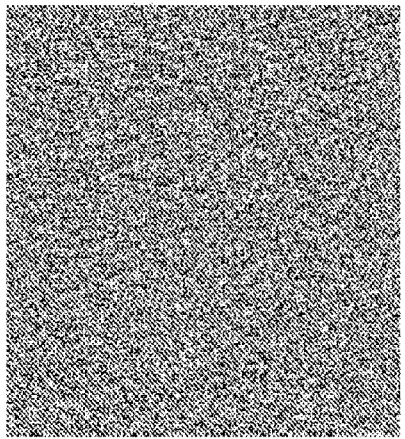
Figure 12:
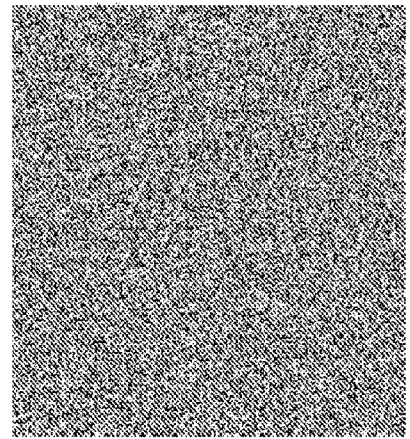

FIG. 12 shows the Sudoku transposition results for the 256×256 grayscale "cameraman" image using Sudoku matrices of 16×16, 64×64, and 256×256, respectively. All block sizes give satisfactory results. While a small size Sudoku may lead to some pattern-like regions in the ciphertext image (see, e.g., FIG. 12(b)), this issue can be easily solved by using a key-dependent Sudoku for each processing block. This is a mechanism used in conventional block ciphers such as the Data encryption standard ("DES", Federal Information Processing Standards Publication 46, 1977); the Advanced encryption standard ("AES", Federal Information Processing Standards Publication 197, 2001); and as described in X. Lai & J. Massey, "A proposal for a new block encryption standard" in *Advances in Cryptology EUROCRYPT '90 Proceedings*, pages 389-404 (Springer, 1990).

Sudoku Permutation

Permutation (also referred to as "P-Box") is a common technique used in cryptography that keeps the plaintext statistics unchanged while reordering the plaintext message. In general, the bit/pixel permutation procedure is to find a bijective mapping, that is, a mapping that is both one-to-one and onto. Given a sequence of bits/pixels, the permutation technique shuffles the elements in this sequence such that the original message content has been disordered and unrecognized. For example, if "Hello world" is the plaintext, then its ciphertext after permutation might be "lowHerd lol".

Specifically, the bijective mapping used for permutation is either predetermined or dynamically generated. For example, the "ShiftRows" step in the AES encryption method can be considered to be a predetermined permutation that shuffles the encryption block in a systematic way. Image ciphers usually use dynamically generated bijective mappings for permutations.

For a given Sudoku matrix, there are at least three methods for permutation: (1) unitary permutation; (2) row/column/block shuffling; and (3) 2D mapping between notations.

(1) Unitary Permutation Matrix Methods

The unitary permutation matrix (UPM) is a fast way to shuffle matrix contents. A unitary permutation matrix U can be defined as a square matrix if in every column and every row there is exactly one nonzero entry, whose value is one.

For a given N×N Sudoku matrix S, each digit d appears only once in a row or a column. Equivalently, for each digit d, a unitary permutation matrix can be extracted from the Sudoku matrix S using the following logical equation:

$$U(i,j) = \begin{cases} 1, & \text{if } S(i,j) = d \\ 0, & \text{if } S(i,j) \neq d \end{cases}$$

Figure 13:
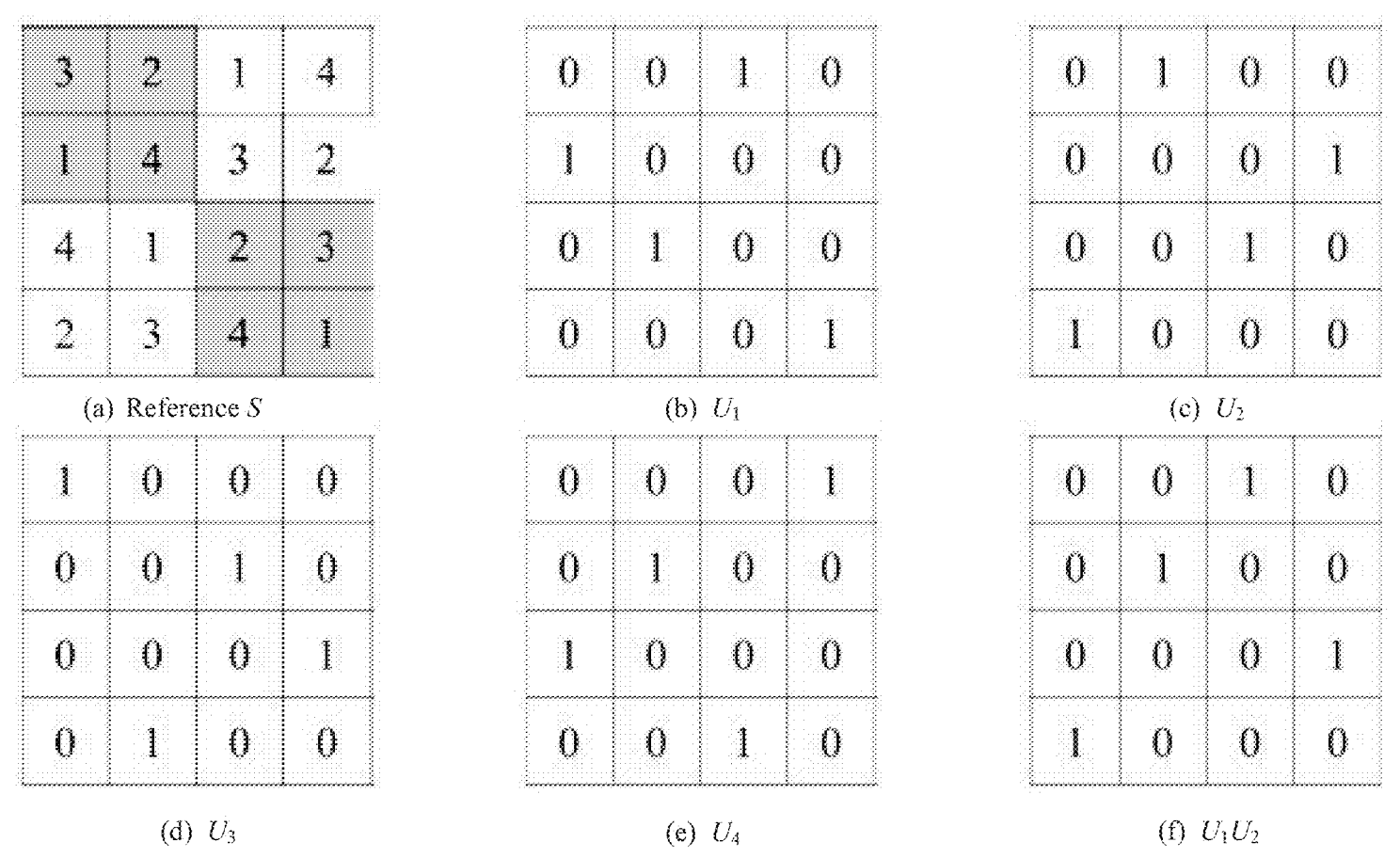

For example, FIG. 13 shows the unitary permutation matrix associated with the 4×4 reference Sudoku. The product of two unitary permutation matrices is a unitary permutation matrix (see, e.g., FIG. 13(f)). Consequently, the relationship between the plaintext message $P_b$ and the ciphertext message $C_b$ after shuffling by applying a unitary permutation matrix U can be denoted as follows $$\begin{cases} \text{Forward row shuffling } C_b = P_b U \\ \text{Forward column shuffling } C_b = U P_b \end{cases}$$

Similarly, the row-and-column shuffling can be obtained by cascading the row shuffling and the column shuffling. Since a UPM is always invertible, the relations above can be directly used in the decryption stage, where $U^T = U^{-1}$ denotes the inverse of U.

$$\begin{cases} \text{Inverse row shuffling } P_b = C_b U^T \\ \text{Inverse column shuffling } P_b = U^T P_b \end{cases}$$

Therefore, for an encryption technique using a unitary permutation matrix, the encryption and decryption processes are denoted as $$E_{SP}^{upm}: C_b = U P_b U$$

$$S_{SP}^{upm}: P_b = U^T P_b U^T$$

Figure 14:
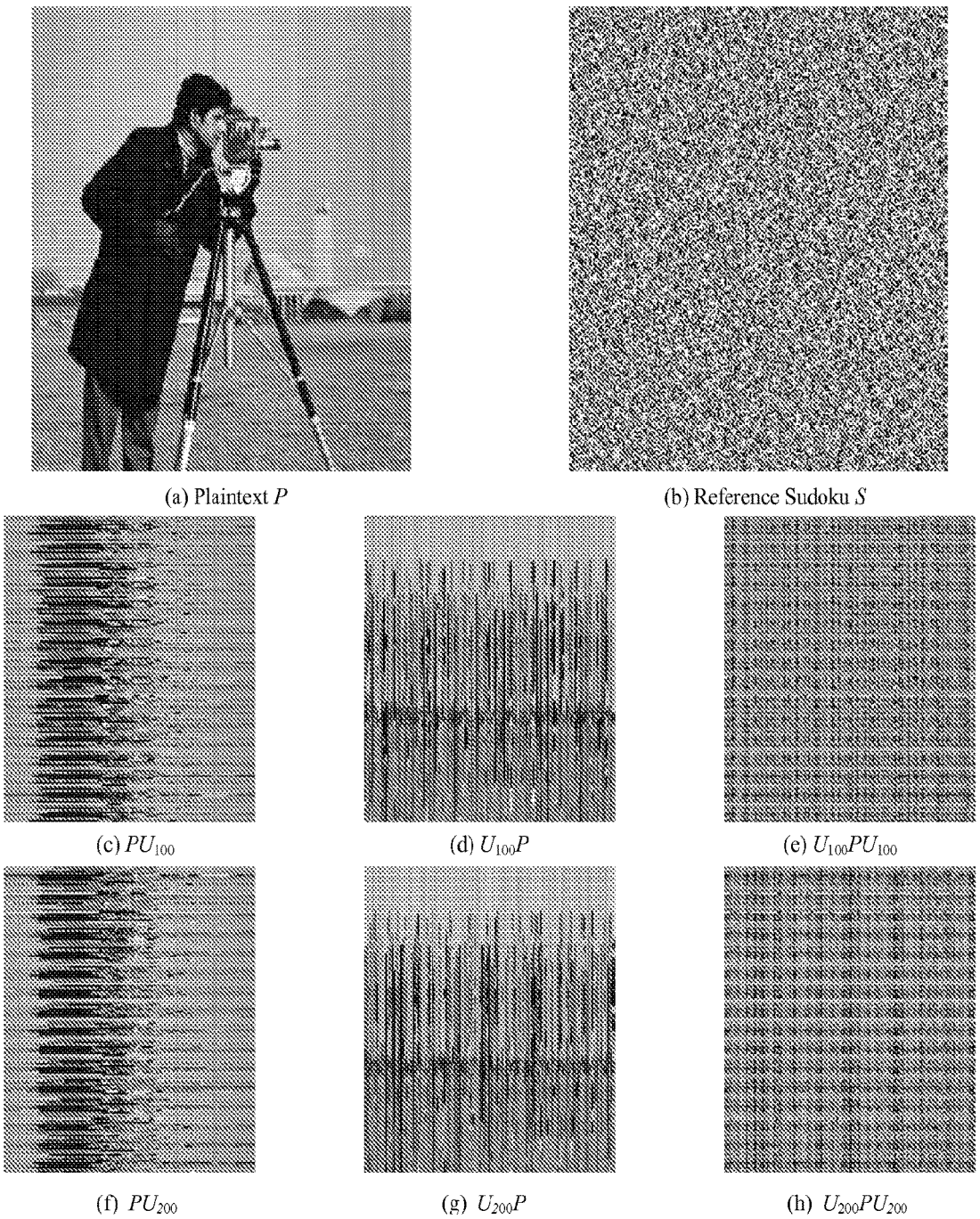
FIG. 14 shows examples of shuffling an image using Sudoku unitary permutation matrices.

FIG. 14 shows examples of shuffling images using the Sudoku-associated UPMs, where $U_d$ denotes the digit d-associated unitary matrix extracted from the reference Sudoku S. Shuffling plaintext using UPM is extremely fast because it involves only N times of row/column rearrangements and produces unintelligible and unrecognizable ciphertext.

(2) Row/Column/Block Shuffling Methods

The second permutation method is to consider each row/column/block in a Sudoku matrix as one permutation and then shuffle the plaintext row/column/block with respect to the corresponding row/column/block in the reference Sudoku matrix. For example, denote the bijective mapping between the ith row in the N×N Sudoku matrix S and the natural number sequence $\{1, 2, \ldots, N\}$ as $f_{\pi_i}$. That is:

$$f_{\pi_i} = \{1, 2, \ldots, N\} \rightarrow \{1, 2, \ldots, N\}$$

Then the encryption and decryption processes of the jth element in ith row of the ciphertext $C_b(i, j)$ can be denoted as follows $$E_{SP}^{rcb}: C_b(i,j) = P_b(i, f_{\pi_i}(j))$$

$$D_{SP}^{rcb}: P_b(i,j) = C_b(i, f_{\pi_i}^{-1}(j))$$

Figure 15:
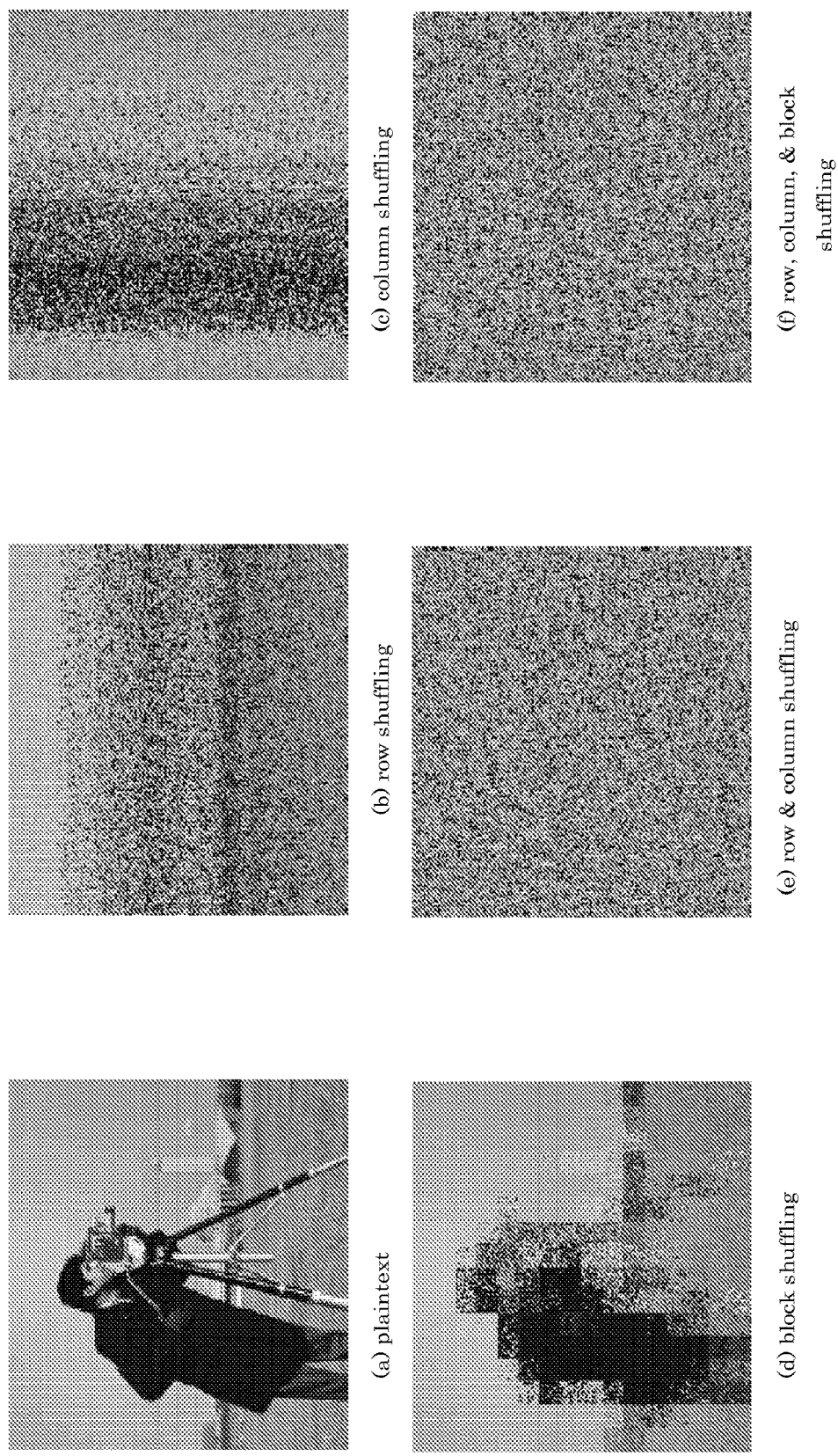
FIG. 15 shows examples of row, column, and block shuffling using a Sudoku matrix.

The row/column/block shuffling process unit is one row, one column, or one block. Some embodiments cascade (e.g., combine in sequence) multiple iterations of row shuffling, column shuffling, and block shuffling, e.g., as shown in FIG. 15. Cascaded shuffling produces encrypted images that do not have mesh-like patterns.

(3) Matrix Mapping Between Notations

Conventionally, a matrix can be denoted by using (row, column) notation. In other words, once the row number and column number are both specified, the matrix element is uniquely determined. However, there are many other ways of addressing elements within the Sudoku array.

Figure 16:
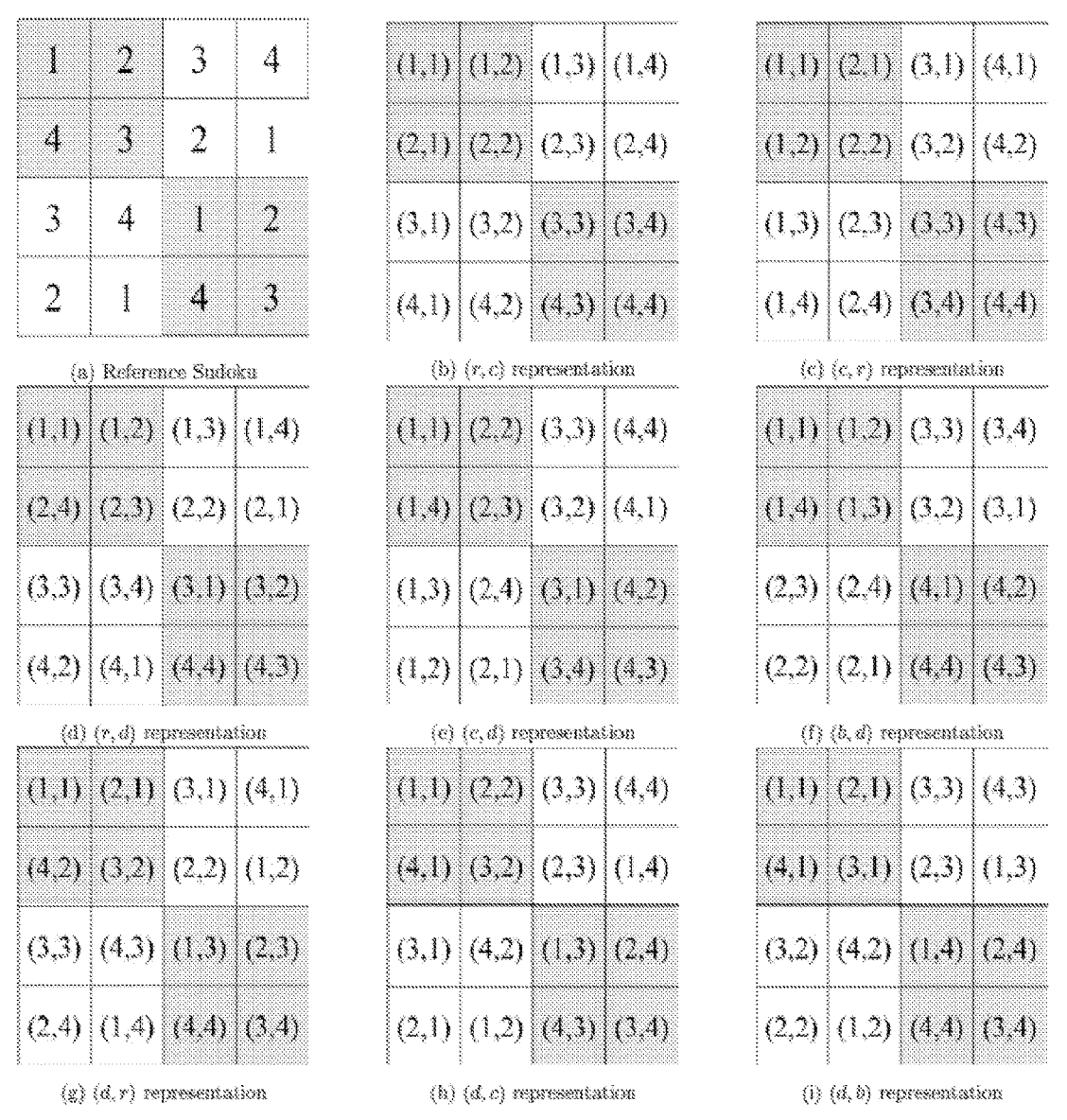

For example, FIG. 16 shows several systems of addressing elements in a 4×4 Sudoku matrix. Similar bijective mappings are possible for all Sudoku matrices because of the three constraints of Sudoku matrices. Conventionally, grids in the 4×4 matrix can be denoted using the (row, column) or (column, row) notations as in FIGS. 16(b) and 16(c). Besides using row and column information, matrix grids can be denoted using digit and block information within a reference 4×4 Sudoku matrix as shown in FIG. 16(e) to FIG. 16(i). For example, when given the reference Sudoku shown in FIG. 16(a), the grid at the intersection of the 2nd row and 4th column can be denoted as the grid with r=2; c=4; b=3, and d=1; thus, this grid is also denoted as (r=2; d=1), (c=4; d=1), and (b=3; d=1) in FIGS. 16(d), (e), and (f), respectively.

Each representation (e.g., method of addressing or denoting a grid) is a permutation of the other representations in FIG. 16. A mapping from one representation to another is both one-to-one and onto, and thus it is bijective. More specifically, the number of different bijective mappings that are associated with two matrix notations in a given Sudoku matrix is 8×7=56.

Depending on the bijective mapping used in various embodiments of the technology, the resulting permutation shuffles the data along rows/columns or over the whole matrix. For example, while the bijective mapping from the (row, column) to (row, digit) notation shuffles bits/pixels only along the row direction; the bijective mapping from the (row, column) to the (digit, block) notation shuffles bits/pixels all over the domain.

The composition g∘h of two bijections g:=X→Y and h:=Y→Z is also a bijection. Therefore, different bijections found within one Sudoku matrix can be used (combined) to compose new bijections. Furthermore, different bijections between different Sudoku matrices can also be used for new bijections. These facts imply that the number of bijections based on Sudoku matrices is huge.

Given a N×N Sudoku matrix S and a specific Sudoku bijection g defined for S, then the ciphertext message C after permutating the plaintext P can be denoted $$E_{SP}^{mmn}: C_b = g_S(P_b)$$

Since g is a bijection, $g^{-1}$ always exists and thus the decryption method is denoted as $$D_{SP}^{mmn}: P_b = g_S^{-1}(C_b)$$

Figure 17:
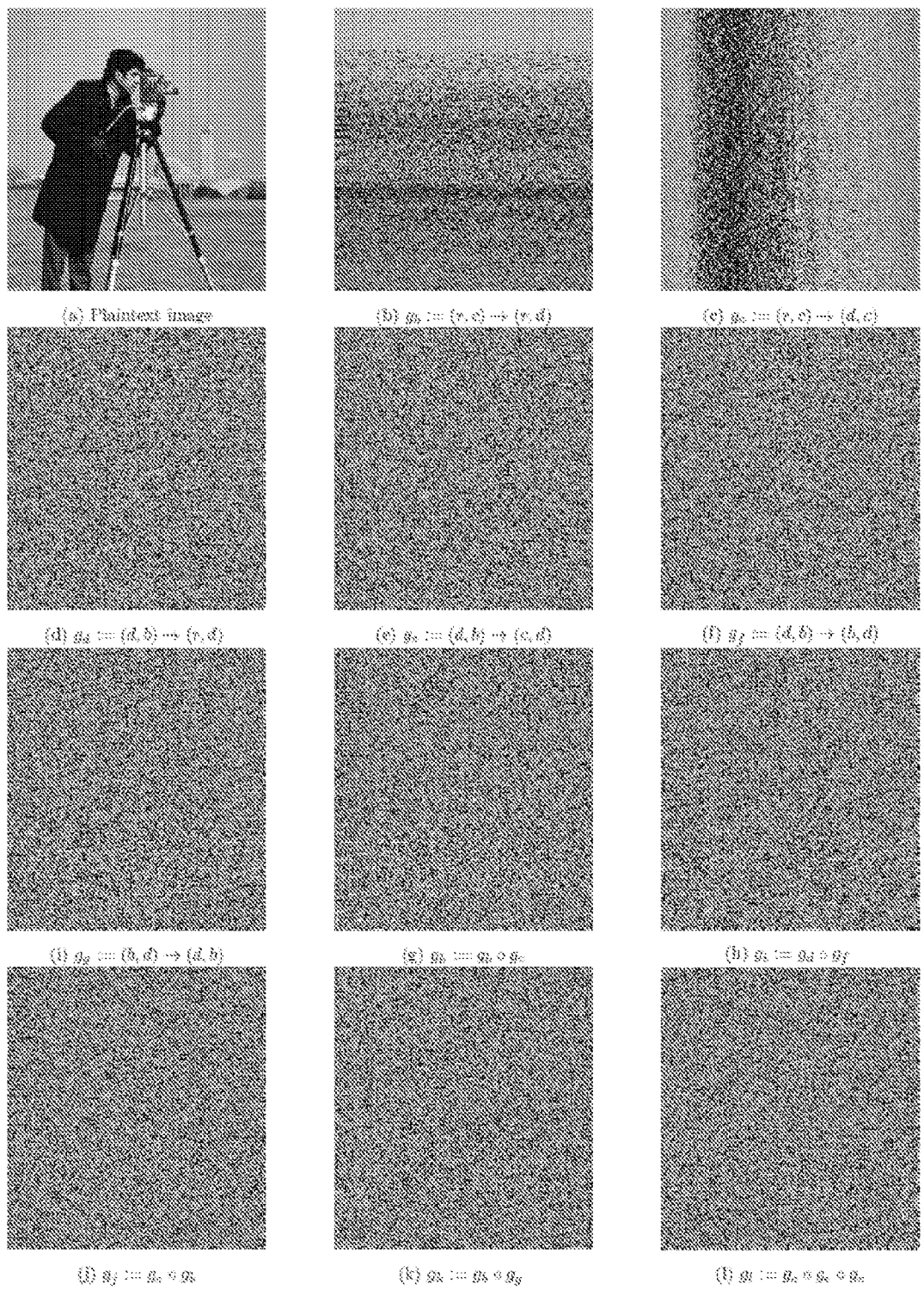
FIG. 17 shows the results of matrix mapping between notations using various bijective mappings associated with the same Sudoku reference matrix.

FIG. 17 shows the Sudoku permutation results under various bijective mappings associated with the same 256×256 Sudoku matrix. As demonstrated by the figure, the plaintext information is unrecognized and unintelligent after pixel permutation, the permutation qualities of different bijections using the same Sudoku matrix are not equivalent from the point view of certain patterns recognized by human visual inspection, and combining bijections helps to improve the permutation quality (e.g., the encryption).

Sudoku Maximum Distance Separable Matrix

In classical cryptography, the maximum distance separable (MDS) matrix is an important primitive to provide certain diffusion properties in cryptography (see, e.g., Advanced encryption standard. Federal Information Processing Standards Publication 197, 2001; B. Schneier. The two fish encryption algorithm: a 128-bit block cipher (J. Wiley, 1999)). It is a class of linear transformation used in many ciphers. Technically, an m×n matrix A over a finite field G is an MDS matrix if it is the transform matrix of a linear transformation $f(x)=Ax$ from $G^n$ to $G^m$ such that no two different (m+n)-tuples of the form $(x, f(x))$ coincide in n or more components. Mathematically, it is demonstrated that an m×n matrix A is a MDS matrix if and only if every square submatrix (formed from any i rows and any i columns), for any i=1; 2, ..., min(m, n) of A is nonsingular. Conventionally, the Reed-Solomon codes (see, e.g., I. S. Reed & G. Solomon. "Polynomial codes over certain finite fields", *Journal of the Society for Industrial and Applied Mathematics* 8(2): 300-304, incorporated herein by reference for all purposes) are used for MDS matrices.

Figure 18:
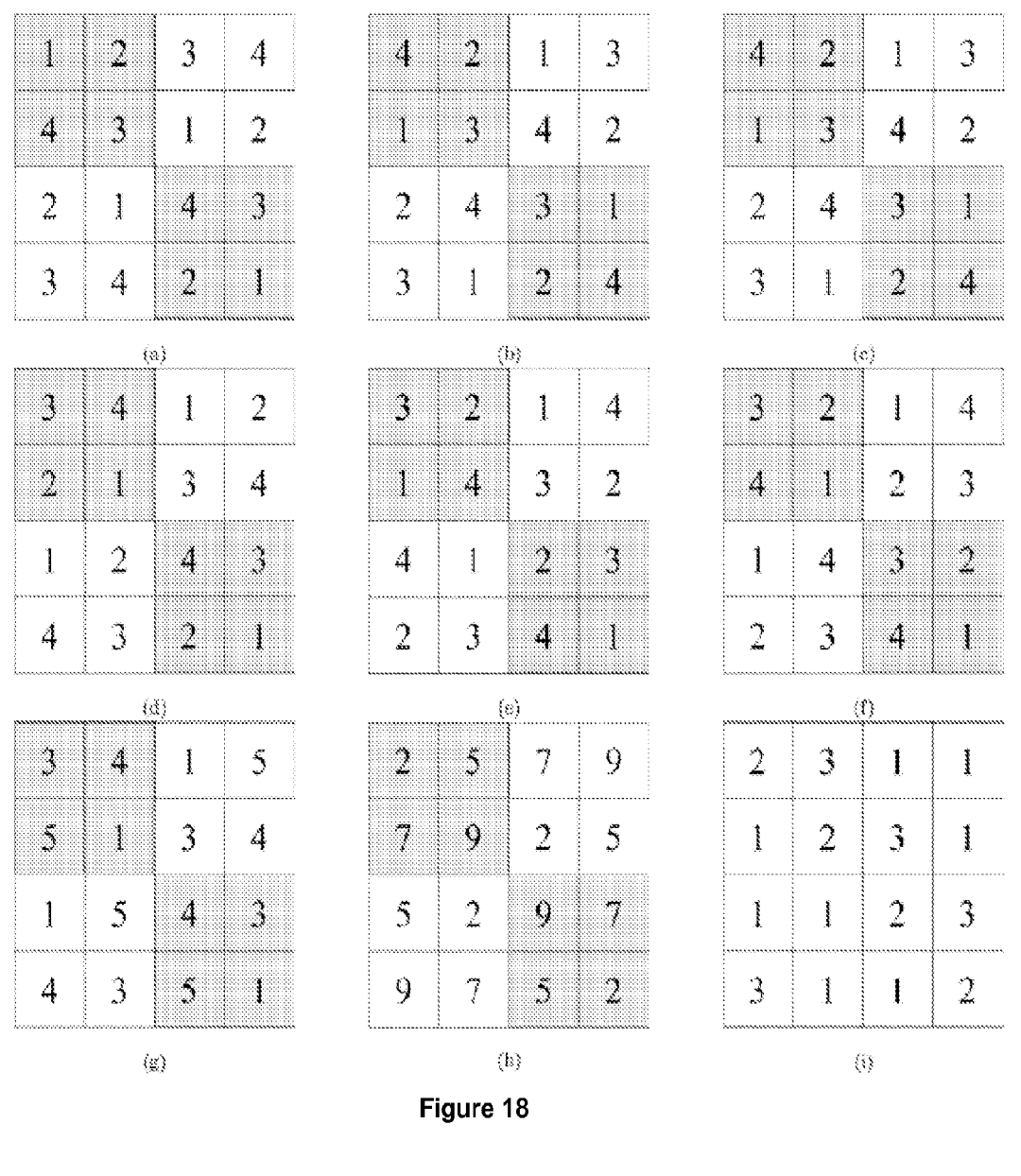

Using this sufficient and necessary condition of an MDS matrix, many 4×4 Sudoku matrices can also be MDS matrices (see FIG. 18), although a Sudoku MDS matrix is not a conventional cyclic MDS matrix (see FIG. 18(i)) because each row is not a simple shift of the previous row. Meanwhile, the Sudoku MDS matrix of FIG. 18(h) is of the same computational complexity of the AES MDS matrix of FIG. 18(i).

Furthermore, we consider the finite field $GF(2^8)$ used in AES. In AES, this $GF(2^8)$ is represented as $GF(2)/m(x)$, where $m(x)=x^8+x^4+x^3+x+1$ is an irreducible polynomial over GF(2). Then the inverse of all above Sudoku MDS matrices can be used for decryption. It is contemplated that the technology includes larger size Sudoku MDS matrices. As a result, the encryption and decryption processes using Sudoku MDS matrix S are denoted as $$E_{SM}: C_b = P_b S$$

$$D_{SM}: P_b = C_b S^{-1}$$

Sudoku Substitution

In cryptography, a substitution box (normally referred as an "S-box") is a fundamental component that performs substitution (see, e.g., D. Stinson. *Cryptography: Theory and Practice* (Chapman & Hall/CRC, 2006)). The objective of the S-box is to make the relationship between the key and the ciphertext very complicated and involved such that a high degree of confusion is achieved. In general, an S-box takes a certain number of input bits and substitutes these bits with some other number of bits. According to the origin of the S-box, it can be roughly grouped in two types: predetermined and dynamically generated. For example, DES and AES use predetermined S-boxes, while Twofish and IDEA use dynamically generated S-boxes.

In a Sudoku matrix, each row, column, or block is a permutation of digits from 1 to N. Therefore, the rows, columns, and blocks can be directly used for substitution, e.g., as in conventional dynamically generated S-boxes, e.g., as described in M. Dawson and S. Tavares, "An expanded set of s-box design criteria based on information theory and its relation to differential-like attacks" in *Advances in Cryptology EUROCRYPT* 91, volume 547 of *Lecture Notes in Computer Science*, 352-367 (D. Davies, ed., Springer Berlin/Heidelberg); S. Murphy & M. J. B. Robshaw, "Key-dependent s-boxes and differential cryptanalysis", *Designs, Codes and Cryptography* 27: 229-255.

As described herein, the technology provides an improved process for generating more random-like S-boxes with appropriate group properties. This technology for substitution relies on the fact that any Sudoku matrix can be normalized to a double stochastic matrix, which is a special type of Markov transition matrix (see, e.g., J. Medhi. *Stochastic processes*. J. Wiley, 1994). The construction details of the Sudoku substitution are as follows:

1. Normalize a N×N Sudoku matrix S to the doubly stochastic matrix $D_S$, where $D_S = S/\Sigma_{i=1}^N$ and use this matrix as the Markov transition matrix.

2. According to the key distribution, divide the whole probability space into N exclusive bins such that the probability that a key falls in the nth bin is $$Pr(\#Bin=n) = n/\Sigma_{i=1}^N N$$

where n is an element of the set $\{1, 2, \ldots, N\}$.

3. Consider an input byte $I_{byte}$ and its output byte $O_{byte}$ of the S-box as the input state and the output state in the Markov chain, respectively.

4. Given a subkey K, find its bin number $n_K$.

5. Look up $D_S$ and find $O_{byte}$ such that $Pr(O_{byte}|I_{byte}) = Pr(\#Bin=n_K)$ holds.

Therefore, given a N×N Sudoku matrix S, a key K, and the key bin information, the output ciphertext block $C_b$ is determined by the input block $P_b$ via the $P_{byte}$ and $C_{byte}$ according to the process $$E_{SS}: \text{Find } C_{byte} \text{ in } D_S \text{ such that } Pr(C_{byte}|P_{byte}) = Pr(\#Bin=n_K)$$

$$E_{SS}: \text{Find } P_{byte} \text{ in } D_S \text{ such that } Pr(C_{byte}|P_{byte}) = Pr(\#Bin=n_K)$$

For example, a 4×4 Sudoku matrix S that was dynamically generated by the encryption key is shown in FIG. 19(a) and the doubly stochastic matrix $D_S$ associated with S is shown in FIG. 19(b). Further, this $D_S$ matrix can be viewed as a Markov transition matrix and the process of substitution can be viewed as a Markov process whose transition matrix is $D_S$ as shown in FIG. 19(c).

Suppose 10 keys from 1 to 10 are repeatedly used in encryption with the transition matrix shown in FIG. 19(c). Determine the key bins as bin#1={1}, bin#2={2, 3}, bin#3={4, 5, 6}, and bin#4={7, 8, 9, 10}. Suppose at one encryption iteration, the given subkey is K=9. Then we have $n_K=4$. If the plaintext byte is '00', then the next state is determined by finding the next state such that the following equation holds $$Pr(\text{NextState}=??|\text{CurrentState}=00) = Pr(\#Bin=n_K=4) = 0.4$$

By referring to the transition matrix, the next state can be seen as '11'. Similarly, if only the next state '11' and K=9 are given during the decryption stage, then the current state is determined by finding the current state such that the following equation holds $$Pr(\text{NextState}=11|\text{CurrentState}=??) = Pr(\#Bin=n_K=4) = 0.4$$

By reference to the transition matrix, the current state can be found as '00'. This substitution process is similar to a one-step Monte Carlo simulation. However, it differs from a Monte Carlo simulation because its transition matrix is of the Sudoku type and its transition matrix is doubly stochastic. The first characteristic makes the Monte Carlo simulation reversible and thus makes it feasible to decrypt a given ciphertext. Since each probability only appears once along a row or a column according to the Sudoku definition, we can find the third unknown quality when given any two of the input state, the bin probability, and the output state. For example, if the ciphertext is '11' (e.g., the output state is '11') and the probability associated with the key bin is known as 0.4, then the input state can be uniquely determined as '00' because the input state '01' requires a bin probability of 0.2 to move to the output state '11', the input state '10' requires the bin probability 0.3 to move to the output state '11', and the input state '11' requires bin probability 0.1 to move to the output state '11'.

The second characteristic plays a vital role in making the S-box efficient. The stationary vector w of a N×N doubly stochastic matrix is uniformly distributed:

$$w = [1/N, 1/N, \ldots, 1/N]$$

This fact guarantees that the final state is independent of the initial state and that the probability of each state is uniformly distributed. In the context of the S-box, this implies that after a sufficient number of Sudoku substitutions, the ciphertext $C_{byte}$ is independent of the plaintext $P_{byte}$, and the distribution of ciphertext $C_{byte}$ is uniform. Mathematically, these two properties can be denoted as $$Pr(C_{byte}|P_{byte}) = Pr(C_{byte}) = 1/N$$

Both properties are desired for cryptography. Meanwhile, this conclusion does not rely on the assumption that the key distribution is uniform. Heuristically speaking, this sufficiently large number is 10 for 256×256 Sudoku doubly stochastic matrices, where the maximum distance between the possibility of a state and 1/256 is less than $2^{-50}$.

Sudoku Ciphers—Binary Data

The classic Rijndael cipher, also known as the Advanced Encryption Standard (AES), is a specification for the encryption of electronic data. It has been adopted by the US government and now is accepted worldwide. AES is based on the design principle known as the Substitution-Permutation Network (SPN), which allows fast implementation in both software and hardware.

AES is a block cipher with the fixed block size of 128 bits, (16 bytes). Its key size is changeable from 128 to 192 or 256 bits. AES operates on a 4×4 matrix of bytes and its calculations are defined on the finite field of $GF(2^8)$, with the irreducible polynomial $m(x) = x^8 + x^4 + x^3 + x + 1$ for multiplication.

Figure 20:
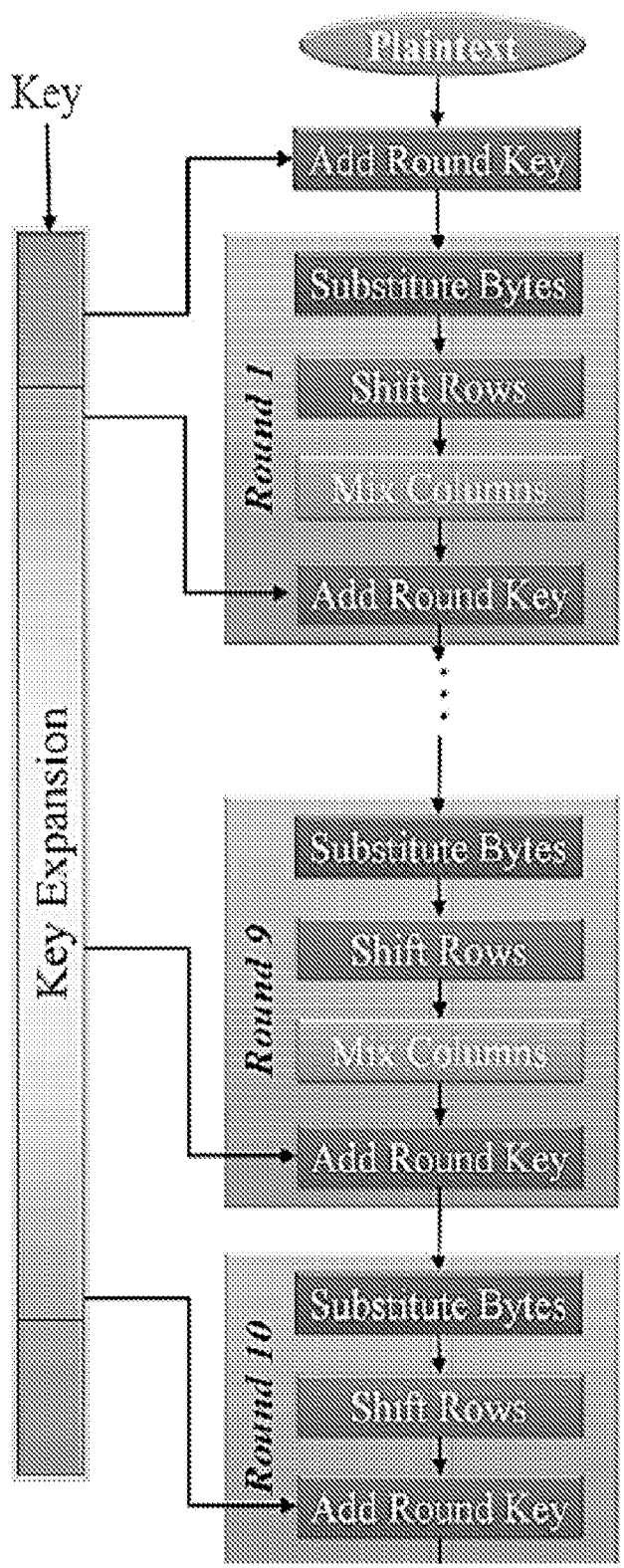
FIG. 20 is a flowchart depicting conventional AES cryptography

The AES cipher is a multi-round cipher which converts the input plaintext into the final output of ciphertext. Each round comprises several processing steps, including an "Add Round Key" step that depends on the encryption key. A set of reverse rounds can be applied to transform ciphertext back into the original plaintext using the same encryption key. FIG. 20 illustrates the encryption steps of AES. A high-level description of the AES algorithm is as follows:
1. Key Expansion: each encryption key is systematically expanded using the Rijndael key schedule (see, e.g., Advanced encryption standard. Federal Information Processing Standards Publication 197, 2001.)
2. Initial Round
   (1). Add Round Key: each byte of the plaintext block is combined with the round key using the bitwise XOR operation.
3. Intermediate Rounds
   (1). Substitute Bytes: A nonlinear step where each input byte is then replaced by another byte with respect to the Rijndael substitution table.
   (2). Shift Rows: A transposition step where bytes in a row are shifted cyclically.
   (3). Mix Columns: A mixing operation which mixes bytes in each column.
   (4). Add Round Key
4. Final Round
   (1). Substitute Bytes
   (2). Shift Rows
   (3). Add Round Key Sudoku—AES Block Cipher Besides cipher configurations like the working finite field and the key schedule, the conventional AES block cipher has the following core processing steps for encryption:
   Add Round Key is a key whitening step
   Substitute Bytes is a substitution step
   Shift Rows is a permutation step
   Mix Columns is a MDS-based diffusion step As a result, the AES processing steps can be replaced with the corresponding Sudoku-based encryption techniques and the resulting cipher is called the Sudoku-AES cipher.

Although the Sudoku-AES cipher mimics the structure of the classic AES cipher, it has a larger block size of 256 bits (32 bytes). It operates on two 4×4 matrices of bytes. Also, the Sudoku-AES cipher has both dynamic substitution and permutation boxes. In short, the following comparison table shows the similarities and dissimilarities between the Sudoku-AES cipher and the classic AES cipher.

TABLE 1

Comparisons between Classic AES and Sudoku-AES ciphers

| | Items | Classic AES | Sudoku-AES |
|---|---|---|---|
| General | Block size | 128 bits | 256 bits (2 × 128 bits) |
| | Key Size | 128, 192, and 256 bits | 256 bits |
| | Finite Field | $GF(2^8)$ | $GF(2^8)$ |
| | # Rounds | 10, 12 and 14 | 10 |
| Encryption Function | Whitening | Add Round Key | Sudoku whitening $e_{SW}$ |
| | Substitution | Substitute Bytes | Sudoku substitution $e_{SS}$ |
| | Permutation | Shift Rows | Sudoku Permutation $e_{SP}$ |
| | Diffusion | Mix Columns | Sudoku MDS $e_{SM}$ |
| Operation Type | Whitening | Dynamic | Dynamic |
| | Substitution | Fixed Rijndael S-box | Dynamic Sudoku S-boxes |
| | Permutation | Fixed cyclic row shift | Dynamic Sudoku P-boxes |
| | Diffusion | Fixed AES MDS | Fixed Sudoku MDS |

Specifically speaking, the following types of Sudoku matrices (e.g., Sudoku encryption primitives) are used in Sudoku-AES:
   Whitening Sudoku $S_W$ of size 16×16 is used for whitening the plaintext message in each round using the $E_{SW}$ function (Sudoku Whitening technique).
   Substitution Sudoku $S_s$ of size 256×256 is used for substituting each plaintext byte in each round using the $E_{SS}$ function (Sudoku Substitution technique)
   Permutation Sudoku $S_p$ of size 16×16 is used for shuffling plaintext bits in each round using the function $E_{SP}^{mmn}$ (Sudoku Permutation technique).

Diffusion Sudoku two $S_m$ of size 4×4 are used for mixing plaintext bytes in each round using the $E_{SM}$ function (Sudoku MDS technique).

Figure 21:
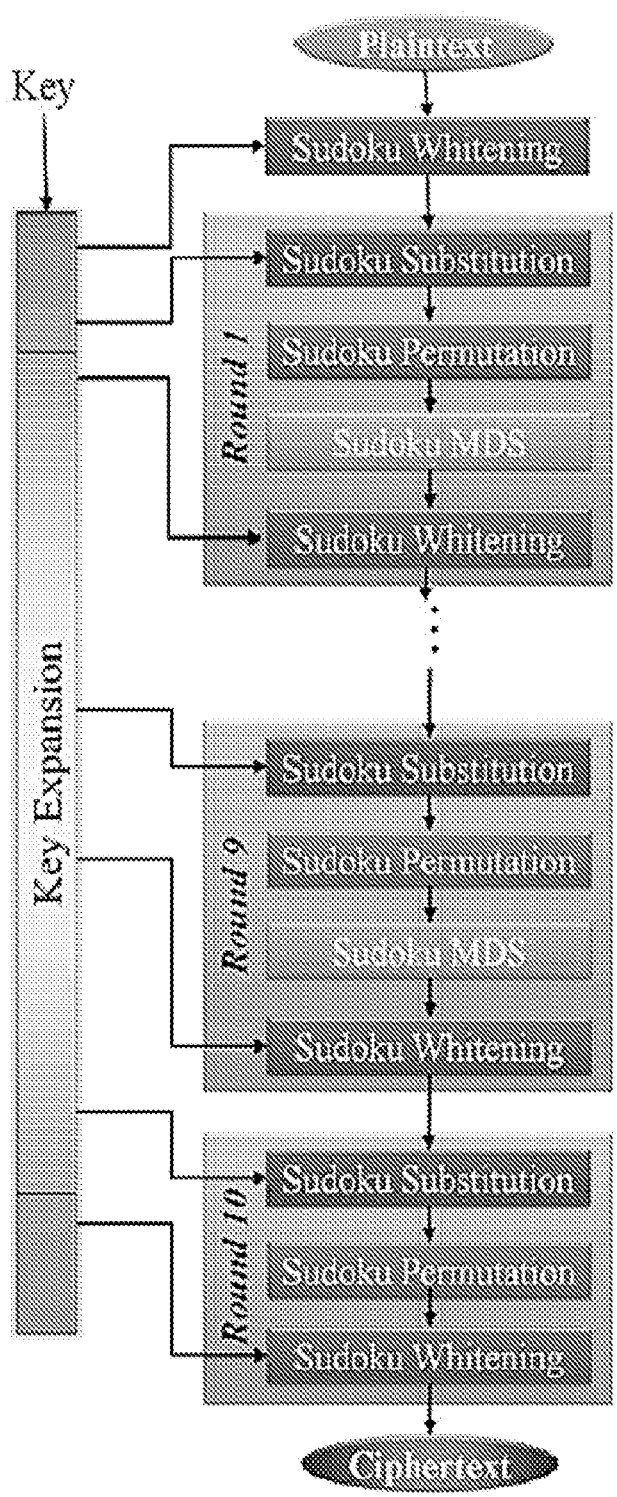
FIG. 21 is a flowchart depicting the Sudoku-AES cipher described herein

Since both $S_w$ and $S_p$ are Sudokus of size 16×16, $S_w$ is set to equal $S_p$ in implementation to save memory and computations. FIG. 21 shows the encryption flowchart of the Sudoku-AES cipher. Similarly, the high-level description of the Sudoku-AES cipher is as follows:

1. Preparation
   (1). Form 256-bit plaintext to a 16×16 matrix and denote this plaintext matrix as P
   (2). Use the encryption key to generate a 256×256 Sudoku matrix $S_s$ for substitution.
   (3). Load two predefined 4×4 Sudoku MDS matrices $S_m^a$ and $S_m^b$
   (4). Use the Rijndael key schedule to generate round keys and sub-keys.
2. Initial Round
   (1). Sudoku Whitening—Generate a key-dependent 16×16 Sudoku matrix $S_w^0$ for whitening the plaintext matrix P.
3. At kth Round
   (1). Sudoku Substitution—A nonlinear step where each input byte is then replaced by another byte with respect to the sub-keys and $S_s$. Here the 16×16 plaintext matrix P is reformed as two 4×4 matrices $P_a$ and $P_b$.
   (2). Sudoku Permutation—A transposition step where bits are shuffled with respect to $S_p^k$, the kth round key dependent on the Sudoku matrix for permutation.
   (3). Sudoku MDS—A mixing operation that mixes bytes in each column, where $S_m^a$ is applied to $P_a$ and $S_m^b$ is applied to $P_b$ over the finite field $GF(2^8)$, respectively.
   (4). Sudoku Whitening
4. Final Round
   (1). Sudoku Substitution
   (2). Sudoku Permutation
   (3). Sudoku Whitening Security Analysis The following briefly discusses the cryptanalysis. Cryptanalysis can be roughly classified as ciphertext-only, known-plaintext, and chosen-plaintext (alternatively, chosen-ciphertext). In the following, we will briefly discuss the cryptanalysis of the Sudoku-AES method.

Conventionally, the ciphertext-only attack (COA) is an attack model for cryptanalysis where the attacker has access only to a set of ciphertext. It is more or less dependent on the statistics of the ciphertext. For example, frequency analysis can be used to analyze the frequencies of each ciphertext byte for finding patterns related to prior knowledge, for example, the distribution of certain letters or combinations of letters (see, e.g., D. Stinson. *Cryptography: Theory and Practice*. The CRC Press series on discrete mathematics and its applications. Chapman & Hall/CRC, 2006.) Sudoku-AES is invulnerable of this type of attack because the special structure of the Sudoku-Substitution makes the ciphertext bytes have uniformly distributed statistics.

The known-plaintext attack (KPA) is an attack model for cryptanalysis where the attacker has access to both the plaintext and its corresponding ciphertext. Its objective is to discover the relationship between the plaintext and ciphertext, e.g., to expose secret information such as encryption keys. Sudoku-AES is resistant to such attacks because both the SPN structure and MDS provide strong confusion and diffusion properties such that the relationship between the key and ciphertext is very complicated and non-uniformly distributed plaintexts become uniformly distributed when encrypted.

Figure 19:
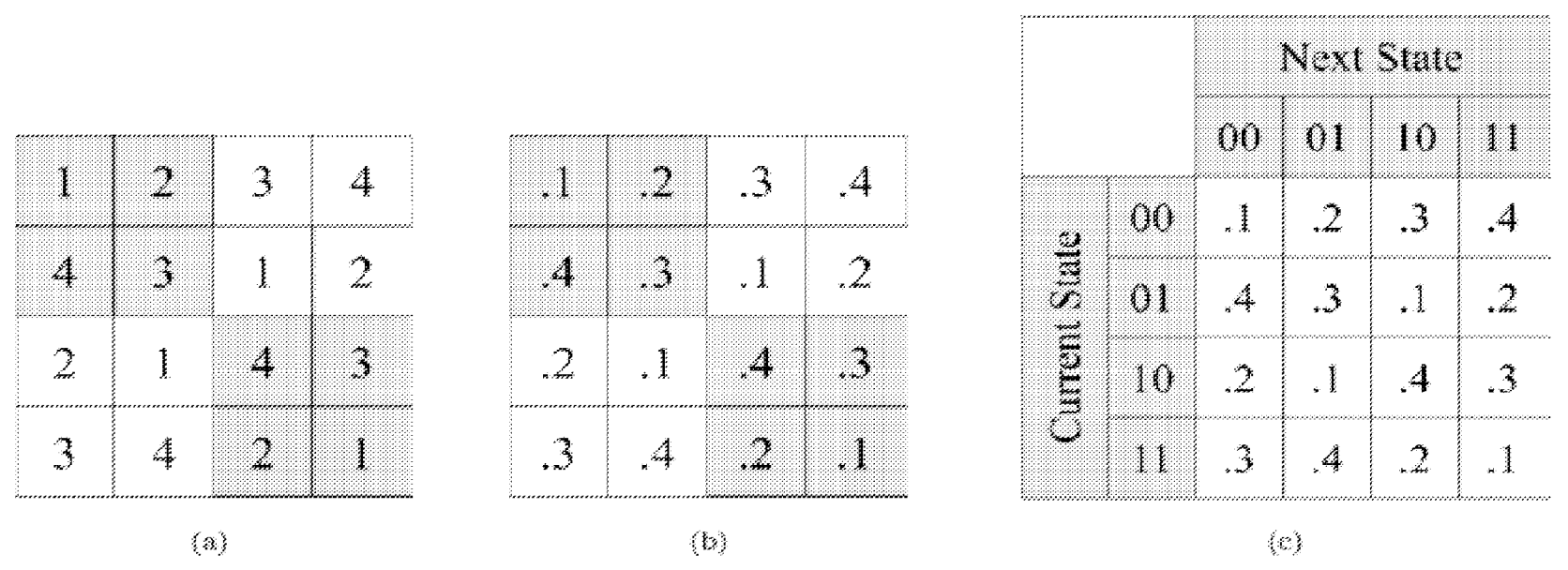

The chosen-plaintext attack (CPA) is another attack model where the attacker has the capacity to choose arbitrary plaintexts and encrypt them to ciphertexts. Both linear cryptanalysis and differential cryptanalysis are of this type of attack. The aim of CPA is to crack the encryption key used in the cipher or partial key bits. Unlike the conventional SPN-based ciphers operating directly on the plaintext and/or ciphertext with the encryption key, the Sudoku-AES does this operation in an indirect way by transforming the encryption key into a series of Sudoku matrices. Moreover, such transformation is absolutely nonlinear, which provides additional nonlinearity in the cipher besides the S-Box. Furthermore, the S-Box in Sudoku-AES also has a strong resistance against linear cryptanalysis and differential analysis. Both cryptanalytic techniques require knowledge of the S-Box used in the cipher. However, the S-Box used in Sudoku-AES is key-dependent and thus dynamic, which implies that knowledge of the S-Box is inaccessible to an attacker and thus the knowledge of cryptanalysis on one S-Box is useless to another one. In other words, the Sudoku-AES cipher is secure with respect these two attacks. Even if the S-Boxes in the Sudoku-AES cipher are fixed, the Sudoku-AES cipher is still able to resist the differential attack because it is a type of Markov cipher. In Sudoku-AES, these S-Boxes are used not independently but dependently in the way of the Sudoku transition matrix as FIG. 19 shows (these S-Boxes together form a Sudoku array).

As shown below, the Sudoku-AES cipher is a Markov cipher. In particular, first recall that an iterated cipher with round function $Y = f(X, K)$ is a Markov cipher if there is a group operation for defining the difference $\otimes$ such that, for all choices of $\alpha$ ($\alpha \neq e$) and $\beta$ ($\beta \neq e$), the probability that the difference between two ciphertexts $\Delta Y = Y \otimes Y^*$ when the difference between two corresponding plaintext $\Delta X = X \otimes X^*$ and the plaintext $X = \gamma$ are known, e.g., $$Pr\left(\Delta Y = \beta \,\middle|\, \begin{array}{c} \Delta X = \alpha \\ X = \gamma \end{array}\right)$$

is independent of $\gamma$ when the subkey K is uniformly random. From this definition, the Sudoku-Substitution is a Markov cipher. The proof is as follows:

Let $X = \gamma$ and $X^*$ be two plaintext messages in Sudoku-Substitution and $Y = f(X, K)$ and $Y^* = f(X^*, K)$ are corresponding ciphertext messages. Since $f(.)$ is the Sudoku Substitution round function, then the following equation holds $$Pr(Y = \delta | X = \gamma) = Pr(Y = \delta) = 1/N$$

Where N is the size of the Sudoku matrix used in Sudoku substitution and N=256 in the context of the Sudoku-AES cipher. Let $\alpha \otimes^{-1} \gamma = \gamma^*$, then $$Pr\left(\Delta Y = \beta \,\middle|\, \begin{array}{c} \Delta X = \alpha \\ X = \gamma \end{array}\right) = Pr\left(\Delta Y = \beta \,\middle|\, \begin{array}{c} X^* = \alpha \otimes \gamma \\ X = \gamma \end{array}\right) =$$

$$Pr\left(\Delta Y = \beta \,\middle|\, \begin{array}{c} X^* = \gamma^* \\ X = \gamma \\ X \neq X^* \end{array}\right) = \sum_\delta Pr\left(\begin{array}{c} \Delta Y = \beta \\ Y = \delta \end{array} \,\middle|\, \begin{array}{c} X^* = \gamma^* \\ X = \gamma \\ X \neq X^* \end{array}\right) =$$

$$\sum_\delta Pr\left(Y = \delta \,\middle|\, \begin{array}{c} X^* = \gamma^* \\ X = \gamma \\ X \neq X^* \end{array}\right) Pr\left(\Delta Y = \beta \,\middle|\, \begin{array}{c} X^* = \gamma^* \\ X = \gamma \\ X \neq X^* \\ Y = \delta \end{array}\right) =$$

$$\sum_\delta Pr\left(Y=\delta \middle| \begin{array}{c} X^*=\gamma^* \\ X=\gamma \\ X \neq X^* \end{array}\right) Pr\left(Y^* = \beta \otimes^{-1} Y \middle| \begin{array}{c} X^*=\gamma^* \\ X=\gamma \\ X \neq X^* \\ Y=\delta \end{array}\right) =$$

$$\sum_\delta Pr\left(Y=\delta \middle| \begin{array}{c} X^*=\gamma^* \\ X=\gamma \\ X \neq X^* \end{array}\right) Pr\left(Y^* = \beta \otimes^{-1} \delta \middle| \begin{array}{c} X^*=\gamma^* \\ X=\gamma \\ X \neq X^* \\ \beta \neq e \end{array}\right) =$$

$$\sum_\delta Pr(Y=\delta | X=\gamma) Pr\left(Y^* = \beta \otimes^{-1} \delta \middle| \begin{array}{c} X^*=\gamma^* \\ \beta \neq e \end{array}\right) =$$

$$\sum_\delta Pr(Y=\delta) Pr(Y^* = \beta \otimes^{-1} \delta | Y \neq Y^*) =$$

$$\sum_\delta \frac{1}{N} \frac{1}{N-1} = \frac{1}{N-1}$$

Therefore, in Sudoku Substitution we have:

$$Pr\left(\Delta Y = \beta \middle| \begin{array}{c} \Delta X = \alpha \\ X = \gamma \end{array}\right) = \frac{1}{N}$$

which implies the above probability is independent of γ and it is also uniformly distributed. Therefore, the Sudoku Substitution, a Markov cipher, is secure against a differential cryptanalysis attack after sufficiently many rounds of encryption.

Sudoku Cipher—Image Data

The processing sizes of conventional block/stream ciphers are relatively small for a digital image, which is usually of size 50 kb-10 mb. For example, the block size of AES is 128 bit and thus it typically requires dividing a digital image into more than ten thousand blocks to process. Such conventional encryption processes are inefficient. However, treating a digital image the same as a digital bit string neglects the nature of the digital image in which neighboring pixels are strongly correlated and image pixel depths are of different significance levels.

Accordingly, herein is described a Sudoku-Image cipher using Sudoku-Permutation, Sudoku-Substitution, and Sudoku-MDS for 8-bit grayscale images and 24-bit true color RGB images. It processes 256×256 images with a pixel depth of 8 bits over the finite field $GP(2^8)$.

Figure 22:
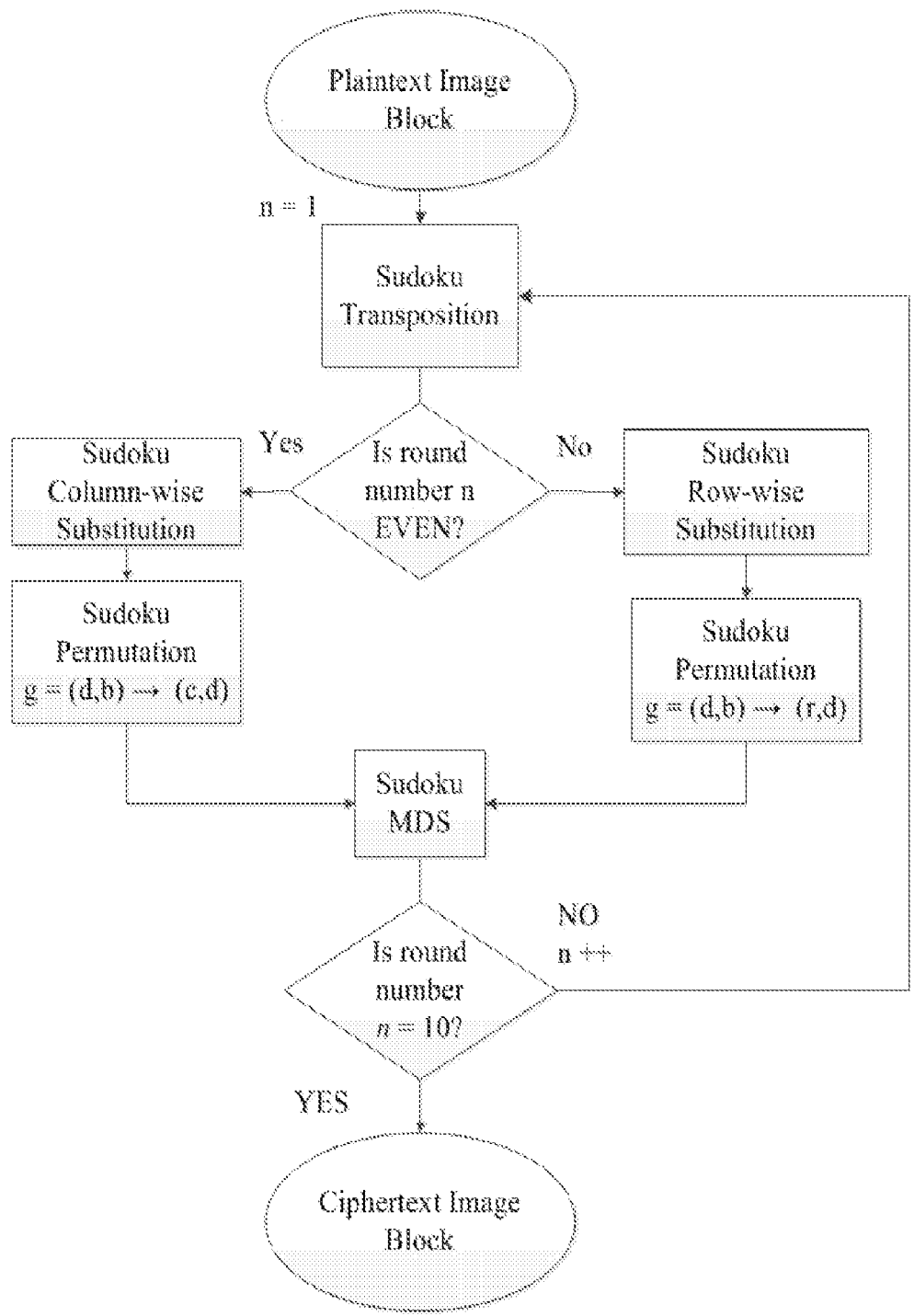
FIG. 22 is a flowchart showing an overview of the Sudoku-Image cipher described herein

The Sudoku-Image cipher uses Sudoku encryption techniques, but in a more efficient way. FIG. 22 shows an overview of the Sudoku-Image cipher. The following types of Sudoku matrices used in the Sudoku-Image Cipher:

$S_s$: A 256×256 dynamic Sudoku matrix for substitution, controlled by the encryption key K $S_t^n$: A 256×256 dynamic Sudoku matrix for transposition in the nth round controlled by the round key $k^n$ $S_p^n$: A 256×256 dynamic Sudoku matrix for transposition in the nth round controlled by the round key $k^n$ $S_m$: A 4×4 fixed Sudoku MDS matrix For an 8-bit grayscale image, each pixel in the image is considered as a byte of 8 bits. All cipher operations are now applied in the unit of byte rather than of bit.

In reference to FIG. 22, the "Sudoku Transposition" process is defined as the $E_{ST}^{scaled}$ process. The "Sudoku Row/Column Substitution" denotes the row-wise or column-wise Sudoku substitution processing that uses one sub-key k to encrypt a row or a column of pixels. For example, for the plaintext pixels located in the ith row denoted as P(i, 1), P(i, 2), . . . , P(i, 256), then the corresponding ciphertext pixels are calculated from $E_{SS}$ by using P(i, 1), P(i, 2), . . . , P(i, 256) as input bytes.

$E_{SS}$: Find C(i,j) in $D_s$, such that $Pr(C(i,j)|P(i,j))=Pr$ (#Bin=$n_k$)

for j as a member of the set {1, 2, . . . , 256}. In such way, the substitution process for pixels belonging to the same row/column requires only one subkey rather than 256 subkeys in the Sudoku-AES cipher. The cipher applies the Sudoku row-wise substitution when the round number n is odd and the Sudoku column substitution when n is even.

The "Sudoku Permutation" process is also implemented in two ways with respect to the parity of the round number n: When the round number n is odd, it uses the bijection g:=(d, b)→(r, d) and when n is even, it uses the bijection g:=(d, b)→(c, d). Since the permutation process only changes the pixel position, this stage remains the same as that of the Sudoku-AES cipher, except that the reference Sudoku matrix used for permutation Sp is now 256×256 instead of 16×16.

Finally, the "Sudoku MDS" process is applied to every 4×4 block in the permutated image over the finite field $GF(2^8)$.

The Sudoku-Image cipher uses the Rijndael key schedule (256 bits) to generate uniformly distributed round keys and sub-keys, where a round key is used to generate key-dependent Sudoku matrices in each round and a subkey is used to choose the S-Box during each pixel substitution processing. The number of iterations (rounds) is selected to be 10 to attain good confusion and diffusion properties. Although the Sudoku MDS is 4×4, a single pixel change in the plaintext will lead to as many as 16 changes in its corresponding ciphertext in a single encryption round. Thus, after ten rounds of encryption, there are as many as $16^{10}=2^{40}$ changes during the encryption process, which is much larger than the block size $256^2=2^{16}$. In such way, the Sudoku-Image cipher is able to resist the CPA on image ciphers.

Sudoku Cipher—RGB Images

A true color RGB image is composed of three primary colors (red, green, and blue). The intensity of each color is denoted as an 8 bit integer ranging from 0 to 255. As a result, various colors can be represented by using different combinations of the red, green, and blue colors. In other words, a RGB image can be considered as a 2D image with 24-bit pixel depth, where every 8 bits denotes the intensity of a primary color.

Since the Sudoku-Image cipher is designed to encrypt 8 bit grayscale image and a RGB image can be decomposed to three 8 bit images, the Sudoku-Image cipher can also be used for RGB images by simply encrypting each primary color channel. The encryption processing of a RGB image using the Sudoku-Image cipher can be described as follows:

Step 1: Decompose a RGB image P to three 8 bit images with respect to the three primary colors and denote these images as $P_R$, $P_G$, and $P_B$.

Step 2: Use the encryption key K−1 to encrypt the red channel 8 bit image $P_R$ to $C_R$.

Step 3: Use the encryption key K to encrypt the red channel 8 bit image $P_G$ to $C_G$.

Step 4: Use the encryption key K+1 to encrypt the red channel 8 bit image $P_B$ to $C_B$.

Step 5: Combine $C_R$, $C_G$, and $C_B$ to produce the color ciphertext image C as the output.

In such a way, the Sudoku-Image cipher can be used to encrypt RGB images. Other color image formats are convertible to the RGB format. As a result, other types of color images can be encrypted by the Sudoku-Image cipher as well.

Similar encryption methods can be found to deal with images of other data types. For example, if the input image is a 16 bit grayscale image, a common image format for medical images, then this type of image can be properly encrypted by splitting the 16 bits into two groups with 8 bits in each group. Then the encryption process can be considered to process two 8 bit grayscale plaintext images.

Sudoku Cipher—Video

Digital video is typically digital data in three dimensions, which is composed of a sequence of two-dimensional images, called video frames. It is a common storage format adopted by cable television, satellite television, video surveillance, and even portable digital camcorders. Although a digital video is a natural extension of a two dimensional digital image, it differs from a digital image in the following aspects: A digital video requires much more storage space than a static digital image; a digital video has a much higher information redundancy than a digital image because two consecutive video frames share a large amount of information; and a digital video often requires compression coding technologies to optimally balance data size and video quality.

Due to these differences, encryption of video often requires considering the effects of data compression and reconstruction for digital video encryption. In some embodiments of the technology, digital videos are encrypted by combining Sudoku arrays with a discrete cosine transform (DCT)-based video compression technology.

In a simplified model of coding a digital video, a video frame is first transformed to the DCT space, where a majority of the DCT coefficients (frame pixels in the DCT space) are close to zero while only a few pixel coefficients have a large magnitude. In the next stage, these DCT coefficients are quantized with respect to the video quality. As a result, most coefficients are quantized to zeros. In the coding stage, these quantized coefficients are coded using the lossless coding techniques for example, Human coding (see, e.g., R. Gonzalez and R. Woods. *Digital image processing*. Pearson/Prentice Hall, 2008). Finally, the encoded frame is outputted.

The decoding procedure of a digital video is almost the reverse of the coding procedure except that the "quantizer" is applied after the inverse discrete cosine transform (IDCT). Various approaches are used to attain video security in the above model, e.g., (1) Secret Frame—if the input frame is first encrypted using some image encryption technology, then an encrypted frame cannot be decrypted without using the correct image decryption techniques.

(2) Secret DCT—if the DCT is used in a secret way, for example a key dependent DCT, then an encrypted frame cannot be decrypted unless the correct DCT is used.

(3) Secret Codebook—if the code book used for coding is encrypted, then an encrypted frame cannot be displayed properly unless the correct codebook is used.

In conventional use, the first technique is commonly referred as a video scrambler. The second technique is a method of random transform. And the last technique is similar to conventional codebooks used in secure communication. The encrypted frame using the secret frame technique does not change its histogram and thus it should not be used solely due to its vulnerability to a chosen-plaintext attack. The technique of secret transform works well within the processing block, but leaks information about edges and homogenous regions in a frame. With respect to the last technique of secret codebook, although it hides frame information, the appearance of similar blocks indicates that these are close blocks in the frame. Moreover, the technique of secret codebook suffers from the shortcoming that the number of codes normally varies from one frame to another—if a one-time code book is used for each frame, then it is inefficient; but, if a universal codebook is used for all frames, then the efficiencies and power of using varied length code for compression is lost.

As a result, in some embodiments the present technology comprises combining the first two techniques using Sudoku arrays. In this video encryption algorithm, the 64×64 Sudoku matrix is used for matching the image block size of 8×8 in block-wise DCT in many applications, for example, Joint Photographic Experts Group (JPEG) and Moving Picture Experts Group (MEPG). The Sudoku matrix used in this compression compatible encryption algorithm: (a) Provides a reference matrix to perform image block shuffling and to generate secret frame images; (b) Provides a reference matrix to perform random DCT and to generate secret DCT images; and (c) Provides a reference matrix to perform the previous two procedures repeatedly for a large number of consecutive frame images based certain Sudoku properties.

The encryption procedure proceeds as follows: First, a 64×64 Sudoku S is generated for the first frame $F_1$. Then, this Sudoku matrix S is used as the reference matrix to shuffle 64 image blocks of size 8×8 in the first frame using the Sudoku permutation method with respect to image blocks. If the frame size is larger than 64×64, then such shuffling is applied repeatedly. In the next step, each 8×8 frame block is transformed to the DCT space using a random DCT matrix $M_{RDCT}$ defined as $$M_{RDCT} = U \times M_{DCT}$$

where MDCT is the conventional 8×8 DCT matrix defined as $$M_{DCT} = \begin{bmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix}$$

and U is a unitary permutation matrix defined with respect to a given digit d in S as $$U_d(i, j) = \begin{cases} 1, \text{ if the digit } d \text{ of the } j\text{th column is in the } i\text{th block} \\ 0, \text{ otherwise} \end{cases}$$

As a result, the random DCT matrix is obtained and used to transform the shuffled frame image blocks. Finally, the transformed frame is quantized and coded as they are in the normal procedure.

For the kth frame, the 64×64 key dependent Sudoku matrix S is changed and becomes $S_0$ by replacing the symbol order with the order of kth row. Its first row is used as the reference to shuffle 64-frame blocks. Then a unitary permutation matrix $U_d^n$ is generated for randomizing the nth frame block by finding the digit n in the first block-row of $S_0$. In other words, each 64×64 Sudoku matrix is used for encrypting a video of 64 frames.

After encrypting a frame from the "Lenna" image, the correct decoded frame is similar to the original frame except for some negligible details. Additional results of Sudoku video encryption on a frame dataset pulled from USC-SIPI: sequence database shows that the wrong decoded frames are obtained by using the conventional decoder with the DCT matrix defined above.

Computer Software and Hardware

In some embodiments, the methods and systems described herein are associated with a programmable machine designed to perform a sequence of arithmetic or logical operations as provided by the methods described herein. For example, some embodiments of the technology are associated with (e.g., implemented in) computer software and/or computer hardware. In one aspect, the technology relates to a computer comprising a form of memory, an element for performing arithmetic and logical operations, and a processing element (e.g., a microprocessor) for executing a series of instructions (e.g., a method as provided herein) to read, manipulate, and store data. In some embodiments, a microprocessor is part of a system for encryption and decryption, e.g., a system comprising one or more of a CPU, a graphics card, a user interface (e.g., comprising an output device such as display and an input device such as a keyboard), a storage medium, and memory components. Memory components (e.g., volatile and/or nonvolatile memory) find use in storing instructions (e.g., an embodiment of a process as provided herein) and/or data (e.g., a work piece such as an image or other data to be encrypted and/or to be decrypted). Programmable machines associated with the technology comprise conventional extant technologies and technologies in development or yet to be developed (e.g., a quantum computer, a chemical computer, a DNA computer, an optical computer, a spintronics based computer, etc.).

In some embodiments, the technology comprises a wired (e.g., metallic cable, fiber optic) or wireless transmission medium for transmitting encrypted data. For example, some embodiments relate to encrypting and/or decrypting data for transmission over a network (e.g., a local area network (LAN), a wide area network (WAN), an ad-hoc network, etc.). In some embodiments, programmable machines are present on such a network as peers and in some embodiments the programmable machines have a client/server relationship.

In some embodiments, plaintext and ciphertext are stored on a computer-readable storage medium such as a hard disk, flash memory, optical media, a floppy disk, etc.

In some embodiments, the technology provided herein is associated with a plurality of programmable devices that operate in concert to perform a method as described herein. For example, in some embodiments, a plurality of computers (e.g., connected by a network) may work in parallel to encrypt or decrypt data, e.g., in an implementation of cluster computing or grid computing or some other distributed computer architecture that relies on complete computers (with onboard CPUs, storage, power supplies, network interfaces, etc.) connected to a network (private, public, or the internet) by a conventional network interface, such as Ethernet, fiber optic, or by a wireless network technology.

For example, some embodiments provide a computer that includes a computer-readable medium. The embodiment includes a random access memory (RAM) coupled to a processor. The processor executes computer-executable program instructions stored in memory. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Computers are connected in some embodiments to a network or, in some embodiments, can be stand-alone machines. Computers may also include a number of external or internal devices such as a mouse, a CD-ROM, DVD, a keyboard, a display, or other input or output devices. Examples of computers are personal computers, digital assistants, personal digital assistants, cellular phones, mobile phones, smart phones, pagers, digital tablets, laptop computers, internet appliances, and other processor-based devices. In general, the computers related to aspects of the technology provided herein may be any type of processor-based platform that operates on any operating system, such as Microsoft Windows, Linux, UNIX, Mac OS X, etc., capable of supporting one or more programs comprising the technology provided herein. In some embodiments, MATLAB provides a programming environment suitable for performing embodiments of the methods provided herein. Some embodiments comprise a personal computer executing other application programs (e.g., applications). The applications can be contained in memory and can include, for example, a word processing application, a spreadsheet application, an email application, an instant messenger application, a presentation application, an Internet browser application, a calendar/organizer application, and any other application capable of being executed by a client device.

All such components, computers, and systems described herein as associated with the technology may be logical or virtual. Sudoku arrays and matrixes generated by the technology described herein may be presented on paper or in a virtual form such as on a computer display or projected. In addition, plaintext and ciphertext images may by embodied in a tangible medium (e.g., on paper) or as a virtual form such as on a computer display or projected. Indeed, any technology for presenting images is appropriate for the presentation of a Sudoku array (e.g., that finds use as a puzzle) or a plaintext or ciphertext image generated according to the technology described.

Data Types

In some embodiments, the user interacts with computer applications implementing aspects of the technology and data (e.g., files) associated with the applications via various input and output devices. In some embodiments, the data are image data, e.g., JPEG/JFIF, JPEG 2000, Exif, TIFF, RAW, PNG, GIF, BMP, PPM, PGM, PBM, PNM, WEBP, SVG, TGA, PCM, PDF, EPS, PostScript, PICT, SWF, and XAML. The technology is not limited to these exemplary formats; indeed, it is contemplated that the technology is appropriate for any image format, e.g., any bitmap, vector, or other format, comprising a two-dimensional (2D) image, a three-dimensional (3D) image, or any image having any number of dimensions (including images comprising a dimension in the time domain such as video).

The technology finds use for encrypting video formats such as digital (e.g., ATSC, DVB, ISDB, ISDB-Tb, and DMB) and analog (FCS, MAC, MUSE, NTSC, PAL, PAL-M, PALPlus, RS-343, SECAM, etc.) television signals; digital video encoding formats such as CCIR 601 (ITU-T), H.261 (ITU-T), H.263 (ITU-T), H.264/MPEG-4 AVC (ITU-T+ISO), M-JPEG (ISO), MPEG-1 (ISO), MPEG-2 (ITU-T+ISO), MPEG-4 (ISO), Ogg-Theora, VP8-WebM, and VC-1 (SMPTE); optical disc storage formats such as Blu-ray Disc, China Blue High-definition Disc (CBHD), DVD, Professional Disc, and Universal Media Disc (UMD); digital tape formats such as Betacam IMX, D-VHS, D-Theater, D1, D2, D3, D5 HD, Digital-S D9, Digital Betacam, Digital8, DV, HDV, ProHD, MicroMV, and MiniDV; and video encoded with various codecs such as lossless codecs, e.g., FFv1, Huffyuv, Lagarith, YULS, lossless mode x264; MPEG-4 part 2 codecs such as DivX, Xvid, MPEG-4, 3ivx; H.264/MPEG-4 AVC codecs such as x264, Nero Digital, QuickTime H.264, DivX Pro; and WMV, Microsoft MPEG-4v3, VP6, VP6-E, VP6-S, VP7, VP8, libtheora, Sorenson, RealVideo, Indeo, etc.

Other types of data files that may or may not comprise an image include, for example, word processor, spreadsheet, presentation, email, instant messenger, database, and other client application program content files or groups of files, web pages of various formats, such as HTML, XML, XHTML, and audio files, video files, or any other documents or groups of documents or information of any type whatsoever.

Puzzles and Toys

In some embodiments, the technology finds use in puzzles and toys. For example, in some embodiments a familiar 9×9 Sudoku puzzle is generated by producing a Sudoku matrix according to the methods provided herein and then one or more elements are removed from the matrix (e.g., removed, replaced by something other than a member of the set used to construct the matrix, replaced by an empty, blank grid space), leaving enough elements in the puzzle for a unique solution. The object of the puzzle is thus to determine the correct elements (e.g., numbers, symbols, characters, colors, shapes, etc.) to place into the grids from which elements were removed (e.g., an empty grid) and reproduce the Sudoku matrix, e.g., by ensuring that the Sudoku constraints are maintained (e.g., no repeated elements in any row, column, or block). However, the technology is not limited to the familiar 9×9 Sudoku puzzles. Indeed, the technology contemplates both two-dimensional puzzles of any number of elements (e.g., 4×4, 9×9, 16×16, 25×25, 36×36, 49×49, . . . $n^2 \times n^2$) and puzzles of more than two dimensions comprising any number of elements (e.g., a 9×9×9 puzzle; a 4×4×4×4 puzzle; etc.).

In some embodiments, two-dimensional Sudoku puzzles are presented on a printed medium (printed on paper); in some embodiments, three-dimensional Sudoku puzzles are constructed as a three-dimensional manipulable object (e.g., a Sudoku toy). Two-dimensional Sudoku puzzles, three-dimensional puzzles, and Sudoku puzzles comprising more than three dimensions are presented in some embodiments in a virtual environment, for example on an electronic display (e.g., a display connected to a computer). In some embodiments, a Sudoku puzzle is presented in a cyberspace, e.g., that virtually presents a space with characteristics similar to the real world that are familiar in the everyday experience of the user who solves the puzzle or that virtually represents a space with characteristics (e.g., physical properties and laws (e.g., laws of motion), sense of time, dimensions, etc.) that are different than the real world experienced by the user who solves the puzzle. In some embodiments, the user who solves the puzzle interacts with the virtual environment using an interface. In some embodiments, puzzles are presented virtually on virtual paper or as a virtual object comprising multiple (e.g., three or more) dimensions.

The technology provided herein has been described in several non-limiting exemplary embodiments. The technology is further described below in the context of several examples.

EXAMPLES

Example 1—Generating a 9×9 Sudoku

During the development of the technology provided herein, a 9×9 Sudoku array was generated using the parametric Sudoku array generator. Parameters for the methods were $$A = [\clubsuit, \text{\ding{100}}, \triangle, \spadesuit, \heartsuit, \diamond, ¥, \square, £]$$

$$F = [9 \ 3 \ 7 \ 2 \ 6 \ 1 \ 8 \ 5 \ 4]$$

$$D = [1 \ 2 \ 3] \text{ and } H_D = [2 \ 3 \ 1]$$

$$H_F = \begin{bmatrix} 1 & 2 & 3 \\ 2 & 1 & 2 \\ 3 & 3 & 1 \end{bmatrix} \text{ and } P = \begin{bmatrix} 2 & 2 & 1 \\ 1 & 3 & 2 \\ 3 & 1 & 3 \end{bmatrix}$$

$$Q = \begin{bmatrix} 2 & 3 & 2 \\ 3 & 1 & 1 \\ 1 & 2 & 3 \end{bmatrix} \text{ and } W = \begin{bmatrix} 3 & 1 & 2 & | & 1 & 2 & 1 \\ 2 & 1 & 2 & | & 3 & 1 & 1 \\ 3 & 1 & 2 & | & 3 & 3 & 3 \end{bmatrix}$$

In step 1, $L_{seed}$ was obtained from the Latin Square Generator ("LSG")

$$L_{seed} = LSG(D, H_D) = \begin{bmatrix} 3 & 1 & 2 \\ 1 & 2 & 3 \\ 2 & 3 & 1 \end{bmatrix}$$

In step 2, sequence F was divided into $F_1=[9\ 3\ 7]$, $F_2=[2\ 6\ 1]$, and $F_3=[8\ 5\ 4]$. Latin squares were formed from $F_1$, $F_2$, and $F_3$ as follows $$L_1 = \begin{bmatrix} 3 & 7 & 9 \\ 7 & 9 & 3 \\ 9 & 3 & 7 \end{bmatrix}, L_2 = \begin{bmatrix} 1 & 2 & 6 \\ 6 & 1 & 2 \\ 2 & 6 & 1 \end{bmatrix}, L_3 = \begin{bmatrix} 8 & 5 & 4 \\ 4 & 8 & 5 \\ 5 & 4 & 8 \end{bmatrix},$$

$L_{seed}$ was then substituted with $L_1$, $L_2$, and $L_3$ by matching the subscripts to the elements of $L_{seed}$ to provide a substituted $L_{seed}$:

$$L_{seed} = \begin{bmatrix} L_3 & L_1 & L_2 \\ L_1 & L_2 & L_3 \\ L_2 & L_3 & L_1 \end{bmatrix}$$

Expanding $L_{seed}$ with $L_1$, $L_2$, and $L_3$ results in the raw Sudoku array R $$R = \begin{bmatrix} 8 & 5 & 4 & 3 & 7 & 9 & 1 & 2 & 6 \\ 4 & 8 & 5 & 7 & 9 & 3 & 6 & 1 & 2 \\ 5 & 4 & 8 & 9 & 3 & 7 & 2 & 6 & 1 \\ 3 & 7 & 9 & 1 & 2 & 6 & 8 & 5 & 4 \\ 7 & 9 & 3 & 6 & 1 & 2 & 4 & 8 & 5 \\ 9 & 3 & 7 & 2 & 6 & 1 & 5 & 4 & 8 \\ 1 & 2 & 6 & 8 & 5 & 4 & 3 & 7 & 9 \\ 6 & 1 & 2 & 4 & 8 & 5 & 7 & 9 & 3 \\ 2 & 6 & 1 & 5 & 4 & 8 & 9 & 3 & 7 \end{bmatrix}$$

After the expansion, R is still a Latin square but is not a Sudoku because it violates the requirement that each block contain a single instance of each digit. According to step 4, the mapping matrix M is obtained as $$M = P + T = \begin{bmatrix} 2 & 2 & 1 \\ 1 & 3 & 2 \\ 3 & 1 & 3 \end{bmatrix} + \begin{bmatrix} 0 & 3 & 6 \\ 0 & 3 & 6 \\ 0 & 3 & 6 \end{bmatrix} = \begin{bmatrix} 2 & 5 & 7 \\ 1 & 6 & 8 \\ 3 & 4 & 9 \end{bmatrix}$$

and thus provides the permutation sequence $U=[2\ 5\ 7\ 1\ 6\ 8\ 3\ 4\ 9]$.

The Sudoku matrix S is then generated by shuffling the raw Sudoku R along rows with respect to U as follows:

$$S = \begin{bmatrix} 4 & 8 & 5 & 7 & 9 & 3 & 6 & 1 & 2 \\ 7 & 9 & 3 & 6 & 1 & 2 & 4 & 8 & 5 \\ 1 & 2 & 6 & 8 & 5 & 4 & 3 & 7 & 9 \\ 8 & 5 & 4 & 3 & 7 & 9 & 1 & 2 & 6 \\ 9 & 3 & 7 & 2 & 6 & 1 & 5 & 4 & 8 \\ 6 & 1 & 2 & 4 & 8 & 5 & 7 & 9 & 3 \\ 5 & 4 & 8 & 9 & 3 & 7 & 2 & 6 & 1 \\ 3 & 7 & 9 & 1 & 2 & 6 & 8 & 5 & 4 \\ 2 & 6 & 1 & 5 & 4 & 8 & 9 & 3 & 7 \end{bmatrix}$$

Then, shuffle every b rows of S using the corresponding column in Q to produce the Sudoku $$S = \begin{bmatrix} 7 & 9 & 3 & 6 & 1 & 2 & 4 & 8 & 5 \\ 1 & 2 & 6 & 8 & 5 & 4 & 3 & 7 & 9 \\ 4 & 8 & 5 & 7 & 9 & 3 & 6 & 1 & 2 \\ 6 & 1 & 2 & 4 & 8 & 5 & 7 & 9 & 3 \\ 9 & 3 & 7 & 2 & 6 & 1 & 5 & 4 & 8 \\ 8 & 5 & 4 & 3 & 7 & 9 & 1 & 2 & 6 \\ 3 & 7 & 9 & 1 & 2 & 6 & 8 & 5 & 4 \\ 5 & 4 & 8 & 9 & 3 & 7 & 2 & 6 & 1 \\ 2 & 6 & 1 & 5 & 4 & 8 & 9 & 3 & 7 \end{bmatrix}$$

Furthermore, a more random Sudoku can be obtained by applying Step 7 in Algorithm 2. Here the concept of a Sudoku "band" refers to the region that is defined as the b consecutive rows and the b consecutive blocks. For example, rows 1, 2, and 3 in a 9×9 Sudoku form a "band". According to Step 7 and W, the 1st equivalent set in row 3 and row 1 in the 1st band are swapped using Algorithm 3. Using the index set E=[1] and r1=7; r2=4, the minimum set to make row 3 and row 1 have the same set of digits is the index set E=[1, 4, 7] and r1=[7, 6, 4]; r2=[4, 7, 6]. Therefore, the elements in row 3 and row 1 are swapped under the same index set E.

$$S = \begin{bmatrix} 4 & 9 & 3 & 7 & 1 & 2 & 6 & 8 & 5 \\ 1 & 2 & 6 & 8 & 5 & 4 & 3 & 7 & 9 \\ 7 & 8 & 5 & 6 & 9 & 3 & 4 & 1 & 2 \\ 6 & 1 & 2 & 4 & 8 & 5 & 7 & 9 & 3 \\ 9 & 3 & 7 & 2 & 6 & 1 & 5 & 4 & 8 \\ 8 & 5 & 4 & 3 & 7 & 9 & 1 & 2 & 6 \\ 3 & 7 & 9 & 1 & 2 & 6 & 8 & 5 & 4 \\ 5 & 4 & 8 & 9 & 3 & 7 & 2 & 6 & 1 \\ 2 & 6 & 1 & 5 & 4 & 8 & 9 & 3 & 7 \end{bmatrix}$$

After the band swapping, the Sudoku S is obtained:

$$S = \begin{bmatrix} 4 & 9 & 3 & 7 & 1 & 2 & 6 & 8 & 5 \\ 7 & 2 & 6 & 8 & 5 & 4 & 3 & 1 & 9 \\ 1 & 8 & 5 & 6 & 9 & 3 & 4 & 7 & 2 \\ 9 & 3 & 7 & 2 & 6 & 1 & 5 & 4 & 8 \\ 6 & 1 & 2 & 4 & 8 & 5 & 7 & 9 & 3 \\ 8 & 5 & 4 & 3 & 7 & 9 & 1 & 2 & 6 \\ 3 & 7 & 9 & 1 & 2 & 6 & 8 & 5 & 4 \\ 2 & 4 & 8 & 5 & 3 & 7 & 9 & 6 & 1 \\ 5 & 6 & 1 & 9 & 4 & 8 & 2 & 3 & 7 \end{bmatrix}$$

Then, the symbol set of A is substituted into the Sudoku array to provide the 9×9 Sudoku array S.

$$S = \begin{bmatrix} ♠ & £ & △ & ✠ & ♣ & ¥ & ◇ & □ & ♡ \\ ¥ & ✠ & ◇ & □ & ♡ & ♠ & △ & ♣ & £ \\ ♣ & □ & ♡ & ◇ & £ & △ & ♠ & ¥ & ✠ \\ £ & △ & ¥ & ✠ & ◇ & ♣ & ♡ & ♠ & □ \\ ◇ & ♣ & ✠ & ♠ & □ & ♡ & ¥ & £ & △ \\ □ & ♡ & ♠ & △ & ¥ & £ & ♣ & ✠ & ◇ \\ △ & ¥ & £ & ♣ & ✠ & ◇ & □ & ♡ & ♠ \\ ✠ & ♠ & □ & ♡ & △ & ¥ & £ & ◇ & ♣ \\ ♡ & ◇ & ♣ & £ & ♠ & □ & ✠ & △ & ¥ \end{bmatrix}$$

Example 2—Generating a Key Dependent Sudoku

During the development of embodiments of the technology provided herein, a key dependent Sudoku was generated for encryption using the parametric Sudoku generator. In particular, an encryption key K was expanded to a Sudoku matrix S. The core idea of such a conversion is to treat an encryption key K as a seed or parameter in a pseudo-random number generator (PRNG) to produce a series of key-dependent sequences. These key-dependent sequences are used to generate permutation sequences used to generate the Sudoku array.

A linear congruential generator (LCG) is a pseudo-random generator known in the art. See, e.g., J. Gentle. "Random number generation and Monte Carlo methods" in *Statistics and computing* (Springer, 2003), incorporated herein by reference in its entirety for all purposes. Such a LCG generator can be iteratively defined as $$LCG: X_{n+1} = (aX_n + c) \bmod m$$

In the following Algorithm 4, the length of the encryption key is assumed to be 256 bits (64 bytes). This algorithm transforms a 256-bit key to a set of parameters required as inputs into the Sudoku array generator. A function (e.g., rand(.)) is used to extract the least significant 16~30 bits in the subgroup and to form a decimal number. In Step 4, the conversion from an integer sequence I to a permutation sequence $e_\pi$ of the same length l can be done by first sorting an integer sequence I and obtaining the sorted version I', where I'=sort(I); and then by finding the permutation sequence $e_\pi$ such that I'[i]=I[$e_\pi$[i]] for any i that is a member of the set {1, 2, . . . , l}. Finally, all of these output parameters are obtained. When this set of parameters is input to the Sudoku array generator described in Algorithm 2, a N×N Sudoku array is then generated.

Algorithm 4 (Generate a Sudoku Parameter Set from a Key)

Input
  K = an encryption key of 256 bits
  N = the size of the Sudoku matrix
Output
  A = a Nsymbol array without repetition
  F = a permutated sequence of digits from 1 to N
  D = a permutated sequence of digits from 1 to b
  $H_F$ = a b × b matrix where each column is a permutation of digits from 1 to N
  $H_D$ = a permutated sequence of digits from 1 to b
  P = a b × b matrix where each column is a permutation of digits from 1 to b
  Q = a b × b matrix where each column is a permutation of digits from 1 to b
  W = a b × b × 2 matrix containing digits from 1 to b
Step 1. Set symbol sequence a = {1, 2, 3, ... , N} and divide the 64 byte key
into 8 subgroups as $G_1, G_2, G_3, ... , G_8$, each of which contains 8 bytes (32 bits).
Step 2. Calculate the required iterations T = [(3N + 2√N)/8], where [.] is the
rounding function towards infinity.
Step 3. Iteratively generate a sequence Seq of length T, where each part of T
is compatible with the corresponding parameters in the Sudoku array generator.
  set i = 1
  for iter = 1 → T do
    for k = 1 → 8 do
      $G_k$ = $LCG_k(G_k)$ % generate an 8-byte pseudo-random number
      % extract the random part of this pseudo random number
      Seq[i] = rand($G_k$)
      i = i + 1
    end for
    $G_1$ = $G_8$
    for k = 2 → 8 do
      $G_k$ = $G_{k-1}$ % shift the random number register to the right
    end for
  end for
Step 4. Sort the elements of sequence Seq and obtain permutation sequences
F, D, $H_F$, $H_D$, P, and Q from the sequence index.
Step 5. Use module √N operation to obtain sequence W.

Example 3—Image Encryption Using the Sudoku Matrix

During the development of embodiments of the technology, methods were developed for encrypting an image using a Sudoku matrix. Accordingly, described here is an illustrative encryption scheme using the Sudoku matrix. The entire algorithm can be divided into three main stages: 1) generating the Sudoku Reference Matrix, 2) changing pixel values, and 3) changing pixel positions. Also, the encryption process can be described as follows: first, a Sudoku Reference Matrix Ref is generated and then the input image is resized to match the size of Ref. Then, the input image's pixel values are changed according to the Ref matrix. Finally, the input image's pixel positions are also shuffled according to the Ref matrix.

The decryption process is simply the reverse of the encryption process. A security key is used to generate the Sudoku Reference Matrix Ref. An encrypted image is decrypted by first changing the positions of image pixels and then changing the pixel values according to the Ref matrix. Finally, the decrypted image is obtained as the output.

Figure 23:
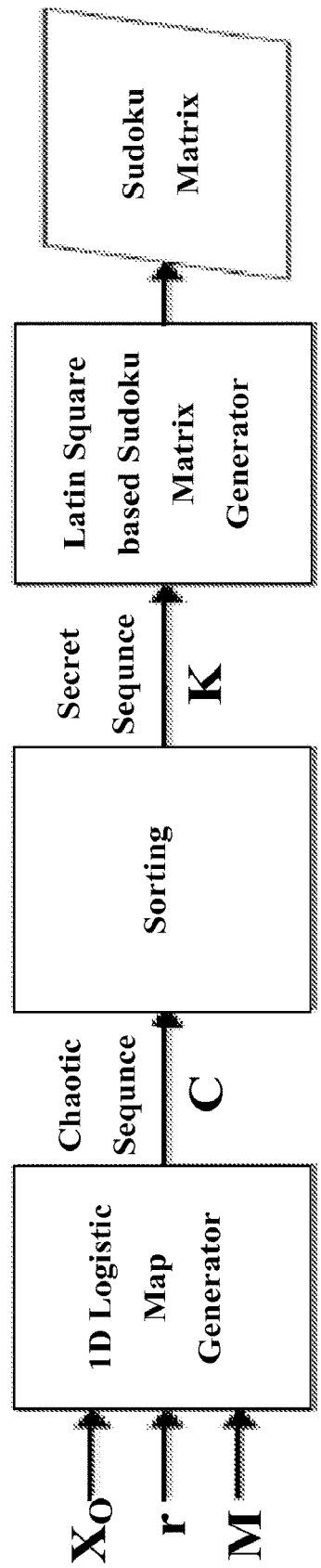
FIG. 23 shows a flowchart of an embodiment of the Sudoku reference matrix generator provided herein

An illustrative version of each processing stage is provided below. FIG. 23 shows a flow chart of the Sudoku reference matrix generator according to this embodiment of the technology. The following steps are described in reference to FIG. 23.

Generating a Chaotic Sequence C Using a Logistic Map

The inputs ($x_0$, r) determine the initial value for the logistic map while M determines the length of the Chaotic Sequence C, where Length(C)=N=$M^2$. The definition of a discrete Logistic map is as follows $$X_{n+1} = rx_n(1-x_n)$$

This equation shows that once ($x_0$, r) are given, the whole chaotic sequence is determined.

Generating a Secret Sequence K from the Sorting Sequence C

The Secret Sequence K is generated from the order of the indices from a sorted Chaotic Sequence C. The Chaotic Sequence C=[$C_1$, $C_2$, . . . , $C_N$]; then after sorting C according to some certain order (without losing generality, the ascendant order is used here), C=[$C_{k1}$, $C_{k2}$, . . . , $C_{kN}$]. Finally, the Secret Sequence K=[$k_1$, $k_2$, . . . , $k_N$] is obtained.

Generating the Sudoku Matrix

First of all, the algorithm is presented for generating a Latin square using a ring shift method. The input is a sequence of numbers B with length M and the output is a Latin square L with size M×M Ring Shift Algorithm for Generating a Latin Square
if (Row#=1)
{L[Row#1]=B}
for (Row#=2: M)
{L[Row#m]=ring_shift {L[Row#(m−1)]}}
where the function of "ring_shift" is always to move the first element to the end Suppose the Secret Sequence is K with length N(N=$M^2$). Then, generating an N×N Sudoku matrix using Latin Squares can be described as follows:

Algorithm for Generating a Sudoku Matrix Using Latin Squares

1. Generate a size M×M Latin Square $L_{seed}$ using the ring shift method with sequence B, where B=[1, 2, . . . , M]

2. Group the secret sequence K into M subgroups (each subgroup has M elements) and generate the ith sub-Latin square for the ith subgroup 3. For each element in $L_{seed}$, substitute itself with its corresponding sub-Latin square and generate L 4. Resample the matrix of L for every M rows and get its corresponding Sudoku matrix S.

Generating a Sudoku Reference Matrix

Suppose ($x_0$, r)=(0.4, 3.8) and M=3; N=9. Then, the resulting chaotic sequence C is [0.4000, 0.9120, 0.3050, 0.5954, 0.2943, 0.7892, 0.6322]. After sorting C by ascending order, C=[$C_7$, $C_3$, $C_1$, $C_5$, $C_9$, $C_8$, $C_4$, $C_2$, $C_6$]. Therefore, the Secret Sequence K is [7, 3, 1, 5, 9, 8, 4, 2, 6]. In the next step, this Secret Sequence K is used for generating a Sudoku reference matrix as described above. Here K=[7, 3, 1, 5, 9, 8, 4, 2, 6], and the size of expected Sudoku matrix is 9×9 (N=9). First, a Latin square with M=3 and B=[1, 2, 3] is generated by the above algorithm for generating a Sudoku matrix using Latin Squares. In this algorithm, Step 1 produces the following seed Latin Square:

$$L_{seed} = \begin{bmatrix} 1 & 2 & 3 \\ 2 & 3 & 1 \\ 3 & 1 & 2 \end{bmatrix}$$

In the next step, K is divided into 3 subgroups:
subgroup#1=[7, 3, 1]
subgroup#2=[5, 9, 8]
subgroup#3=[4, 2, 6]

Each subgroup is used to generate its corresponding sub-Latin square:

$$\text{Sub-Latin Square \#1} = \begin{bmatrix} 7 & 3 & 1 \\ 3 & 1 & 7 \\ 1 & 7 & 3 \end{bmatrix}$$

$$\text{Sub-Latin Square \#2} = \begin{bmatrix} 5 & 9 & 8 \\ 9 & 8 & 5 \\ 8 & 5 & 9 \end{bmatrix}$$

$$\text{Sub-Latin Square \#3} = \begin{bmatrix} 4 & 2 & 6 \\ 2 & 6 & 4 \\ 6 & 4 & 2 \end{bmatrix}$$

In the third step, the corresponding elements in $L_{seed}$ are substituted with the sub-Latin squares and we get:

$$L = \begin{bmatrix} \text{Sub-Latin Square \#1} & \text{Sub-Latin Square \#2} & \text{Sub-Latin Square \#3} \\ \text{Sub-Latin Square \#2} & \text{Sub-Latin Square \#3} & \text{Sub-Latin Square \#1} \\ \text{Sub-Latin Square \#3} & \text{Sub-Latin Square \#1} & \text{Sub-Latin Square \#2} \end{bmatrix}$$

Equivalently $$L = \begin{bmatrix} \begin{bmatrix} 7 & 3 & 1 \\ 3 & 1 & 7 \\ 1 & 7 & 3 \end{bmatrix} & \begin{bmatrix} 5 & 9 & 8 \\ 9 & 8 & 5 \\ 8 & 5 & 9 \end{bmatrix} & \begin{bmatrix} 4 & 2 & 6 \\ 2 & 6 & 4 \\ 6 & 4 & 2 \end{bmatrix} \\ \begin{bmatrix} 5 & 9 & 8 \\ 9 & 8 & 5 \\ 8 & 5 & 9 \end{bmatrix} & \begin{bmatrix} 4 & 2 & 6 \\ 2 & 6 & 4 \\ 6 & 4 & 2 \end{bmatrix} & \begin{bmatrix} 7 & 3 & 1 \\ 3 & 1 & 7 \\ 1 & 7 & 3 \end{bmatrix} \\ \begin{bmatrix} 4 & 2 & 6 \\ 2 & 6 & 4 \\ 6 & 4 & 2 \end{bmatrix} & \begin{bmatrix} 7 & 3 & 1 \\ 3 & 1 & 7 \\ 1 & 7 & 3 \end{bmatrix} & \begin{bmatrix} 5 & 9 & 8 \\ 9 & 8 & 5 \\ 8 & 5 & 9 \end{bmatrix} \end{bmatrix} = \begin{bmatrix} 7 & 3 & 1 & 5 & 9 & 8 & 4 & 2 & 6 \\ 3 & 1 & 7 & 9 & 8 & 5 & 2 & 6 & 4 \\ 1 & 7 & 3 & 8 & 5 & 9 & 6 & 4 & 2 \\ 5 & 9 & 8 & 4 & 2 & 6 & 7 & 3 & 1 \\ 9 & 8 & 5 & 2 & 6 & 4 & 3 & 1 & 7 \\ 8 & 5 & 9 & 6 & 4 & 2 & 1 & 7 & 3 \\ 4 & 2 & 6 & 7 & 3 & 1 & 5 & 9 & 8 \\ 2 & 6 & 4 & 3 & 1 & 7 & 9 & 8 & 5 \\ 6 & 4 & 2 & 1 & 7 & 3 & 8 & 5 & 9 \end{bmatrix}$$

Finally, L is resampled for every M=3 rows:

$$L = [R1, R2, R3, R4, R5, R6, R7, R8, R9]^T \xrightarrow{\text{resample for every 3 rows}}$$

$$[R1, R4, R7, R2, R5, R8, R3, R6, R9]^T = S$$

Therefore, $$S = \begin{bmatrix} \begin{bmatrix} 7 & 3 & 1 \\ 5 & 9 & 8 \\ 4 & 2 & 6 \end{bmatrix} & \begin{bmatrix} 5 & 9 & 8 \\ 4 & 2 & 6 \\ 7 & 3 & 1 \end{bmatrix} & \begin{bmatrix} 4 & 2 & 6 \\ 7 & 3 & 1 \\ 5 & 9 & 8 \end{bmatrix} \\ \begin{bmatrix} 3 & 1 & 7 \\ 9 & 8 & 5 \\ 2 & 6 & 4 \end{bmatrix} & \begin{bmatrix} 9 & 8 & 5 \\ 2 & 6 & 4 \\ 3 & 1 & 7 \end{bmatrix} & \begin{bmatrix} 2 & 6 & 4 \\ 3 & 1 & 7 \\ 9 & 8 & 5 \end{bmatrix} \\ \begin{bmatrix} 1 & 7 & 3 \\ 8 & 5 & 9 \\ 6 & 4 & 2 \end{bmatrix} & \begin{bmatrix} 8 & 5 & 9 \\ 6 & 4 & 2 \\ 1 & 7 & 3 \end{bmatrix} & \begin{bmatrix} 6 & 4 & 2 \\ 1 & 7 & 3 \\ 8 & 5 & 9 \end{bmatrix} \end{bmatrix}$$

It is easy to verify that in S, in each row and in each column and in each block, each number occurs exactly once; thus, S is a Sudoku matrix. We refer to this Sudoku matrix as Ref for use as a reference matrix in further processing.

Changing Image Data Values Using a Sudoku Matrix

Pixel intensities or values in a digital image carry abundant information. For example, brightness and contrast are closely related to pixel intensity in an image, and these characteristics of an image provide visual cues for identifying objects portrayed in the image. Therefore, one can encrypt a digital image by changing its data values (e.g., pixel intensities, brightness, contrast, etc.). An encrypted image is expected to have a different histogram than the original image. An ideal output histogram follows a uniform distribution.

Figure 24:
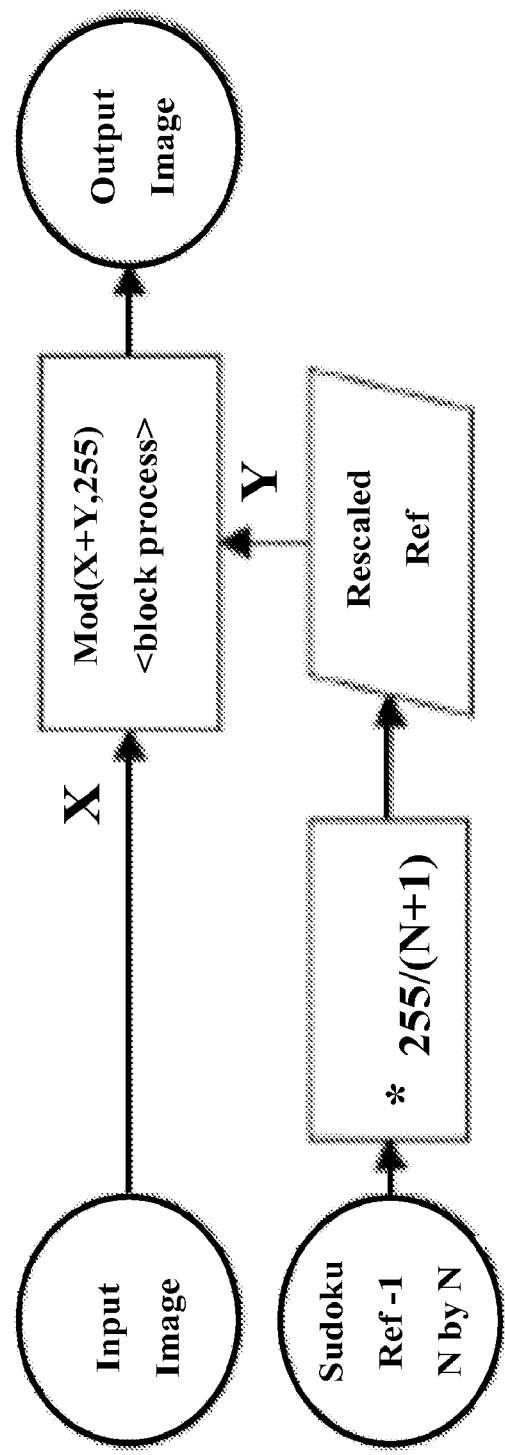
FIG. 24 is a flowchart showing an embodiment of a process for changing (e.g., encrypting) image values using a Sudoku matrix

The process of changing image data values using a Sudoku Matrix is shown in FIG. 24. First, each number in the Sudoku Ref matrix are decreased by 1 so that the possible values become [0, 1, 2, . . . , N−1]. Then the Ref matrix is rescaled such that the numbers [1, 2, . . . , N] now are replaced by [0, 255/(N+1), 255*(N−1)/(N+1)], respectively.

Figure 25:
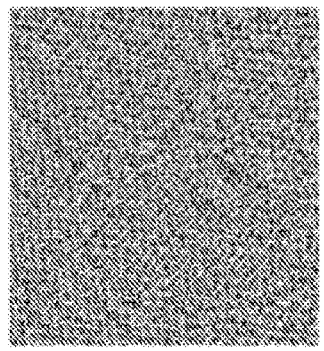
FIG. 25 shows the results of encrypting images with the encryption technology provided herein.
Figure 25:
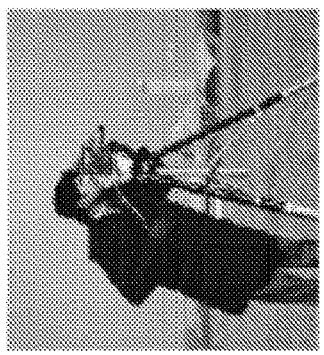
Figure 25:
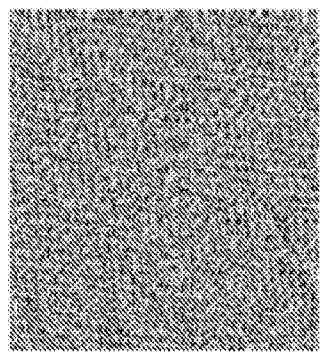
Figure 25:

The original image is padded and/or resized to fit the size of the Sudoku Ref such that the new image is divided into exactly R integer blocks. This new image will be used for processing in which the input image is processed block by block. For each block, the operation of mod(X+Y, 255) is applied, where X is some selected block in the input image and Y is the rescaled Ref matrix. FIG. 25 shows the differences between before and after applying the proposed algorithm.

Changing Image Data Positions Using a Sudoku Matrix

A shuffling algorithm can be expressed as a mapping function $f$, e.g., such that for all (x, y) that are elements of I, where (x, y) is the (row, column) pair for some pixel in image I, there exists (r, c)=$f$(x, y), where (r, c) is the new (row, column) pair for the input pixel after shuffling. The mapping function $f$ should be bijective (a one-to-one and onto function). In addition, if one does not want to change the image size after shuffling, then $f$ should be a self-map function as well. Here, the "self-map" property guarantees that the domain and the range of $f$ are the same and the bijective property ensures a one-to-one correspondence between the domain and the range.

In any Sudoku reference matrix Ref, the mapping relationship between a (row, column) pair and a (block, digit) pair is a self-map and bijective function. Therefore, this relationship can be also used for shuffling the image and we call this mapping a Sudoku mapping.

Sudoku Mapping: (x, y)→(r, c), where (r, c) is the (block#, digit#) for (x, y) in Ref.

Figure 26:
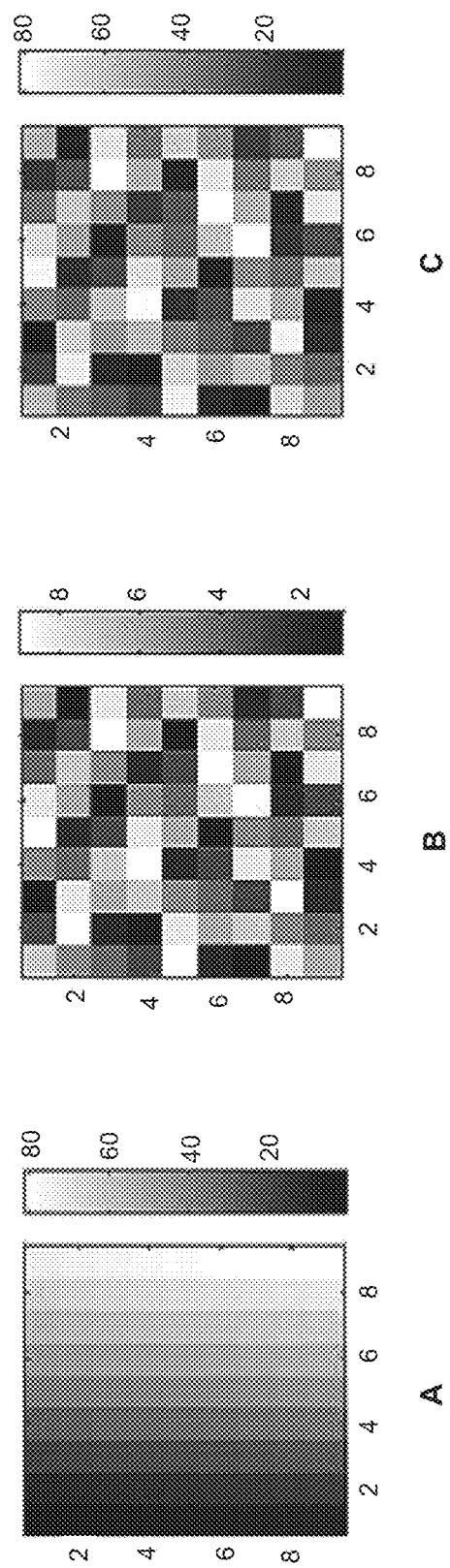
FIG. 26 shows an example of using Sudoku mapping for a 9×9 image.

FIG. 26 shows an example of using the Sudoku mapping for a 9×9 image. FIG. 26(a) is a sample linear image having pixel values that change linearly from 1 in the upper left corner to 81 for the lower right corner. FIG. 26(b) is the Sudoku reference matrix. FIG. 26(c) is the resulting image after the Sudoku mapping (Note the ranges of the color bars in FIG. 26). As expected, the linearity of the original image has been disordered after shuffling.

Since the image is processed block by block, shuffling pixels occurs within each block but not between or among blocks. Accordingly, one can change to a bigger size Ref matrix such that the image has fewer blocks or one can repeat the shuffling process until the degree of disorder is sufficiently large. Here, one can simply define the degree of disorder d as follows. Note, in the formula, std denotes the standard deviation function:

$$d=\text{degree of disorder}=\text{std}(\text{original image}-\text{shuffled image})/\text{std}(\text{original image})$$

Figure 27:
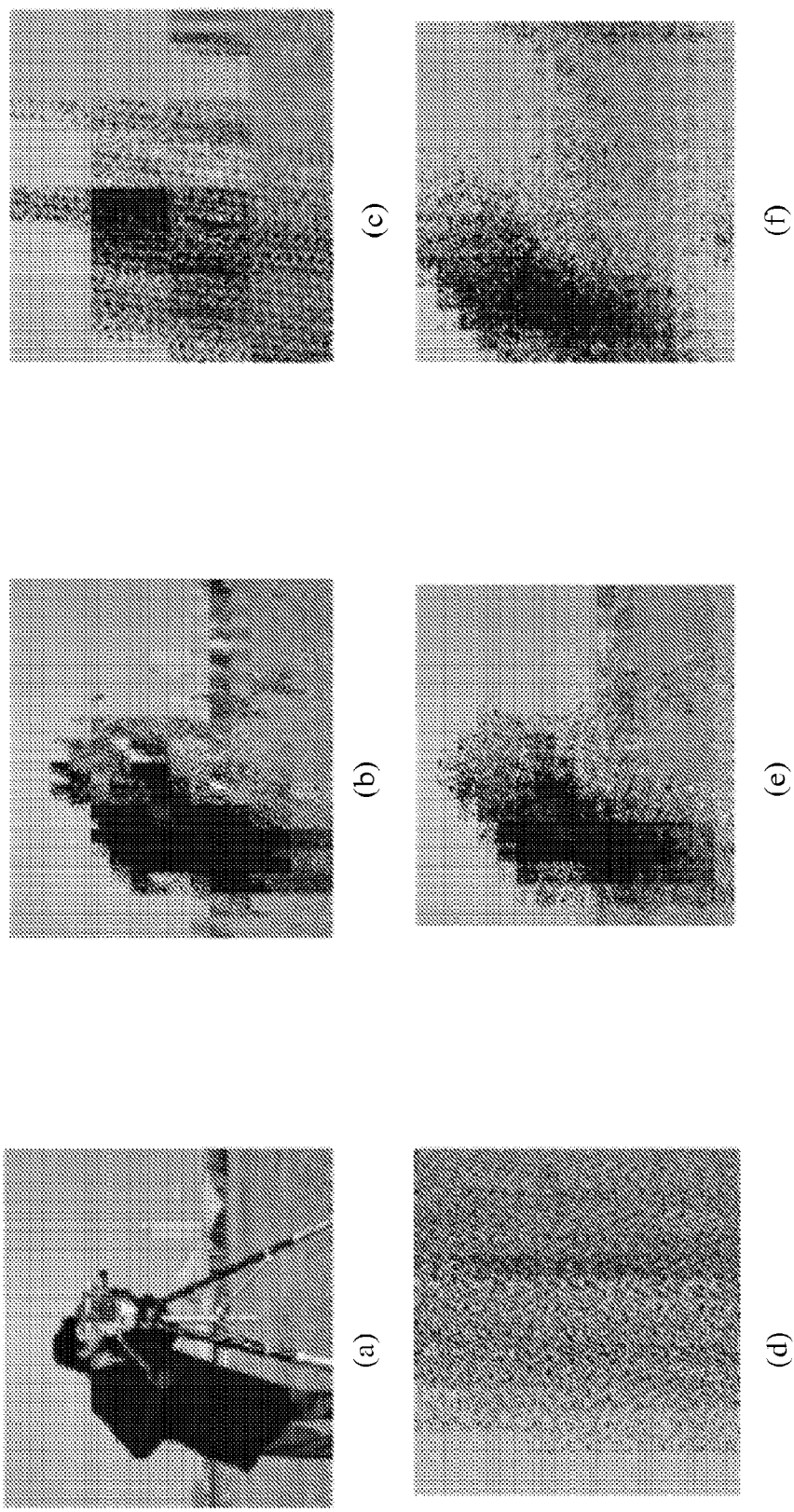
FIG. 27 shows the results of an exemplary Sudoku shuffling.
Figure 28:
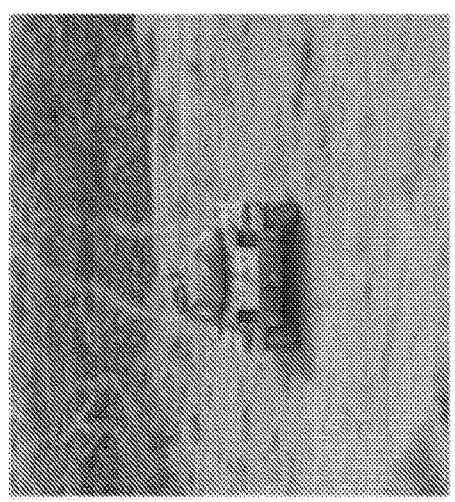
FIG. 28 shows encryption and decryption of the "Tank" image using a Ref size of 64×64.
Figure 28:
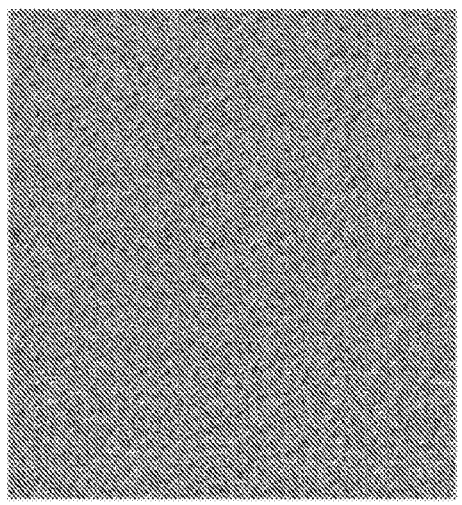
Figure 28:
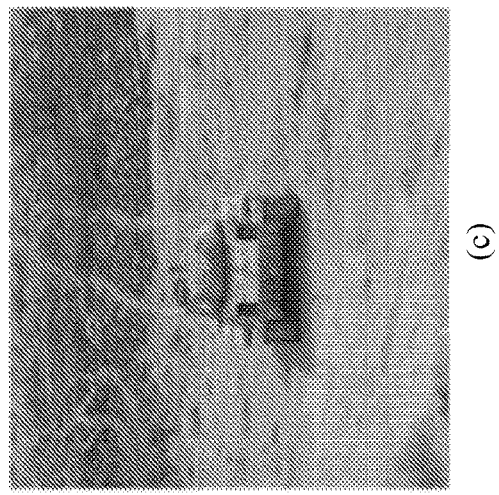
Figure 29:
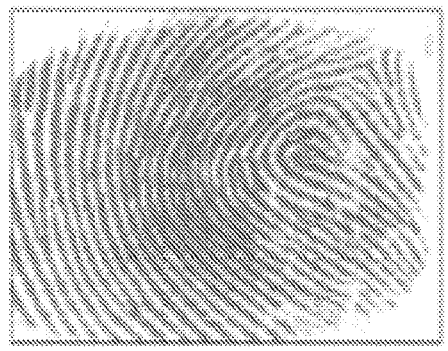
FIG. 29 shows encryption and decryption of the "Fingerprint" image using a Ref size of 25×25.
Figure 29:
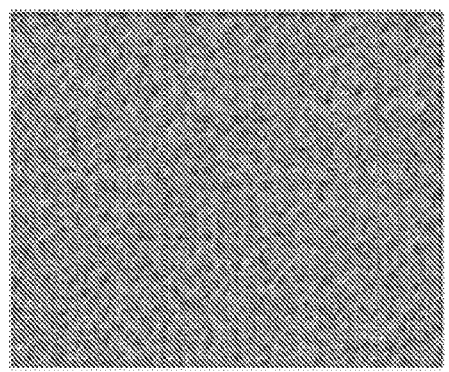
Figure 29:
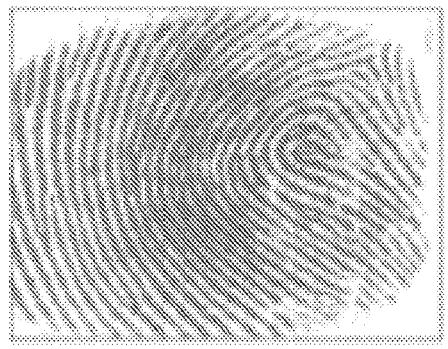
Figure 30:
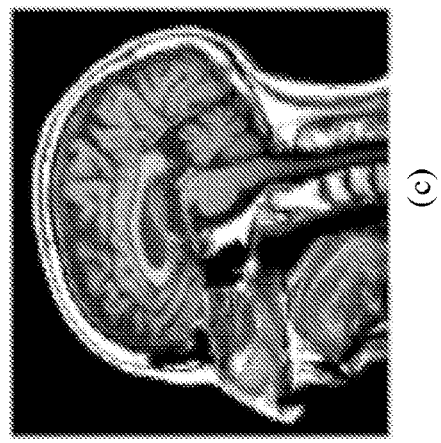
FIG. 30 shows encryption and decryption of the "Brain MRI" image using a Ref size of 16×16.
Figure 30:
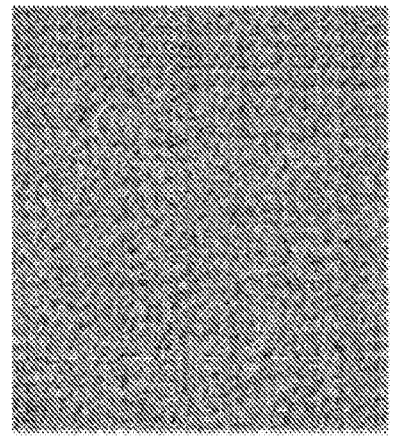
Figure 30:
Figure 31:
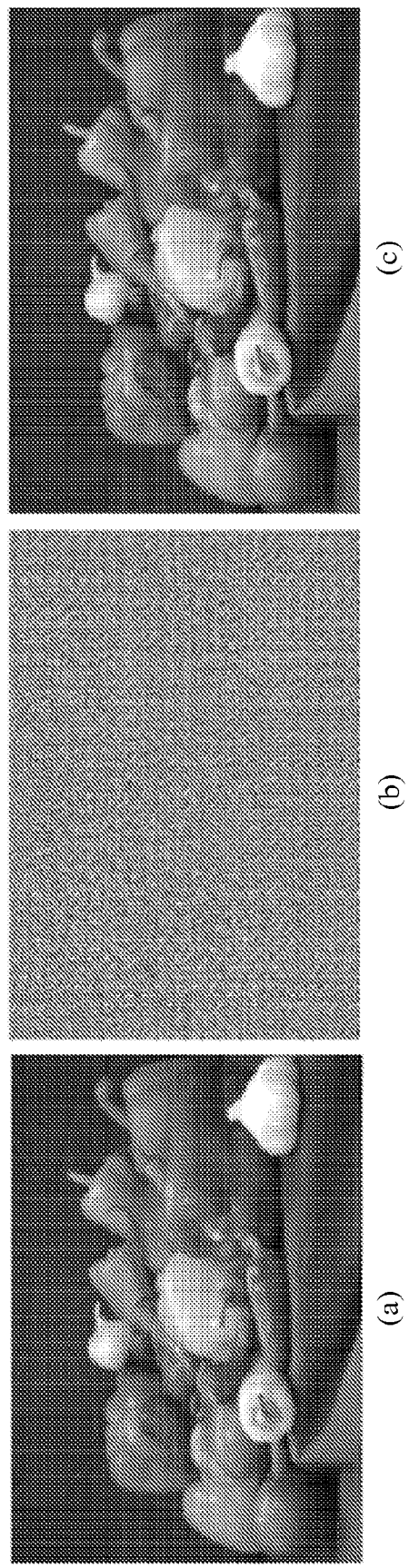
FIG. 31 shows encryption and decryption of the "Peppers" image using a Ref size of 16×16.

FIG. 27(a) shows the shuffling result for the 256×256 "cameraman" image. As shown, a bigger Ref produces a higher degree of disorder. In (b) through (d), the shuffling algorithm is only applied once. In some embodiments, an alternative way to improve the shuffling result is to apply the shuffling process repeatedly to the image and shift the image for several pixels. Although one pixel is still shuffled within its own blocks, its own blocks are different from time to time when one shifts the image for each iteration. Once the action shifting an image at each iteration is predefined, it is possible for a pixel to be shuffled into a larger region and thus the scrambling result is improved. FIGS. 27(e) and (f) displays the outputs using this scheme. Here, the predefined shifting actions are: when the iteration# is odd, shift the image rightwards and when the iteration# is even, shift it downwards. As seen, the degree of disorder increases as the number of iteration increases.

In these examples, the shuffling algorithm comprised both approaches. Both the Ref matrix and the times of iteration are contained in the encryption keyword.

Example 4—Experimental Results and Security Analysis

In some embodiments, an image processing software package such as MATLAB is used as the engine for the image processing experiments. An RGB image is stored in MATLAB as an M×N×3 data array that defines the red, green, and blue color components for each individual pixel. The color of each pixel is determined by the combination of the red, green, and blue intensities stored in each color plane at the pixel location. A gray image is stored in MATLAB as an M×N data array that defines gray intensities in the color plane at the pixel location.

In the simulations, several images are used for testing. They are a 512×512 grayscale "Tank" image, a 364×256 grayscale "Fingerprint" image, a 367×380 grayscale "Brain MRI" image, and a 512×384 RGB "Peppers" image. These images were encrypted and decrypted with the Sudoku methods provided herein. Ref matrix sizes for encrypting the Tank, Fingerprint, Brain, and Peppers images were 64, 25, 16, and 16, respectively. The results of the encryption and decryption are shown in FIGS. 28-31.

These data show that the algorithm is robust for different image formats and it is effective for encrypting various types of sensitive image data. Furthermore, the histogram of each encrypted image appeared almost flat. To test the randomness of each encrypted image, moment function analysis and correlation analysis were also applied. Table 2 and Table 3 show the results of these analyses.

A good encryption algorithm is expected to resist all kinds of known attacks. Currently, the two main types of attacks are those based on statistical analysis and key space analysis. To demonstrate the robustness of the Sudoku methods, exemplary security analyses were performed on encrypted images.

Statistical Analysis

Figure 32:
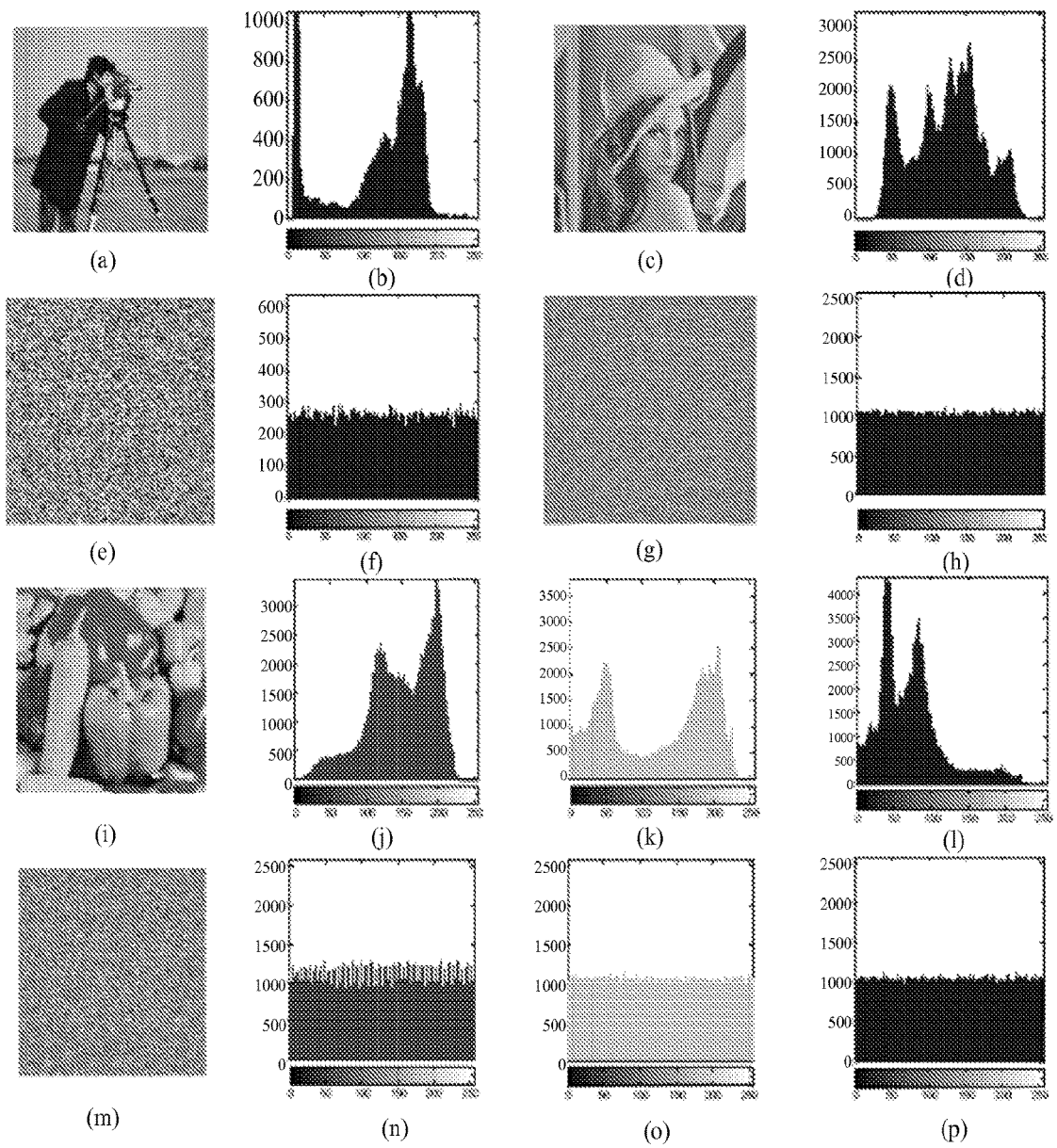
FIG. 32 shows histogram statistical analysis of the test images encrypted using the technology provided herein.

Using the image histogram is a very straight forward way to illustrate the confusion and diffusion properties of an encrypted image. Three images were used for this analysis: a 256×256 grayscale image named "Cameraman", a 512×512 grayscale image named "Lenna", and a 512×512 RGB image named "Pepper". In FIGS. 32(a), (c), and (i) are the original images, the corresponding encrypted images are shown in FIGS. 32(e), (g), and (m). Histograms of the original ((b), (d), (j)-(l)) and encrypted (f), (h), (n)-(p)) images are shown as well. As shown, the histograms of the encrypted images almost follow a uniform distribution and they are significantly different from the histograms of the original images for both grayscale and RGB images.

In order to simplify the analysis process, the "Cameraman" image and its encrypted image are used for further analysis described hereinafter. Next, moment function analysis is applied to FIGS. 32(*a*) and (*e*). In statistics, the method of moments is used to estimate population parameters such as mean, variance, median, skewness, kurtosis, etc. In Table 2, four moments are compared for an ideal uniform distributed image, the original Cameraman image, and its encrypted image. From Table 2, it is easy to see that the encrypted image's mean, standard deviation, skewness, and kurtosis values are very close to those of the ideal uniform distributed image.

TABLE 2

Moment function analysis

| Moments | Ideal uniform distributed image | Original Cameraman image | The encrypted image |
|---|---|---|---|
| Mean | 127.5 | 118.7245 | 127.1893 |
| Standard Deviation | 74.0450 | 62.3417 | 74.1434 |
| Skewness | 0 | −0.7381 | 0.0056 |
| Kurtosis | 1.8000 | 2.0915 | 1.7935 |

Figure 33:
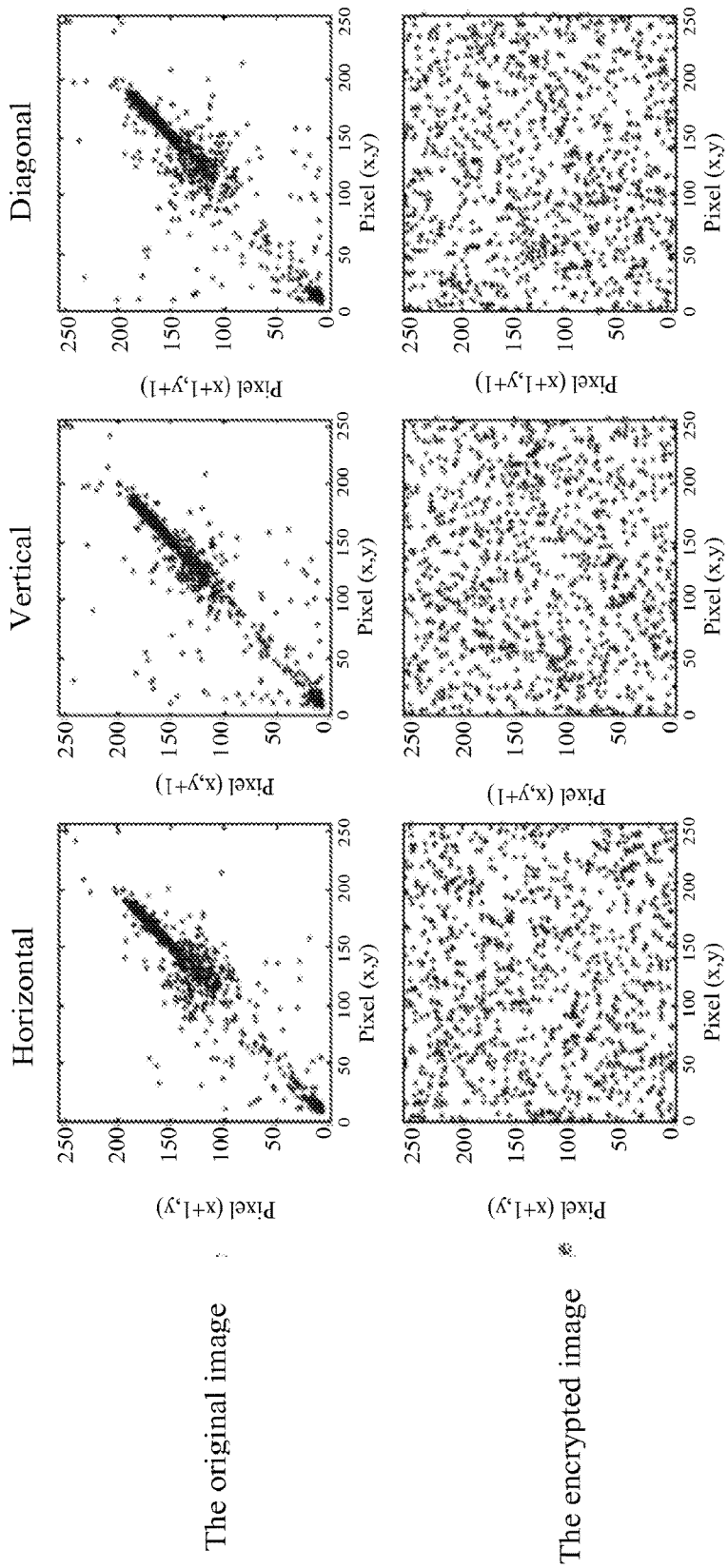
FIG. 33 is a plot showing the correlations between pixel pairs along horizontal, vertical, and diagonal directions for the "Cameraman" image and its encrypted image (FIG. 32(a) and FIG. 32(e), respectively).

To test the correlation between two adjacent pixels in the original image and the encrypted image, the correlation coefficients along horizontal, vertical, and diagonal directions were calculated. In addition, 1024 pairs of adjacent pixels in horizontal, vertical, and diagonal direction from the original image and the encrypted image were randomly selected. Their correlation Figures are shown in FIG. 33 and the data are presented in Table 3. From the Figure, it is clear to see that the correlation between a pair of pixels in the encrypted image is much smaller than that of pixels in the original image.

TABLE 3

Correlation coefficients of adjacent pixels in original & encrypted images

| Direction | Original Cameraman Image | The Encrypted Image |
|---|---|---|
| Horizontal | 0.9333 | −0.0058 |
| Vertical | 0.9565 | −0.0157 |
| Diagonal | 0.9059 | 0.0168 |

Key Space Analysis

A good encryption scheme is sensitive to the secret keys and has a key space that is large enough to make brute force attacks infeasible. The proposed key has the format $[x_0, r, M, T]$: the first two parameters $[x_0, r]$ are used to generate the logistic chaotic sequence; the third parameter, an integer M is used to control the size of the Ref matrix; and the fourth parameter, an integer T, is used to control the number of iterations of Sudoku mapping.

Figure 34:
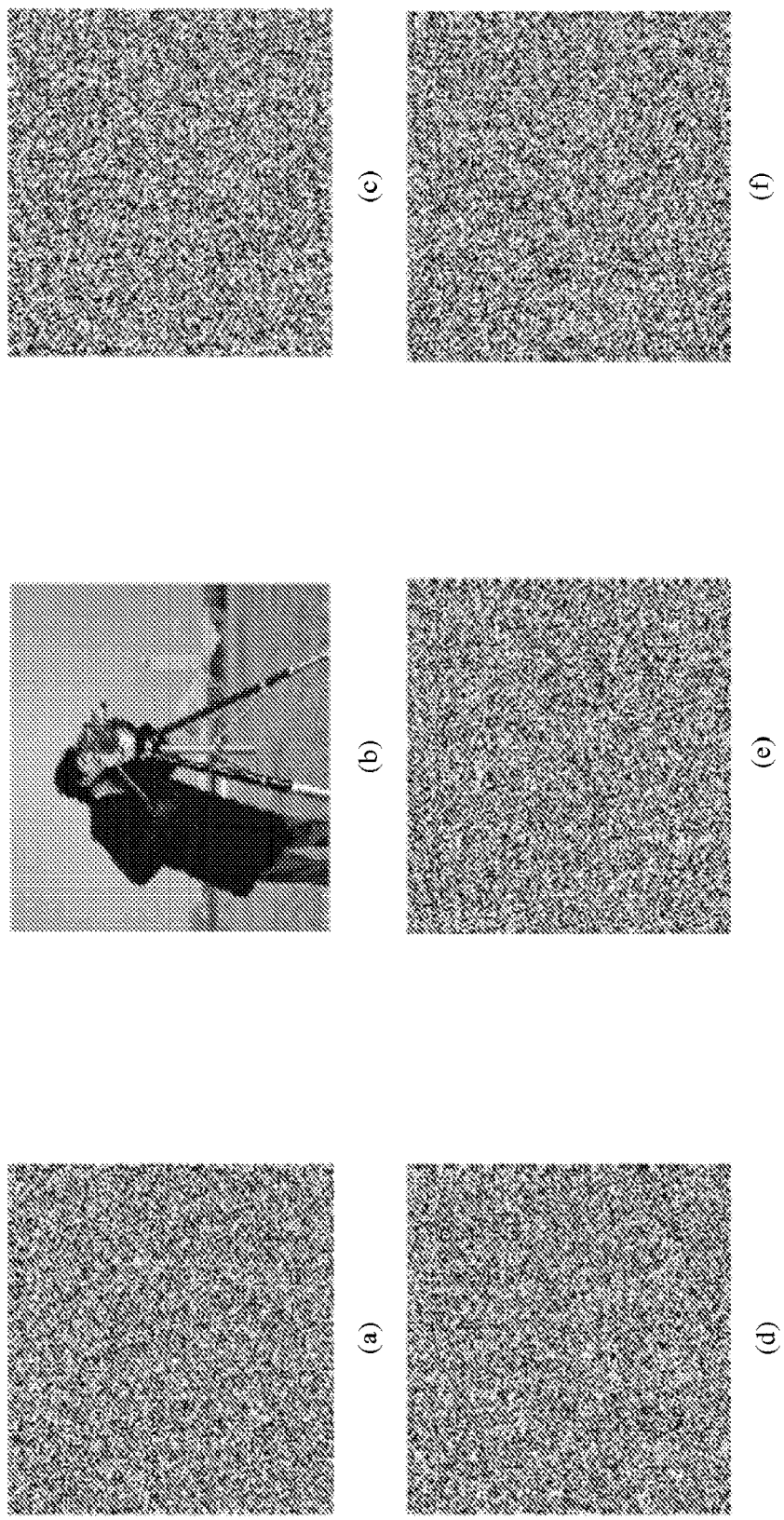
FIG. 34 shows the results of a key sensitivity analysis of the "Cameraman" image and its ciphertext using different keys.

In particular, $x_0$ is some number in the interval $[0, 1]$; r is the parameter in the Logistic map and it is in the interval $[3.6, 4]$ to produce chaotic behavior. The integer M represents the size of the blocks in the Latin square and it also indirectly controls the length of the chaotic sequence and the size of the Ref matrix N, where $N=M^2$. Theoretically, the key space could be at least as large as the space of possible Ref matrices, since $(x_0, r)$ generates any random-like sequence; but, the Ref matrix has a limitation on its size that is $M^2$. The total number of possible Ref matrices is $\Sigma_1^i M^3!$, where i is the maximum allowed size of the Ref matrix. This number increase very fast as M increases. For example, $\Sigma_1^3 M^2! \approx 2^{18.5}$, $\Sigma_1^4 M^2! \approx 2^{44.3}$, $\Sigma_1^5 M^2! \approx 2^{83.7}$, $\Sigma_1^6 M^2! \approx 2^{138}$, $\Sigma_1^7 M^2! \approx 2^{208}$, and $\Sigma_1^8 M^2! \approx 2^{296}$. Therefore, the key space of the algorithm is sufficiently large to resist all kinds of brute force attacks. The experimental results, as shown in FIG. 34, show that the scheme is very sensitive to the secret key.

In addition, the total number of possible Sudoku matrices is quite large. For example, for M=3 and N=3, there exist a total possible number of 6,670,903,752,021,072,936,960=$2^{72.5}$ arrangements for a 9×9 Sudoku matrix. In the examples above, one way to resample the Latin square L was defined. If using all possible resample schemes in the Sudoku matrix generator, one can make many more possible Sudoku matrices for the same Secret Sequence K. Theoretically, this total number is $\Sigma_1^i M^2! (M!)^{M+1}$.

Figure 35:
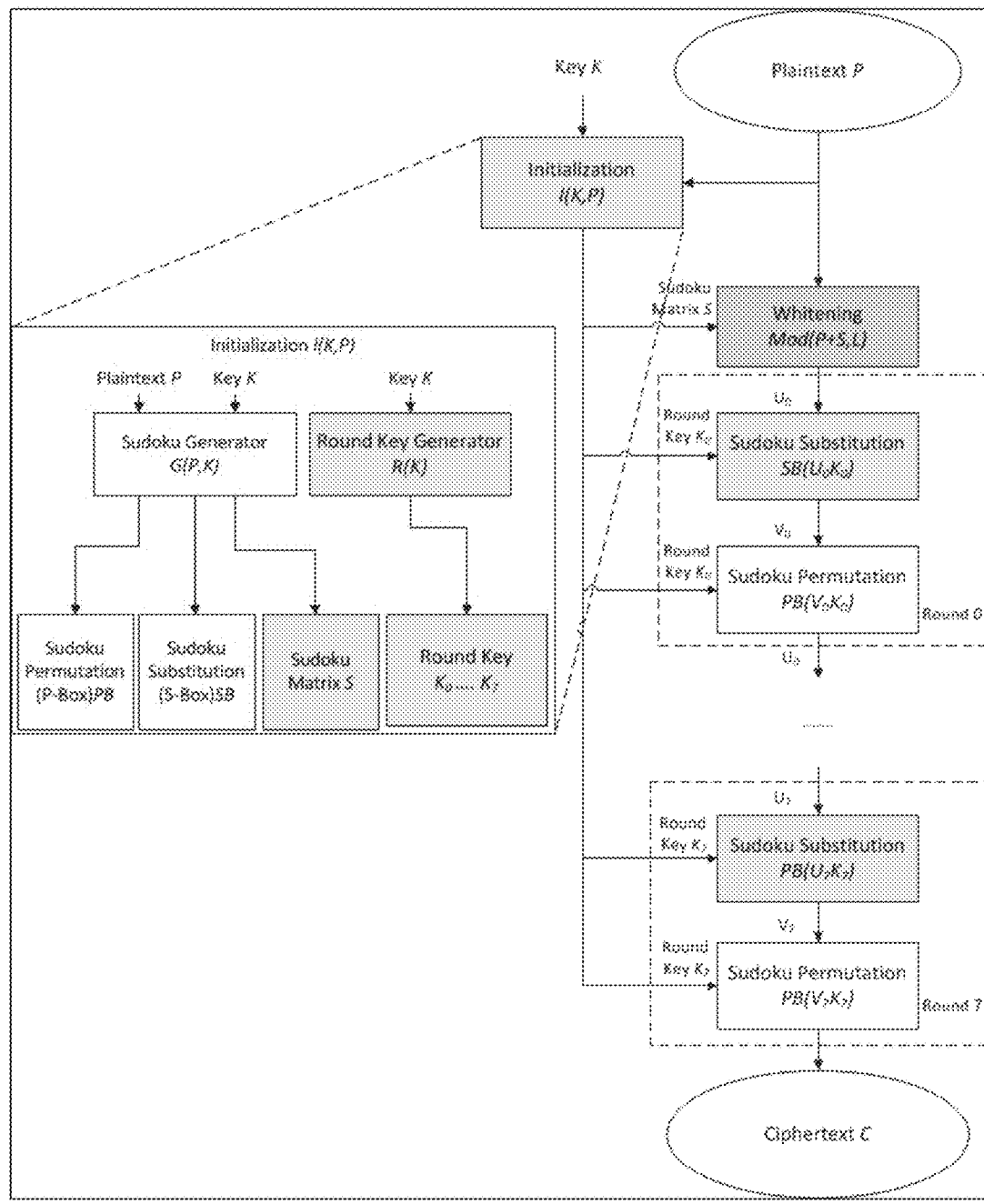
FIG. 35 shows a flowchart of an embodiment of the technology provided herein.

A schematic overview of a process provided by some embodiments of the systems and methods described herein is shown in FIG. 35.

Example 5—Sudoku Substitution

Figure 36:
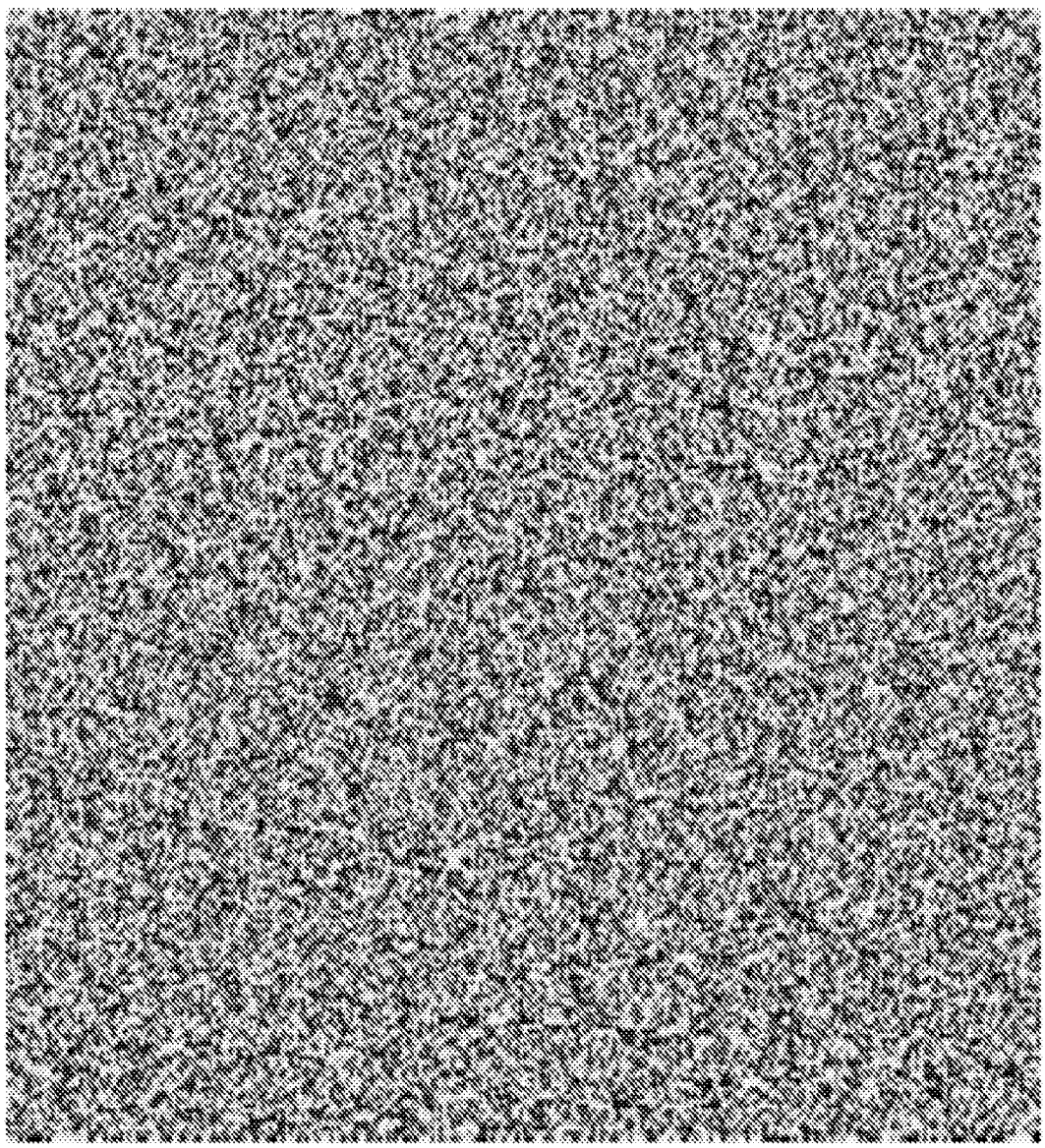
FIG. 36 shows a key-dependent 256×256 Sudoku matrix generated by an embodiment of the technology provided herein.

During the developments of embodiments of the technology provided herein, images were encrypted with the Sudoku substitution process described. FIG. 36 shows a 256×256 Sudoku matrix generated by the Sudoku generator using the key

CA72B42BA06DED8068EEE8B6AD where each color denotes a digit. After normalizing this Sudoku matrix, a 256×256 doubly stochastic matrix $D_S$ is obtained. The S-box used for encryption is then determined by the key and the divided key bins. Table X and Y show the corresponding S-boxes when the subkeys are in the 1st bin and the 2nd bin, respectively.

TABLE 4

The Sudoku S-box when k is in Bin #1

|    | 00 | 01 | 02 | 03 | 04 | 05 | 06 | 07 | 08 | 09 | A | B | C | D | E | F |
|----|----|----|----|----|----|----|----|----|----|----|----|----|----|----|----|----|
| 00 | 1C | 8B | 25 | EF | D1 | A7 | 4B | CF | 5D | 95 | FF | BD | 7F | 39 | 02 | 6D |
| 01 | 70 | 29 | 33 | 11 | C4 | 56 | F0 | B2 | 9F | AC | 0A | DD | 49 | E2 | 88 | 68 |
| 02 | 6E | F9 | 5B | 1A | 9E | EB | C9 | 35 | 09 | D3 | 28 | 79 | B6 | 46 | AE | 80 |
| 03 | 4D | A9 | 16 | B8 | EA | F4 | 0C | 90 | 2F | 61 | CB | DC | 55 | 82 | 3D | 78 |
| 04 | 87 | 44 | D9 | 32 | FB | 13 | 50 | 05 | AA | 2D | B9 | C5 | 62 | ED | 72 | 92 |
| 05 | 3E | BA | 5F | 1B | 9B | C7 | DF | 6C | 8D | AF | 2E | FC | 7E | 0F | 45 | EC |
| 06 | 3A | A1 | 5C | 85 | FA | 76 | D2 | E1 | 6F | 00 | BF | C2 | 27 | 19 | 48 | 9D |
| 07 | C3 | D4 | 64 | 20 | A5 | 77 | E4 | 91 | 12 | 8A | 38 | BE | 01 | 57 | F6 | 47 |
| 08 | DB | 96 | A3 | 81 | E5 | 60 | BB | FD | 71 | 08 | 54 | 18 | 24 | 41 | C8 | 3F |
| 09 | D8 | B3 | 83 | 4F | C0 | 98 | 7C | E6 | 0B | 26 | 58 | F7 | 15 | 69 | A2 | 36 |

TABLE 4-continued

The Sudoku S-box when k is in Bin #1

|   | 00 | 01 | 02 | 03 | 04 | 05 | 06 | 07 | 08 | 09 | A | B | C | D | E | F |
|---|----|----|----|----|----|----|----|----|----|----|---|---|---|---|---|---|
| A | E7 | F8 | 30 | 1D | D7 | A6 | 22 | 75 | 52 | 65 | 04 | 9C | 8C | 40 | B1 | CE |
| B | 17 | 97 | E9 | 7D | 59 | F3 | D6 | B4 | 4C | A0 | 6A | C1 | 2B | 37 | 0E | 84 |
| C | AD | 10 | 67 | 3B | E3 | 03 | F2 | CD | 2C | B5 | 4A | D0 | 7B | 86 | 94 | 5A |
| D | 4E | 7A | CA | 9A | 89 | EE | 14 | FE | 2A | 6B | BC | 0D | AB | DE | 51 | 34 |
| E | CC | 43 | 53 | 31 | 8F | 23 | 99 | 07 | 66 | F5 | 74 | D5 | E8 | 1F | B0 | A8 |
| F | 1C | 8B | 25 | EF | D1 | A7 | 4B | CF | 5D | 95 | FF | BD | 7F | 39 | 02 | 6D |

TABLE 5

The Sudoku S-box when k is in Bin #2

|    | 00 | 01 | 02 | 03 | 04 | 05 | 06 | 07 | 08 | 09 | A | B | C | D | E | F |
|----|----|----|----|----|----|----|----|----|----|----|---|---|---|---|---|---|
| 00 | A7 | 4B | CF | 5D | 95 | FF | BD | 7F | 39 | 02 | 6D | 1C | 8B | 25 | EF | D1 |
| 01 | 56 | F0 | B2 | 9F | AC | 0A | DD | 49 | E2 | 88 | 68 | 70 | 29 | 33 | 11 | C4 |
| 02 | EB | C9 | 35 | 09 | D3 | 28 | 79 | B6 | 46 | AE | 80 | 6E | F9 | 5B | 1A | 9E |
| 03 | F4 | 0C | 90 | 2F | 61 | CB | DC | 55 | 82 | 3D | 78 | 4D | A9 | 16 | B8 | EA |
| 04 | 13 | 50 | 05 | AA | 2D | B9 | C5 | 62 | ED | 72 | 92 | 87 | 44 | D9 | 32 | FB |
| 05 | C7 | DF | 6C | 8D | AF | 2E | FC | 7E | 0F | 45 | EC | 3E | BA | 5F | 1B | 9B |
| 06 | 76 | D2 | E1 | 6F | 00 | BF | C2 | 27 | 19 | 48 | 9D | 3A | A1 | 5C | 85 | FA |
| 07 | 77 | E4 | 91 | 12 | 8A | 38 | BE | 01 | 57 | F6 | 47 | C3 | D4 | 64 | 20 | A5 |
| 08 | 60 | BB | FD | 71 | 08 | 54 | 18 | 24 | 41 | C8 | 3F | DB | 96 | A3 | 81 | E5 |
| 09 | 98 | 7C | E6 | 0B | 26 | 58 | F7 | 15 | 69 | A2 | 36 | D8 | B3 | 83 | 4F | C0 |
| A  | A6 | 22 | 75 | 52 | 65 | 04 | 9C | 8C | 40 | B1 | CE | E7 | F8 | 30 | 1D | D7 |
| B  | F3 | D6 | B4 | 4C | A0 | 6A | C1 | 2B | 37 | 0E | 84 | 17 | 97 | E9 | 7D | 59 |
| C  | 03 | F2 | CD | 2C | B5 | 4A | D0 | 7B | 86 | 94 | 5A | AD | 10 | 67 | 3B | E3 |
| D  | EE | 14 | FE | 2A | 6B | BC | 0D | AB | DE | 51 | 34 | 4E | 7A | CA | 9A | 89 |
| E  | 23 | 99 | 07 | 66 | F5 | 74 | D5 | E8 | 1F | B0 | A8 | CC | 43 | 53 | 31 | 8F |
| F  | 06 | B7 | 8E | 63 | DA | 93 | F1 | 42 | 3C | 21 | E0 | 5E | C6 | 1E | 73 | A4 |

Figure 37:
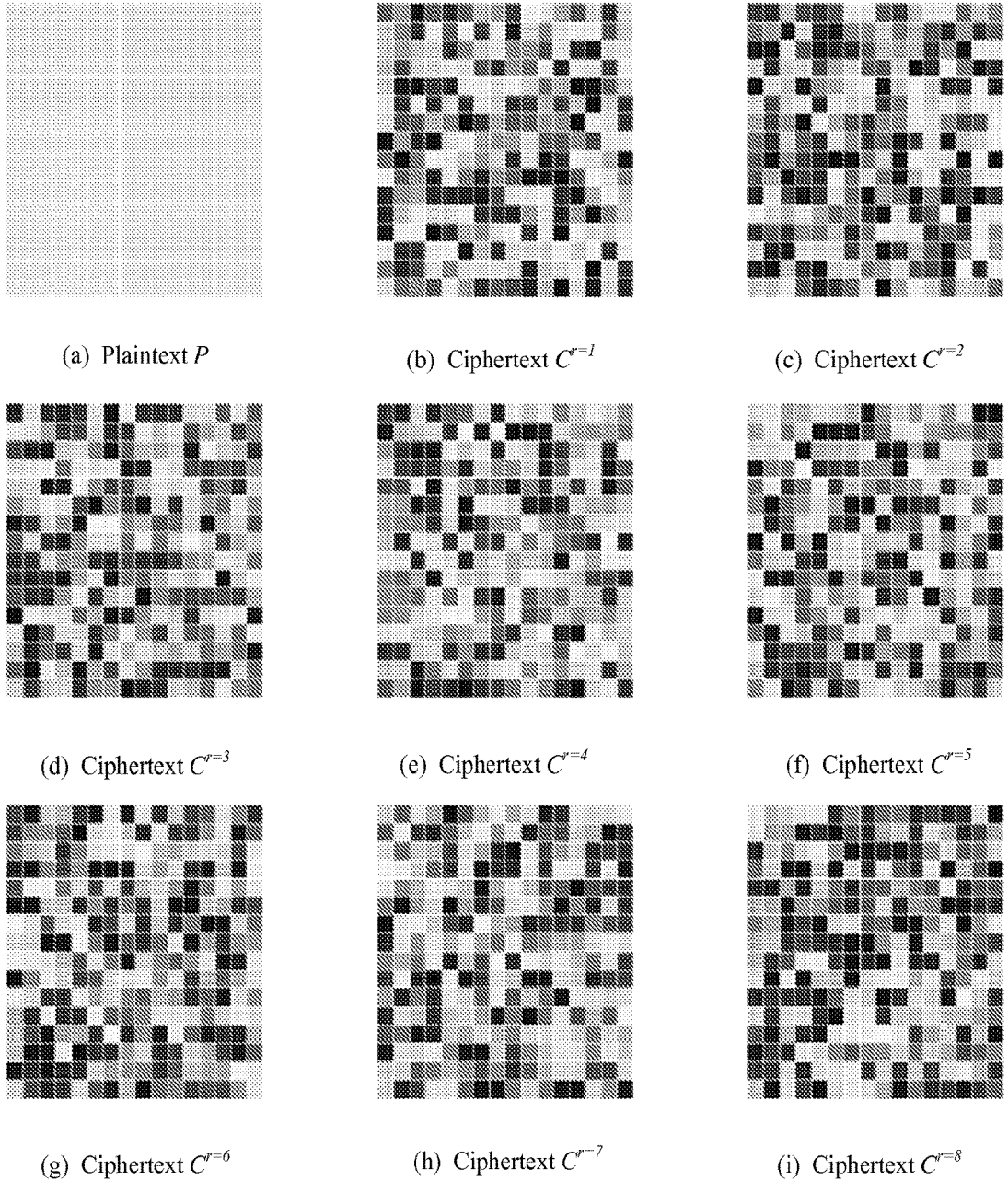
FIG. 37 shows an example of Sudoku substitution for eight rounds.

FIG. 37 shows the Sudoku substitution process on the 8-bit plaintext of size 16×16 with all zero entries and its ciphertext for one round of encryption. It is noticeable that one round of substitution makes the ciphertext completely random-like, although the plaintext is very pattern-like. This example shows an important property of the Sudoku S-Box: on one hand the S-Box used is key-dependently selected and on the other hand all possible S-Boxes together form a Markov chain transition matrix with the stationary vector uniformly distributed.

A Markov chain process converges to the stationary distribution regardless of where it begins. In other words, the distribution of a ciphertext encrypted by the Sudoku substitution will eventually become uniform no matter what the distribution of the plaintext is. Heuristically speaking, after 10 rounds of transitions, the equivalent stationary distribution becomes very uniform-like for 256×256 Sudoku doubly stochastic matrices, where the maximum distance between the possibility of a state and 1/256 is less than $2^{-50}$.

There are actually N S-boxes within a given N×N Sudoku matrix and the ciphertext is determined by both the plaintext and the round key. Wu, et al., in "Dynamic and implicit latin square doubly stochastic s-boxes with reversibility", 2011 *IEEE International Conference on Systems Man and Cybernetics* (SMC), 2011, incorporated herein by reference in its entirety for all purposes, show that the Sudoku S-box is complete and satisfies both the strict avalanche criterion and the bit independence criterion, e.g., as described in K. Nyberg, "Perfect nonlinear s-boxes" in *Proceedings of the 10th annual international conference on Theory and application of cryptographic techniques*, EUROCRYPT '91, 378-386 (1991).

Example 6—AES-Sudoku

During the development of embodiments of the technology described herein, experiments were performed to apply the AES-Sudoku cipher to images. To test the performance of the Sudoku-AES cipher, the CCITT fax standard image database (available at http://cdb.paradice-insight.us) was selected for the simulation. This database was selected because: 1) it is an open database and has been widely accepted in the image processing field; and 2) its images are all binary and thus are good for testing a block cipher.

The CCITT image database contains 8 binary images of size 1728×2376 with 1 bit depth, namely CCITT_1, CCITT_2, . . . , CCITT_8. To encrypt the images according to the technology, each CCITT image is divided into blocks of size 80×256 without overlapping. Each CCITT image is treated as a plaintext set and the non-overlapped image blocks are used as plaintexts in the simulation. Due to the size constraint, each CCITT image can produce 189 plaintexts and we name the ith plaintext of the jth CCITT image as $P_j^i$, where $1 \le i \le 189$ and $1 \le j \le 8$. Finally, each plaintext $P_j^i$ is extracted to a binary sequence and then encrypted using the Sudoku-AES block cipher using random keys and its corresponding ciphertext is denoted as $C_j^i$.

After encryption using the Sudoku-AES cipher, randomly selected plaintext messages and the corresponding ciphertext messages were inspected. The resulting ciphertexts were random-like and unintelligible. Even though some plaintext messages comprised strong homogenous regions, their corresponding ciphertext messages were still random-like. Meanwhile, distinctive plaintext messages became indiscernible after encryption, thus demonstrating that the encryption method introduced substantial confusion into the encrypted image (see, e.g., C. E. Shannon. "Communication theory of secrecy systems", *Bell System Technical Journal*, 28(4):656-715 (Elsevier 2010)).

Example 7—Image Encryption

During the development of embodiments of the technology provided herein, the Sudoku encryption processes were applied to images to encrypt them and study their properties. Among the various image databases available, this study used the USC-SIPI database Volume 3: "Miscellaneous" for simulation (available at http://sipi.usc.edu/database/). As it is described on the home page of the USC-SIPI image database, "the USC-SIPI image database is a collection of digitized images. It is maintained primarily to support research in image processing, image analysis, and machine vision". This database has been used in the image processing community since 1977. Since then, this database has been widely accepted and hundreds of algorithms are analyzed with respected to the performance on this database. This database is considered to have a good coverage over digital images including image types, scenes, luminance conditions, etc. The Miscellaneous volume consists of 44 images (16 color and 28 monochrome). The sizes are fourteen 256×256, twenty-six 512×512, and four 1024×024. The full description of the Miscellaneous image data set is listed in Table 6.

TABLE 6

USC-SIPI Miscellaneous image database

| Filename | Description | Size | Type |
|---|---|---|---|
| 4.1.01 | Girl | 256 | Color |
| 4.1.02 | Couple | 256 | Color |
| 4.1.03 | Girl | 256 | Color |
| 4.1.04 | Girl | 256 | Color |
| 4.1.05 | House | 256 | Color |
| 4.1.06 | Tree | 256 | Color |
| 4.1.07 | Jelly beans | 256 | Color |
| 4.1.08 | Jelly beans | 256 | Color |
| 4.2.01 | Splash | 512 | Color |
| 4.2.02 | Girl (Tiffany) | 512 | Color |
| 4.2.03 | Mandrill (a.k.a Baboon) | 512 | Color |
| 4.2.04 | Girl (Lena, or Lenna) | 512 | Color |
| 4.2.05 | Airplane (F-16) | 512 | Color |
| 4.2.06 | Sailboat on lake | 512 | Color |
| 4.2.07 | Peppers | 512 | Color |
| 5.1.09 | Moon surface | 256 | Gray |
| 5.1.10 | Aerial | 256 | Gray |
| 5.1.11 | Airplane | 256 | Gray |
| 5.1.12 | Clock | 256 | Gray |
| 5.1.13 | Resolution chart | 256 | Gray |
| 5.1.14 | Chemical plant | 256 | Gray |
| 5.2.08 | Couple | 512 | Gray |
| 5.2.09 | Aerial | 512 | Gray |
| 5.2.10 | Stream and bridge | 512 | Gray |
| 5.3.01 | Man | 1024 | Gray |
| 5.3.02 | Airport | 1024 | Gray |
| 7.1.01 | Truck | 512 | Gray |
| 7.1.02 | Airplane | 512 | Gray |
| 7.1.03 | Tank | 512 | Gray |
| 7.1.04 | Car and APCs | 512 | Gray |
| 7.1.05 | Truck and APCs | 512 | Gray |
| 7.1.06 | Truck and APCs | 512 | Gray |
| 7.1.07 | Tank | 512 | Gray |
| 7.1.08 | APC | 512 | Gray |
| 7.1.09 | Tank | 512 | Gray |
| 7.1.10 | Car and APCs | 512 | Gray |
| 7.2.01 | Airplane (U-2) | 1024 | Gray |
| boat.512 | Fishing Boat | 512 | Gray |
| elaine.512 | Girl (Elaine) | 512 | Gray |
| house | House | 512 | Color |
| gray21.512 | 21 level step wedge | 512 | Gray |
| numbers.512 | 256 level test pattern | 512 | Gray |
| ruler.512 | Pixed ruler | 512 | Gray |
| testpat.1k | General test pattern | 1024 | Gray |

These images were tested and analyzed under various means. All simulations were done using Matlab r2010a (Window XP; 2.6 GHz Intel Core2 Quad processor; 3 Gb memory). Encrypted images were evaluated by conventional security analysis. Analysis results were compared with recent peer algorithms. Results related to G. Chen, et al. "A symmetric image encryption scheme based on 3d chaotic cat maps", *Chaos, Solitons and Fractals*, 21(3):749-761 (2004) and Y. Mao, et al., "A novel fast image encryption scheme based on 3d chaotic baker maps" *International Journal of Bifurcation and Chaos* (2003) are generated by authorized codes; results from bmpPacker1 (http://www.goedeke.net/bmppacker.html) and I-Cipher 2 (www.ambitware.com/abw/i-cipher_download.php) are obtained by using the corresponding commercial software; other results are directly pulled from related papers.

All encryption/decryption stages required only parametric Sudoku matrices, which are dependent on either the encryption key or its derived round keys. Therefore, the theoretical key space of the Sudoku-Image cipher should be the total number of the distinctive 256×256 Sudoku matrices. It has been shown above that such number is at least $2^{3072}$, which implies the key length could be as long as 3072 bits. Therefore, the Sudoku-Image cipher has sufficiently large key spaces.

In addition, the Sudoku-Image cipher has a strong key sensitivity because: 1) the encryption key is used as the seed in the LCG pseudo-random number generator and thus different keys lead to different sets of Sudoku parameters; 2) the encryption key is also expanded to round keys for each iteration and subkeys for each row-wise and column-wise substitution using the Rijndael key schedule, which generates uniformly distributed random-like keys; and 3) any change in a round key further influences the reference Sudokus, which the Sudoku encryption techniques relies on.

Figure 38:
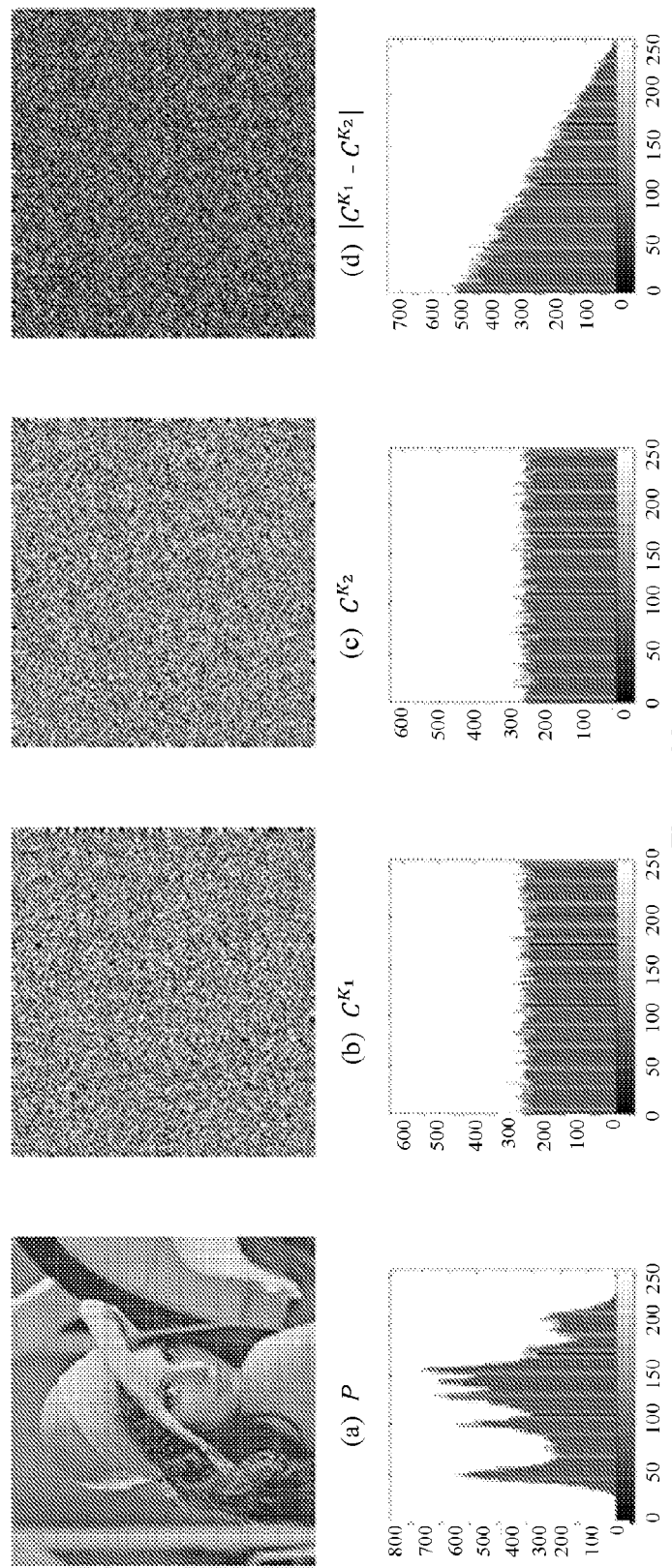
FIG. 38 shows the results of a Sudoku-Image cipher key sensitivity analysis.

FIG. 38 shows two ciphertext images using the encryption keys $K_1$ and $K_2$ and the "Lenna" image as the plaintext image. $K_1$ and $K_2$ are encryption keys that differ from each other only in their last bits. FIG. 38(*d*) shows the difference between $C^{K1}$ and $C^{K2}$. Ater 10 rounds of iteration, the two ciphertext images are completely different.

A good cipher should attain both confusion and diffusion properties. The diffusion property requires that even if one bit in the plaintext is changed, the ciphertext should change completely when the encryption key remains the same. Due to the Sudoku MDS, one pixel change in the plaintext changes four pixels after one round of encryption. Since the Sudoku-Image cipher has 10 rounds, at most $4^9$ pixels change values during the encryption (the first round encryption is pure transposition and includes no diffusion processing). In such a way, the Sudoku-Image cipher attains a good diffusion property.

Figure 39:
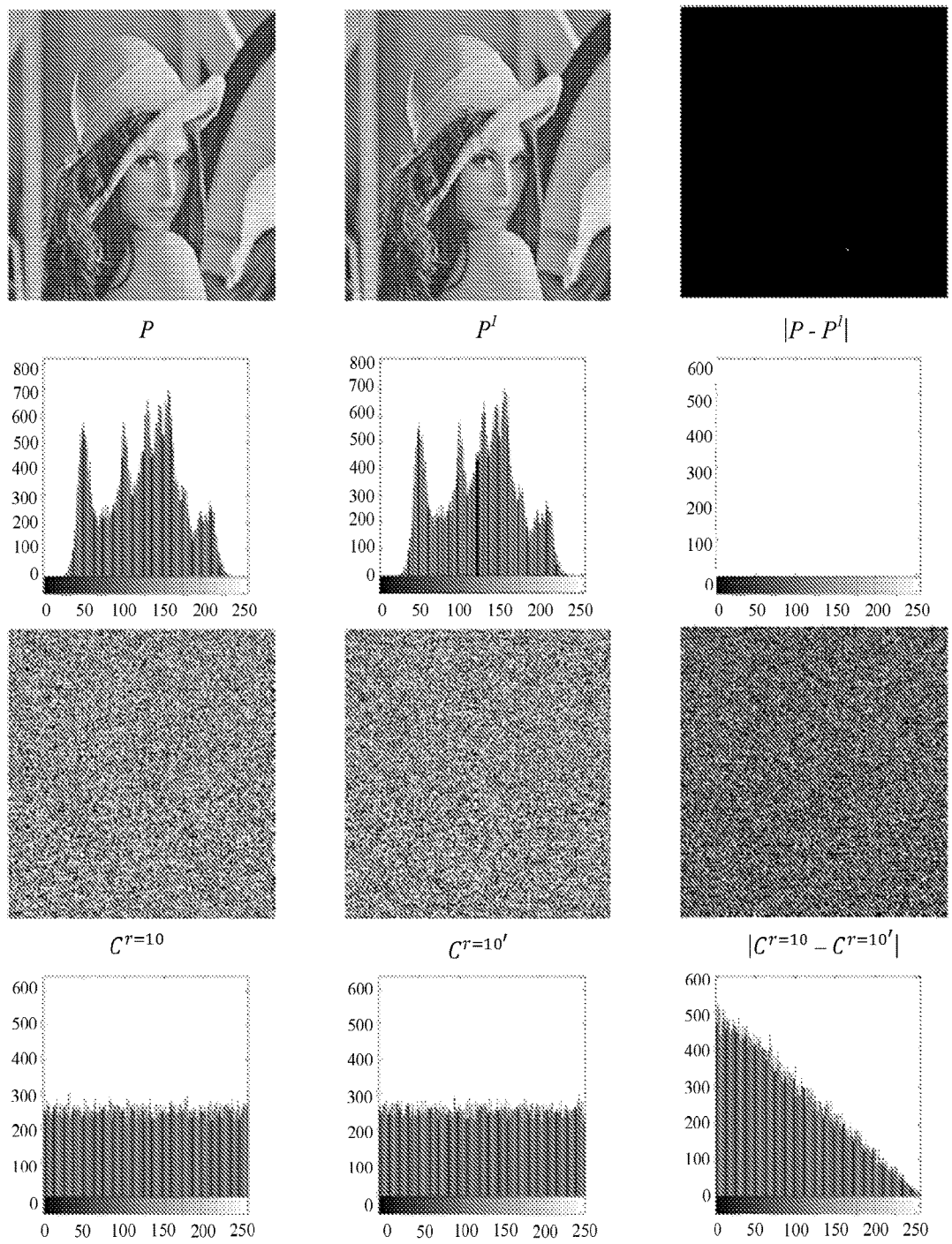
FIG. 39 shows the results of a Sudoku-Image cipher plaintext sensitivity analysis. P is the plaintext image "Lenna" and $P_0$ is a version modified by changing one bit of the pixel located on the shoulder of "Lenna". These two plaintext images are encrypted using the Sudoku-Image cipher by the same encryption key and the difference of the corresponding ciphertext images in each iteration are stored and displayed in sequence, where $|C^{r=n}-C^{r=n'}|$ denotes the absolute difference of the corresponding ciphertext image at the nth cipher iteration (or, in other words, after each round of encryption). Histograms for each image are shown below each image.
Figure 40:
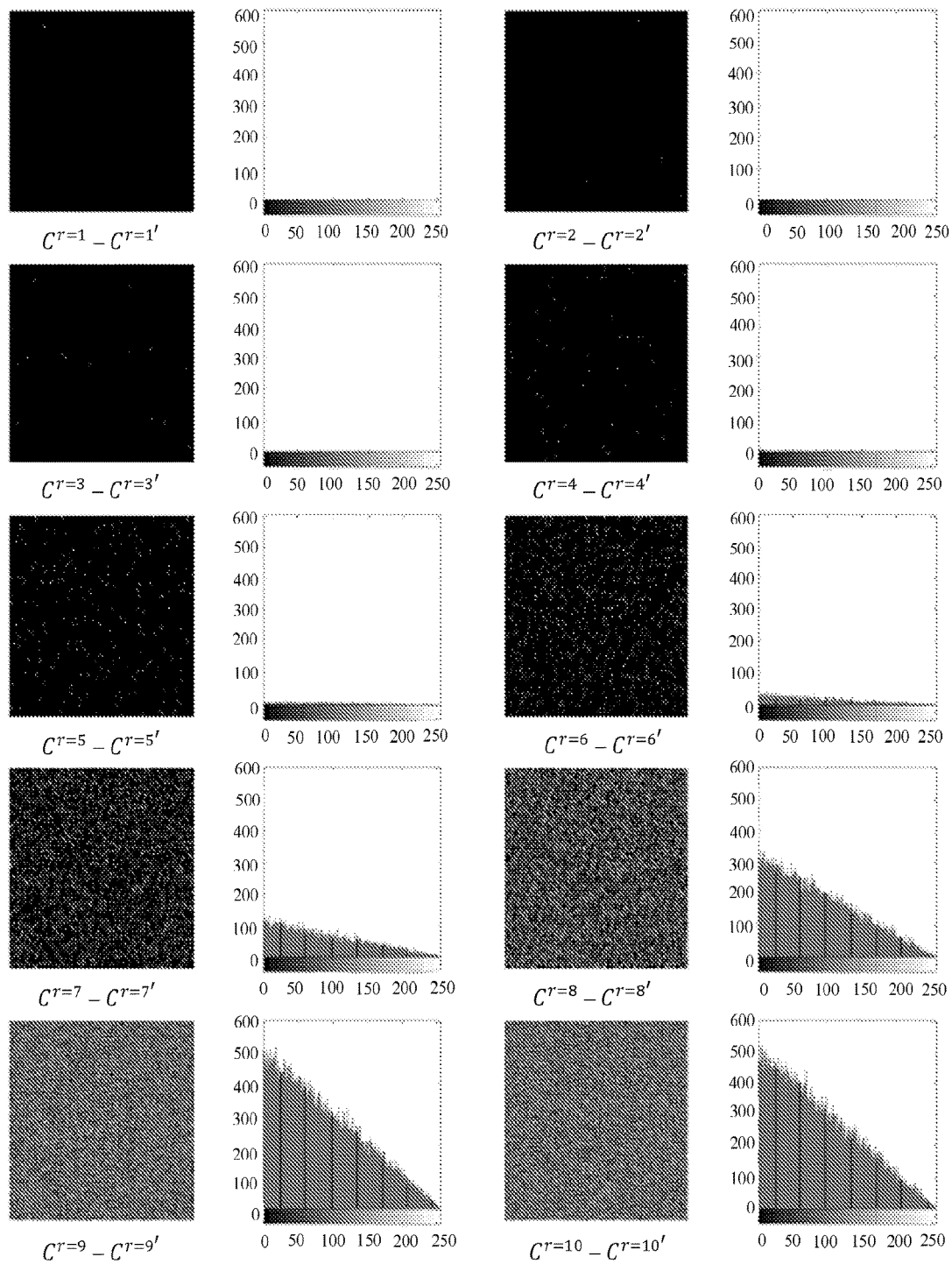
FIG. 40 shows the results of the Sudoku-Image cipher plaintext sensitivity analysis of FIG. 39 for r=1-10 (rounds 1 through 10). Histograms for each image are shown to the right of the corresponding image.

FIG. 39 shows the plaintext sensitivity of the Sudoku-Image cipher and FIG. 40 gives intermediate results. Here P is the plaintext image "Lenna" and $P_0$ is a modified version of Lenna obtained by changing one bit of a pixel located on the shoulder of the "Lenna" image. These two plaintext images are then encrypted using the Sudoku-Image cipher and the same encryption key. The differences of the corresponding ciphertext images in each iteration are stored and displayed in sequence, where $|C^{r=n}-C^{r=n'}|$ denotes the absolute difference of the corresponding ciphertext image at the nth cipher iteration.

From both of the resulting difference images for the two ciphertext images and the histograms of the changed pixels, the avalanche effect can be clearly seen: that is, the number of pixel differences produced relative to the two ciphertext images increases greatly as the cipher iteration round increases (FIG. 40).

In image encryption, the number of pixels change rate (NPCR) and the unified average changing intensify (UACI) are two common measurements for testing pixel changes. The NPCR of two W×H images A and B can be mathematically defined as $$NPCR(A, B) = \frac{\sum_{j=1}^{B}\sum_{i=1}^{W} Diff_{A,B}(i, j)}{W \cdot H} \times 100$$

where Diff is a logical image defined as $$Diff_{A,B}(i, j) = \begin{cases} 0, & \text{if } A(i, j) = B(i, j) \\ 1, & \text{if } A(i, j) \neq B(i, j) \end{cases}$$

Different from the NPCR score, the UACI score focuses on the average changed intensity between two images rather the amount of the pixels. This score can be defined as $$UACI(A, B) = \sum_{j=1}^{H}\sum_{i=1}^{W} \frac{|A(i, j) - B(i, j)|}{255 \cdot W \cdot H} \times 100$$

In the context of testing plaintext sensitivity, the image variables A and B in both NPCR and UACI hold the relationship that:
1. A and B are two ciphertext images encrypted by the Sudoku-Image cipher using the same encryption key.
2. A's decrypted image and B's decrypted image should only differ from each other by one pixel.

Figure 41:
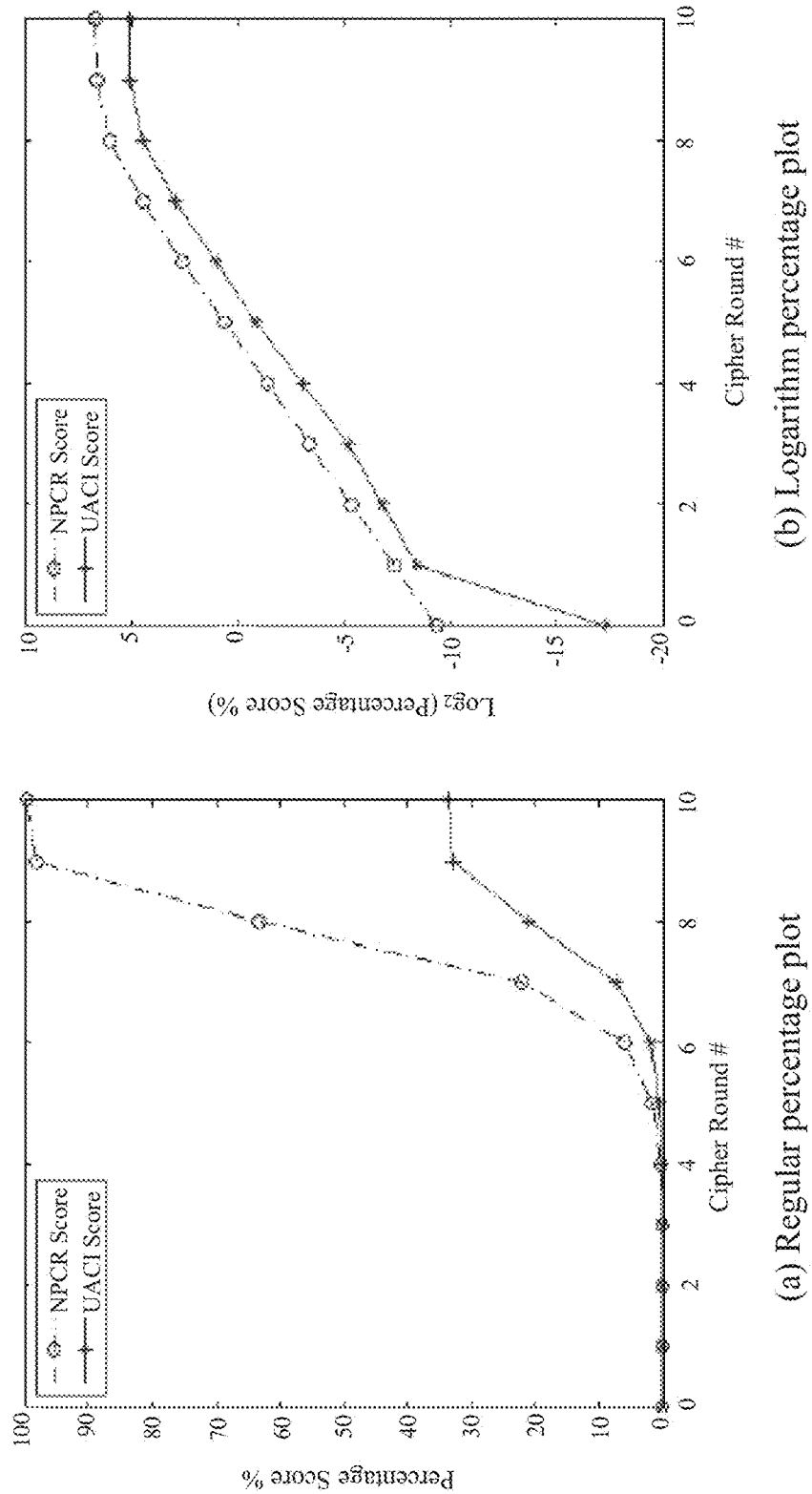
FIG. 41 shows NPCR and UACI scores for rounds of encryption by the Sudoku-Image cipher, where the x axis denotes the cipher round and the y axis denotes the NPCR and UACI scores for each cipher round.

With the help of the NPCR and UACI measurements, the NPCR and UACI curves are plotted in FIG. 41, where the x axis denotes the cipher round and the y axis denotes the NPCR and UACI scores for each cipher round. FIG. 41(a) shows the NPCR and UACI percentage scores directly, while FIG. 41(b) is the logarithm version of FIG. 41(a).

These data show the scores exponentially increase as the cipher round increases because of the avalanche effect caused by the Sudoku-Image cipher.

Since the "Lenna" image is widely used in testing image cipher performance, its NPCR and UACI scores were compared to values previously reported for conventional ciphers. NPCR % and UACI % scores for Lenna reported by Awad ("A new chaos-based cryptosystem for secure transmitted images." Computers, *IEEE Transactions on*, PP(99):1, 2011), Zhu et al. ("A chaos-based symmetric image encryption scheme using a bit-level permutation" *Information Sciences*, 181(6):171-1186, 2011), Chen et al. ("A symmetric image encryption scheme based on 3d chaotic cat maps. *Chaos, Solitons, and Fractals*, 21(3):749-761, 2004), Kumar et al., ("Extended substitution-diffusion based image cipher using chaotic standard map". *Communications in Nonlinear Science and Numerical Simulation*, 16(1):372-382), and Liao et al. ("A novel image encryption algorithm based on self-adaptive wave transmission" *Signal Processing*, 90(9): 2714-2722, 2010) are 99.62 and 30.42; 99.63 and 33.48; 99.25 and 33.14; 99.72 and 32.82; and 99.65 and 33.48, respectively. After 10 rounds of encryption with the Sudoku encryption, the NPCR and UACI scores for Lenna are 99.7241% and 33.6217%, respectively. Both scores satisfy the randomness tests designed for NPCR and UACI associated with the significance level 0.05.

To resist ciphertext-only attacks, a secure cipher should be able to encrypt a plaintext of an arbitrary distribution to a corresponding ciphertext of the uniform-like distribution. The two most common ways to measure the ciphertext randomness for image encryption are Shannon entropy and adjacent pixel auto-correlation.

Shannon entropy, also known as information entropy, is a statistical measure to characterize the randomness of an image. It is well known that the entropy of a message source X containing n symbols can be calculated as $$H(X) = -\sum_{i=1}^{n} Pr(x_i) \log_2 Pr(x_i)$$

where $x_i$ is the ith symbol in the source.

In this example, X is an 8 bit image and n=256 stands for the 256 possible intensity levels. The Shannon entropy for "Lenna" encrypted with the various image encryption algorithms of Awad, Zhu, Chen, and Kumar were 7.9999, 7.9993, 7.9938, and 7.9996, respectively. The Shannon entropy for the Sudoku encryption was 7.999725. The results of Shannon entropy measurements on the USC-SIPI Miscellaneous dataset are listed in Table 7.

TABLE 7

Shannon entropy scores for Sudoku image encryption

| Filename | Size | Type | Plaintext | bmpPacker[1] | I-Cipher[2] | 3DCat | Baker3D | Ours |
|---|---|---|---|---|---|---|---|---|
| 4.1.01 | 256 | Color | 6.89814 | 7.98856 | 7.99899 | 7.99894 | 7.99911 | 7.99913 |
| 4.1.02 | 256 | Color | 6.29450 | 7.97929 | 7.99907 | 7.99906 | 7.99913 | 7.99921 |
| 4.1.03 | 256 | Color | 5.97092 | 7.99018 | 7.99903 | 7.99911 | 7.99912 | 7.99909 |
| 4.1.04 | 256 | Color | 7.42696 | 7.99008 | 7.99901 | 7.99903 | 7.99897 | 7.99919 |
| 4.1.05 | 256 | Color | 7.06863 | 7.98103 | 7.99905 | 7.99889 | 7.99918 | 7.99900 |
| 4.1.06 | 256 | Color | 7.53709 | 7.98982 | 7.99904 | 7.99900 | 7.99902 | 7.99905 |
| 4.1.07 | 256 | Color | 6.58349 | 7.99048 | 7.99900 | 7.99903 | 7.99894 | 7.99916 |
| 4.1.08 | 256 | Color | 6.85272 | 7.99765 | 7.99975 | 7.99918 | 7.99915 | 7.99908 |
| 4.2.01 | 512 | Color | 7.24283 | 7.99874 | 7.99976 | 7.99976 | 7.99977 | 7.99977 |
| 4.2.02 | 512 | Color | 6.41649 | 7.99746 | 7.99975 | 7.99976 | 7.99976 | 7.99978 |

TABLE 7-continued

Shannon entropy scores for Sudoku image encryption

| Filename | Size | Type | Plaintext | bmpPacker[1] | I-Cipher[2] | 3DCat | Baker3D | Ours |
|---|---|---|---|---|---|---|---|---|
| 4.2.03 | 512 | Color | 7.76244 | 7.99758 | 7.99976 | 7.99975 | 7.99971 | 7.99979 |
| 4.2.04 | 512 | Color | 7.75020 | 7.99773 | 7.99975 | 7.99977 | 7.99974 | 7.99978 |
| 4.2.05 | 512 | Color | 6.66391 | 7.99746 | 7.99977 | 7.99976 | 7.99975 | 7.99977 |
| 4.2.06 | 512 | Color | 7.76217 | 7.99755 | 7.99977 | 7.99974 | 7.99972 | 7.99975 |
| 4.2.07 | 512 | Color | 7.66983 | 7.90885 | 7.99691 | 7.99978 | 7.99975 | 7.99974 |
| 5.1.09 | 256 | Gray | 6.70931 | 7.90673 | 7.99721 | 7.99701 | 7.99674 | 7.99745 |
| 5.1.10 | 256 | Gray | 7.31181 | 7.94187 | 7.99716 | 7.99714 | 7.99745 | 7.99709 |
| 5.1.11 | 256 | Gray | 6.45228 | 7.92940 | 7.99718 | 7.99695 | 7.99678 | 7.99744 |
| 5.1.12 | 256 | Gray | 6.70567 | 7.36356 | 7.99700 | 7.99673 | 7.99703 | 7.99679 |
| 5.1.13 | 256 | Gray | 1.54831 | 7.90355 | 7.99688 | 7.99714 | 7.99662 | 7.99725 |
| 5.1.14 | 256 | Gray | 7.34243 | 7.99254 | 7.99925 | 7.99727 | 7.99690 | 7.99724 |
| 5.2.08 | 512 | Gray | 7.20101 | 7.98744 | 7.99920 | 7.99925 | 7.99925 | 7.99938 |
| 5.2.09 | 512 | Gray | 6.99399 | 7.98463 | 7.99923 | 7.99919 | 7.99928 | 7.99937 |
| 5.2.10 | 512 | Gray | 5.70556 | 7.99872 | 7.99982 | 7.99930 | 7.99933 | 7.99930 |
| 5.3.01 | 1024 | Gray | 7.52374 | 7.99859 | 7.99982 | 7.99980 | 7.99982 | 7.99983 |
| 5.3.02 | 1024 | Gray | 6.83033 | 7.99031 | 7.99929 | 7.99983 | 7.99982 | 7.99982 |
| 7.1.01 | 512 | Gray | 6.02741 | 7.98954 | 7.99932 | 7.99932 | 7.99914 | 7.99926 |
| 7.1.02 | 512 | Gray | 4.00450 | 7.98305 | 7.99926 | 7.99932 | 7.99933 | 7.99925 |
| 7.1.03 | 512 | Gray | 5.49574 | 7.99362 | 7.99930 | 7.99919 | 7.99927 | 7.99928 |
| 7.1.04 | 512 | Gray | 6.10742 | 7.98357 | 7.99935 | 7.99933 | 7.99920 | 7.99935 |
| 7.1.05 | 512 | Gray | 6.56320 | 7.98540 | 7.99929 | 7.99929 | 7.99925 | 7.99932 |
| 7.1.06 | 512 | Gray | 6.69528 | 7.98525 | 7.99928 | 7.99926 | 7.99927 | 7.99928 |
| 7.1.07 | 512 | Gray | 5.99160 | 7.99030 | 7.99924 | 7.99922 | 7.99931 | 7.99932 |
| 7.1.08 | 512 | Gray | 5.05345 | 7.98374 | 7.99932 | 7.99923 | 7.99937 | 7.99927 |
| 7.1.09 | 512 | Gray | 6.18981 | 7.98508 | 7.99936 | 7.99927 | 7.99919 | 7.99933 |
| 7.1.10 | 512 | Gray | 5.90879 | 7.99847 | 7.99979 | 7.99923 | 7.99926 | 7.99923 |
| 7.2.01 | 1024 | Gray | 5.64145 | 7.98505 | 7.99924 | 7.99982 | 7.99972 | 7.99983 |
| boat.512 | 512 | Gray | 7.19137 | 7.98956 | 7.99920 | 7.99940 | 7.99931 | 7.99934 |
| elaine.512 | 512 | Gray | 7.50598 | 6.49282 | 7.99934 | 7.99934 | 7.99929 | 7.99927 |
| house | 512 | Color | 4.39230 | 7.99755 | 7.99975 | 7.99978 | 7.99927 | 7.99919 |
| gray21.512 | 512 | Gray | 7.48579 | 7.97990 | 7.99922 | 7.99977 | 7.99977 | 7.99978 |
| numbers.512 | 512 | Gray | 7.72925 | 6.89324 | 7.99926 | 7.99920 | 7.99929 | 7.99928 |
| ruler.512 | 512 | Gray | 0.50003 | 7.90313 | 7.99982 | 7.99929 | 7.99926 | 7.99932 |
| testpat.1k | 1024 | Gray | 4.40773 | 7.90313 | 7.99982 | 7.99980 | 7.99982 | 7.99984 |
| Mean | | | 6.343541 | 7.905050 | 7.999082 | 7.999063 | 7.999050 | 7.999112 |
| Standard Deviation | | | 1.501774 | 0.287842 | 0.000859 | 0.000860 | 0.000900 | 0.000810 |
| # of Best Score | | | | 0 | 6 | 5 | 8 | 25 |

The ciphertext image encrypted by the Sudoku-Image cipher reaches a very high Shannon entropy score (theoretical upper bound is 8), which implies that the ciphertext image is very random-like. Compared to other image ciphers or encryption algorithms, the Sudoku-Image cipher attains the best Shannon entropy score in most cases. Even when the plaintext image is highly patterned or of a tilted histogram, the Sudoku-Image cipher always encrypts the plaintext to random-like.

A digital image usually contains data having a high information redundancy, which implies that neighboring pixels are closely related. To measure the strength of this relationship, adjacent pixel correlation analysis (APCA) is commonly used for image encryption. The mathematical definition of APCA between two neighboring pixel sequences $q_1$ and $q_2$ is $$\gamma_{q1,q2} = \frac{\rho_{q1,q2}}{\sigma_{q1}\sigma_{q2}}$$

where $\rho_{q1,q2}$ is the covariance of pixel sequences $q_1$ and $q_2$ and $\sigma_{q1}$ and $\sigma_{q2}$ are the standard deviations of sequence $q_1$ and $q_2$, respectively.

$$\rho_{q1,q2} = E[(q_1 - E[q_1])(q_2 - E[q_2])]$$

$$\sigma_{q1}^2 = E[(q_i - E[q_i])^2], i \in 1,2$$

There are multiple ways to extract pixel sequences from an image. The test is concerned with relationships (e.g., correlations) between adjacent pixels; thus, pixel sequences are extracted from an image with respect to the horizontal direction, the vertical direction, and the diagonal direction.

The APCA results for the original "Lenna" image was 0.940, 0.9709, and 0.9710 in the horizontal, vertical, and diagonal directions, respectively. After encryption with the methods of Awad, Zhu, Chen, Kumar, and Liao, APCA scores in the horizontal, vertical, and diagonal directions, respectively, were 0.940, 0.9709, and 0.9710; 0.0127, −0.0093, and −0.0059; 0.00201613, −0.00916425, and 0.00165094; −0.00024, −0.24251, and 0.23644; 0.0004992, −0.0019800, and −0.0008371; and 0.0127, −0.0190, and −0.0012. APCA scores for Sudoku-Image encryption were 0.0004628, 0.0023497, and 0.0008308 in the horizontal, vertical, and diagonal directions, respectively.

Furthermore, intensive APCA results for the Sudoku-Image cipher and peer algorithms on the USC-SIPI: Miscellaneous dataset are shown in Table 8. For each test image, each correlation score listed in the table is the average of the three directional correlation scores for the encrypted image and each correlation score is of the unit $10^{-3}$.

These data demonstrate that the Sudoku-Image cipher transforms the highly correlated adjacent pixels in plaintext images to uncorrelated pixels. Compared to both commercial ciphers and recent image encryption algorithms listed in the table, the Sudoku-Image cipher has the best APCA scores in most cases.

TABLE 8

APCA scores ($10^{-3}$) for encryption using the Sudoku-Image cipher

| Filename | Plaintext | bmpPacker | I-Cipher | Mao | Chen | Pareek | Liu | Sudoku |
|---|---|---|---|---|---|---|---|---|
| 4.1.01 | 955.730 | 11.397 | 2.940 | 1.780 | 1.240 | 3.961 | 2.887 | 1.130 |
| 4.1.02 | 926.227 | 13.327 | 3.147 | 3.000 | 1.973 | 8.119 | 2.184 | 0.930 |
| 4.1.03 | 922.433 | 24.657 | 1.827 | 1.760 | 2.170 | 5.314 | 0.796 | 0.700 |
| 4.1.04 | 959.193 | 9.840 | 1.810 | 1.443 | 0.883 | 11.863 | 3.210 | 1.493 |
| 4.1.05 | 953.143 | 11.130 | 1.967 | 0.640 | 1.437 | 9.243 | 1.986 | 0.460 |
| 4.1.06 | 932.417 | 26.303 | 1.657 | 1.487 | 0.910 | 3.994 | 3.900 | 1.103 |
| 4.1.07 | 979.317 | 10.723 | 2.047 | 2.050 | 1.680 | 1.905 | 2.231 | 0.597 |
| 4.1.08 | 972.013 | 11.790 | 2.687 | 1.393 | 2.187 | 2.922 | 2.368 | 1.343 |
| 4.2.01 | 988.877 | 6.757 | 0.773 | 0.790 | 0.427 | 7.686 | 1.326 | 0.907 |
| 4.2.02 | 945.423 | 3.790 | 1.093 | 1.137 | 1.050 | 8.184 | 2.239 | 0.520 |
| 4.2.03 | 857.587 | 6.603 | 0.890 | 1.083 | 0.897 | 7.076 | 0.542 | 0.170 |
| 4.2.04 | 978.600 | 6.940 | 0.497 | 1.523 | 0.743 | 2.325 | 0.983 | 0.963 |
| 4.2.05 | 943.307 | 7.493 | 0.947 | 1.067 | 0.587 | 2.833 | 1.005 | 0.297 |
| 4.2.06 | 959.510 | 7.117 | 1.070 | 1.263 | 0.977 | 8.145 | 0.037 | 0.660 |
| 4.2.07 | 974.480 | 5.347 | 1.357 | 1.290 | 0.990 | 0.815 | 1.883 | 0.213 |
| 5.1.09 | 911.973 | 59.040 | 5.217 | 3.053 | 5.233 | 0.779 | 0.728 | 0.681 |
| 5.1.10 | 853.567 | 61.290 | 3.633 | 7.663 | 7.397 | 7.672 | 1.291 | 3.487 |
| 5.1.11 | 890.580 | 33.700 | 5.630 | 2.580 | 4.567 | 4.110 | 2.667 | 1.847 |
| 5.1.12 | 954.440 | 45.793 | 5.190 | 4.097 | 4.943 | 11.780 | 0.216 | 3.307 |
| 5.1.13 | 831.833 | 162.693 | 3.920 | 4.160 | 3.697 | 17.896 | 2.033 | 1.887 |
| 5.1.14 | 892.687 | 67.513 | 2.417 | 4.340 | 1.407 | 8.989 | 1.655 | 4.040 |
| 5.2.08 | 884.630 | 10.943 | 2.460 | 1.600 | 2.137 | 6.210 | 3.028 | 1.483 |
| 5.2.09 | 850.460 | 18.137 | 2.703 | 1.817 | 1.253 | 6.024 | 0.508 | 1.980 |
| 5.2.10 | 917.130 | 21.857 | 2.967 | 1.403 | 1.070 | 1.512 | 2.298 | 1.023 |
| 5.3.01 | 974.543 | 3.887 | 1.447 | 1.400 | 1.203 | 0.297 | 0.530 | 0.680 |
| 5.3.02 | 890.127 | 3.523 | 1.433 | 0.863 | 0.730 | 1.944 | 1.081 | 0.603 |
| 7.1.01 | 926.903 | 10.853 | 1.773 | 1.890 | 2.217 | 6.857 | 1.460 | 0.590 |
| 7.1.02 | 928.663 | 13.270 | 3.670 | 3.263 | 1.747 | 6.561 | 0.002 | 0.860 |
| 7.1.03 | 925.900 | 22.620 | 2.687 | 0.957 | 1.877 | 11.244 | 1.481 | 0.607 |
| 7.1.04 | 958.447 | 8.640 | 2.130 | 1.297 | 0.780 | 2.139 | 1.513 | 0.640 |
| 7.1.05 | 914.000 | 22.010 | 2.820 | 1.857 | 1.397 | 6.582 | 2.319 | 0.953 |
| 7.1.06 | 908.887 | 22.580 | 2.497 | 1.373 | 1.170 | 1.338 | 2.164 | 1.103 |
| 7.1.07 | 866.260 | 21.397 | 1.607 | 0.483 | 1.577 | 2.992 | 1.414 | 0.937 |
| 7.1.08 | 934.933 | 12.813 | 1.840 | 1.257 | 2.833 | 6.279 | 2.334 | 1.236 |
| 7.1.09 | 935.977 | 27.920 | 1.863 | 0.633 | 1.213 | 10.011 | 3.146 | 0.957 |
| 7.1.10 | 946.177 | 20.797 | 2.527 | 2.547 | 1.707 | 6.344 | 0.087 | 1.783 |
| 7.2.01 | 951.530 | 5.330 | 1.517 | 1.180 | 0.613 | 4.317 | 1.650 | 0.467 |
| boat.512 | 942.427 | 19.453 | 2.460 | 1.207 | 0.887 | 9.823 | 0.524 | 1.207 |
| elaine.512 | 969.757 | 14.950 | 2.010 | 1.607 | 2.777 | 7.839 | 2.177 | 1.050 |
| house | 993.220 | 116.010 | 3.477 | 1.213 | 2.507 | 10.950 | 0.790 | 1.400 |
| gray21.512 | 941.383 | 5.990 | 1.457 | 1.590 | 1.280 | 12.766 | 0.102 | 0.520 |
| numbers.512 | 692.123 | 26.230 | 3.627 | 2.257 | 1.733 | 11.103 | 0.221 | 0.870 |
| ruler.512 | 313.253 | 51.230 | 2.593 | 1.947 | 0.890 | 3.126 | 0.430 | 1.727 |
| testpat.1k | 752.093 | 45.560 | 1.823 | 1.557 | 1.067 | 0.720 | 0.247 | 0.590 |
| Mean | 906.8673 | 25.3640 | 2.3659 | 1.8817 | 1.8195 | 6.1952 | 1.4926 | 1.1364 |
| StdEv | 108.8469 | 30.3308 | 1.1648 | 1.2747 | 1.4061 | 3.9684 | 1.0049 | 0.8166 |
| # of Best | | 0 | 1 | 2 | 4 | 1 | 12 | 24 |

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in computer science, cryptology, and related fields are intended to be within the scope of the following claims.

We claim:

1. A method for encrypting a plaintext, the method comprising:
1) generating a Sudoku matrix according to a method comprising generating a Latin square and shuffling elements of the Latin square according to a permutation sequence; and
2) permuting the plaintext to produce a ciphertext according to a method comprising generating a unitary permutation matrix from the Sudoku matrix and shuffling the plaintext according to the unitary permutation matrix; shuffling a row, a column, or a block according to the Sudoku matrix; and/or moving elements according to a bijective mapping defined for the Sudoku matrix.

2. The method of claim 1 wherein the shuffling comprises shuffling rows or columns.

3. The method of claim 1 further comprising:
a) band swapping and/or stack swapping;
b) providing a parameter set as inputs for the method;
c) generating a parameter set from an encryption key and providing the parameter set as inputs for the method;
d) generating a parameter set from an encryption key using a pseudo-random number generator or a linear congruential generator and providing the parameter set as inputs for the method;
e) generating a parameter set from an encryption key using a discrete logistic map and providing the parameter set as inputs for the method; or f) generating a parameter set from an encryption key comprising:
  1) a first parameter $x_0$ in the interval [0, 1] and a second parameter r in the interval [3.6, 4] for generating a logistic chaotic sequence, wherein an element of the logistic chaotic sequence is output from a discrete logistic map;
  2) a third parameter m to define the size of the Sudoku array; and
  3) a fourth parameter t to define a number of iterations to produce an element from the discrete logistic map, and providing the parameter set as inputs for the method.

4. The method of claim 1 wherein the Sudoku array is an array comprising more than 2 dimensions.

5. The method of claim 1 further comprising whitening the plaintext with the Sudoku matrix, transposing the plaintext with the Sudoku matrix, substituting the plaintext according to the Sudoku matrix, or changing the data and shuffling data positions.

6. The method of claim 1 wherein the bijective mapping relates a first address comprising a coordinate pair expressed in a first notation to a second address comprising the coordinate pair expressed in a second notation.

7. The method of claim 1 wherein the Sudoku matrix is a maximum distance separable matrix.

8. The method of claim 1 further comprising normalizing the Sudoku matrix to produce a doubly stochastic matrix and wherein the transforming comprises substituting according to the doubly stochastic matrix.

9. The method of claim 1 wherein the Sudoku matrix is predefined or the Sudoku matrix is dynamically generated.

10. The method of claim 1 wherein the plaintext comprises:
  a) an image;
  b) a red channel of an RGB image, a green channel of an RGB image, and/or a blue channel of an RGB image;
  c) a video or a compressed video;
  d) audio data; or
  e) a bit stream.

11. The method of claim 1 wherein a 256-bit Rijndael key schedule is used to generate a uniformly distributed round key and/or a sub-key.

12. The method of claim 1 further comprising repeating the method for encrypting the ciphertext for a number of iterations n.

13. The method of claim 12 wherein n=10.

14. The method of claim 10 further comprising compressing the video with a discrete cosine transform-based technology.

15. A method for encrypting a plaintext comprising:
  1) whitening the plaintext using a first Sudoku matrix generated according to a method comprising generating a Latin square and shuffling elements of the Latin square according to a permutation sequence;
  2) substituting the plaintext using a second Sudoku matrix generated according to a method comprising generating a Latin square and shuffling elements of the Latin square according to a permutation sequence;
  3) permuting the plaintext by shuffling the plaintext using a third Sudoku matrix generated according to a method comprising generating a Latin square and shuffling elements of the Latin square according to a permutation sequence; and
  4) diffusing the plaintext using a maximum distance separable Sudoku matrix.

16. The method of claim 15 wherein the first Sudoku matrix and the third Sudoku matrix are the same.

17. The method of claim 15 wherein an encryption key is used to generate one or more of the first Sudoku matrix, the second Sudoku matrix, the third Sudoku matrix, or the maximum distance separable Sudoku matrix.

* * * * *